(12) United States Patent
Tie et al.

(10) Patent No.: US 11,006,443 B2
(45) Date of Patent: May 11, 2021

(54) MULTICAST-BASED WIRELESS COMMUNICATION METHOD, TERMINAL DEVICE, AND BASE STATION

(71) Applicant: HUAWEI TECHNOLOGIES CO., LTD., Guangdong (CN)

(72) Inventors: Xiaolei Tie, Shanghai (CN); Tong Ji, Beijing (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/272,715

(22) Filed: Feb. 11, 2019

(65) Prior Publication Data

US 2019/0174529 A1    Jun. 6, 2019

Related U.S. Application Data

(63) Continuation of application No. PCT/CN2016/101257, filed on Sep. 30, 2016.

(30) Foreign Application Priority Data

Aug. 11, 2016  (WO) ................ PCT/CN2016/094775

(51) Int. Cl.
*H04W 4/06*   (2009.01)
*H04W 72/12*  (2009.01)
(Continued)

(52) U.S. Cl.
CPC ........ *H04W 72/1289* (2013.01); *H04W 4/06* (2013.01); *H04W 4/70* (2018.02);
(Continued)

(58) Field of Classification Search
CPC ....................................................... H04L 12/28
(Continued)

(56) References Cited

U.S. PATENT DOCUMENTS

2011/0103288 A1    5/2011  Lee et al.
2012/0039283 A1 *  2/2012  Chen ..................... H04L 5/0053
                                                 370/329
(Continued)

FOREIGN PATENT DOCUMENTS

CN    101127933 A    2/2008
CN    101867874 A   10/2010
(Continued)

OTHER PUBLICATIONS

Translation of CN 101867874, Oct. 29, 2010.*
(Continued)

*Primary Examiner* — Dang T Ton
(74) *Attorney, Agent, or Firm* — Leydig, Voit & Mayer, Ltd.

(57) ABSTRACT

Embodiments of the present invention provide a multicast-based wireless communication method, a terminal device, and a base station. The method includes: in a process of receiving a current multicast service, receiving, by a terminal device, downlink control information DCI transmitted by a base station, where the DCI is used to schedule a current multicast traffic channel MTCH, and the DCI includes indication information used to indicate that configuration information of the MTCH is modified in a next modification period MP or a current MP; and obtaining, by the terminal device, modified configuration information according to the indication information. System flexibility is improved according to the embodiments of the present invention.

12 Claims, 18 Drawing Sheets

(51) Int. Cl.
*H04W 4/70* (2018.01)
*H04W 76/11* (2018.01)
*H04W 68/00* (2009.01)
*H04W 72/04* (2009.01)
*H04W 72/00* (2009.01)

(52) U.S. Cl.
CPC ....... *H04W 68/005* (2013.01); *H04W 72/042* (2013.01); *H04W 76/11* (2018.02); *H04W 72/005* (2013.01)

(58) Field of Classification Search
USPC ........................................................ 370/400
See application file for complete search history.

(56) References Cited

U.S. PATENT DOCUMENTS

| | | |
|---|---|---|
| 2012/0257562 A1 | 10/2012 | Kim et al. |
| 2013/0294315 A2 | 11/2013 | Guo et al. |
| 2016/0014571 A1* | 1/2016 | Lee .................. H04W 4/06 370/312 |
| 2016/0037492 A1 | 2/2016 | Xu et al. |
| 2016/0261422 A1 | 9/2016 | Kanesalingam et al. |
| 2016/0338011 A1 | 11/2016 | Mizusawa |
| 2019/0380078 A1* | 12/2019 | Fujishiro ............... H04W 16/26 |

FOREIGN PATENT DOCUMENTS

| | | |
|---|---|---|
| CN | 101931879 A | 12/2010 |
| CN | 101959131 A | 1/2011 |
| CN | 102088661 A | 6/2011 |
| CN | 102170610 A | 8/2011 |
| CN | 102208938 A | 10/2011 |
| CN | 104104468 A | 10/2014 |
| EP | 2995145 A1 | 3/2016 |
| JP | 2009182944 A | 8/2009 |
| JP | 2015142225 A | 8/2015 |
| KR | 20120115947 A | 10/2012 |

OTHER PUBLICATIONS

Translation of CN 102196581, Oct. 5, 2011.*
Huawei et al: "SC-PTM configuration and operation", 3GPP Draft; R2-153378, vol. RAN WG2, No. Beijing, China; Aug. 23, 2015, XP051004106, 6 pages.
Huawei et al: "L2 aspects of SC-PTM", 3GPP Draft; R2-154197, vol. RAN WG2, No. Malmo, Sweden; Oct. 4, 2015, XP051004779, 4 pages.
3rd Generation Partnership Project; Technical Specification Group Radio Access Network; Evolved Universal Terrestrial Radio Access (E-UTRA);Study on single-cell point-to-multipoint transmission for E-UTRA (Release 13),3GPP TR 36.890, vol. RAN WG2, No. V13.0.0, Jul. 1, 2015, pp. 1-31, XP051294284.
Qualcomm Incorporated, SC-PTM Configuration. 3GPP TSG-RAN WG2 Meeting #91 Beijing, China, Aug. 24-28, 2015, R3-153781, 5 pages.
Huawei et al, DCI for NB-IoT. 3GPP TSG RAN WG1 Meeting #84bis Busan, Korea, Apr. 11-15, 2016, R1-162626, 7 pages.
"3GPP TS 36.212 V13.2.0 (Jun. 2016), 3rd Generation Partnership Project; Technical Specification Group Radio Access Network, Evolved Universal Terrestrial Radio Access (E-UTRA); Multiplexing and channel coding(Release 13), 140 pages".
"3GPP TS 36.213 V13.2.0 (Jun. 2016), 3rd Generation Partnership Project; Technical Specification Group Radio Access Network; Evolved Universal Terrestrial Radio Access (E-UTRA); Physical layer procedures(Release 13), 381 pages".
"3GPP TS 36.331 V13.2.0 (Jun. 2016), 3rd Generation Partnership Project;Technical Specification Group Radio Access Network;Evolved Universal Terrestrial Radio Access (E-UTRA);Radio Resource Control (RRC);Protocol specification (Release 13), 621 pages".
3GPP TS 36.321 V13.2.0 (Jun. 2016), 3rd Generation Partnership Project;Technical Specification Group Radio Access Network;Evolved Universal Terrestrial Radio Access (E-UTRA);Medium Access Control (MAC) protocol specification (Release 13), 91 pages.

* cited by examiner

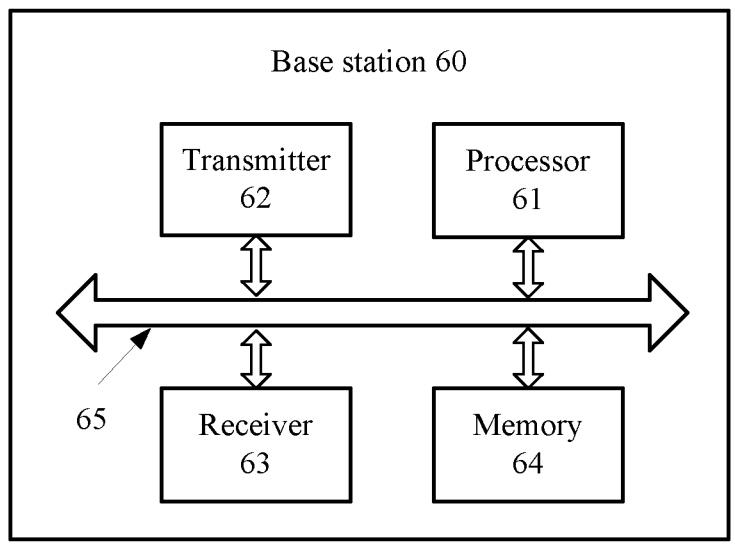

FIG. 10

A terminal device receives indication information transmitted by a base station, where the indication information is used to indicate that multicast configuration information of a current cell is modified in a current modification period MP or a next MP, and the indication information is included in downlink control information DCI for scheduling a multicast control channel MCCH, or included in a master information block MIB, or included in a direct indication format DIF for scheduling a paging message of the terminal device — S510

The terminal device obtains modified multicast configuration information of the current cell according to the indication information — S520

FIG. 11

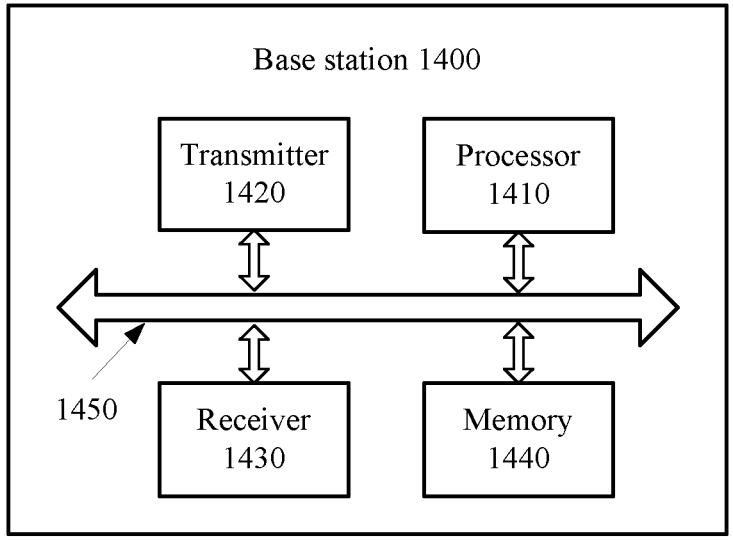

FIG. 22

| In a process of receiving a multicast traffic channel MTCH or a multicast control channel MCCH, a terminal device receives downlink control information DCI transmitted by a base station, where the DCI is used to schedule the MTCH or the MCCH, the DCI includes indication information, and the indication information is used to indicate whether paging of the terminal device exists in a preset time-frequency resource | S910 |

| If the terminal device determines that the paging scheduled does not exist in the preset time-frequency resource, the terminal device does not monitor a search space corresponding to the paging in the preset time-frequency resource; or if the terminal device determines that the paging scheduled exists in the preset time-frequency resource, and at least one paging occasion of the terminal device exists in the preset time-frequency resource, the terminal device monitors a search space corresponding to the paging on the paging occasion, and stops receiving the MTCH or the MCCH | S920 |

FIG. 23

MULTICAST-BASED WIRELESS COMMUNICATION METHOD, TERMINAL DEVICE, AND BASE STATION

CROSS-REFERENCE TO RELATED APPLICATIONS

This application is a continuation of International Application No. PCT/CN2016/101257, filed on Sep. 30, 2016, which claims priority to International Application No. PCT/CN2016/094775, filed on Aug. 11, 2016, The disclosures of the aforementioned applications are hereby incorporated by reference in their entireties.

TECHNICAL FIELD

The present invention relates to the communications field, and in particular, to a multicast-based wireless communication method, a terminal device, and a base station.

BACKGROUND

Machine type communication (MTC), also referred to as machine to machine (M2M) communication or the Internet of things (IoT), is an important application in the future communications field. Future IoT communication may mainly cover smart metering, medical examination and monitoring, logistics inspection, industrial inspection and monitoring, Internet of vehicles, smart communities, communication of wearable devices, and the like.

Among IoT systems, an important IoT communications system is a communications system based on an existing cellular architecture. This communications system may be referred to as a cellular IoT. In this communications system, generally, a very high data transmission rate is generally not required between an MTC base station and a terminal device, but the MTC requires a very large coverage area. Therefore, a large quantity of terminal devices may exist within coverage of an MTC base station, and the terminal devices may cover various terminal devices such as smart water meters or electricity meters, smart communities, monitor, vehicles, and wearable terminal devices. During communication between such terminal devices and the MTC base station, high requirements are imposed on power consumption and costs of the terminal devices. Therefore, capabilities of the terminal devices are always limited.

In a Long Term Evolution (LTE) system, single cell point-to-point (SC-PTM) is a multicast-based transmission technology. In the multicast technology, two logical channels are included: a single cell multicast control channel (SC-MCCH) and a single cell multicast traffic channel (SC-MTCH). The SC-MCCH is a control channel, and is used to transmit configuration information required by a terminal device for receiving the SC-MTCH (namely, SC-MTCH configuration information). The SC-MTCH is a data channel, and is used to transmit multicast service data. When receiving an SC-MTCH transmitted by a base station, a capability-limited terminal device in the IoT system is always incapable of receiving an SC-MCCH transmitted by the base station. Therefore, in the process of receiving the SC-MTCH transmitted by the base station, the terminal device cannot modify configuration information of the SC-MTCH that is currently being received, and therefore, system flexibility is affected.

SUMMARY

This application provides a multicast-based wireless communication method, a terminal device, and a base station to improve system flexibility.

According to a first aspect, a multicast-based wireless communication method is provided and includes: receiving, by a terminal device, downlink control information DCI transmitted by a base station, where the DCI is used to schedule a current multicast traffic channel MTCH, the DCI includes indication information, and the indication information is used to indicate that configuration information of the current MTCH is modified in a next modification period MP or a current MP; and obtaining, by the terminal device, modified configuration information of the current MTCH according to the indication information. In a process of receiving the MTCH according to the DCI for scheduling the current MTCH, the terminal device only needs to detect a search space corresponding to the MTCH of a multicast service that the terminal device is receiving, and can directly learn, from the indication information in the DCI transmitted in the search space, whether configuration information of the current multicast service is modified. Therefore, the terminal can determine, according to the indication information without reading additional DCI, whether the modified configuration information needs to be re-obtained, so that the terminal device can modify the configuration information of the current MTCH in the process of receiving the multicast service. This improves system flexibility.

With reference to the first aspect, in a first implementation of the first aspect, the method further includes: obtaining the current MTCH according to the obtained modified configuration information of the current MTCH.

With reference to the first aspect or the first implementation of the first aspect, in a second implementation of the first aspect, the configuration information of the MTCH includes configuration information of a physical downlink control channel PDCCH search space, and the PDCCH search space is used to transmit the DCI for scheduling the MTCH.

With reference to any one of the first aspect or the foregoing implementations of the first aspect, in a third implementation of the first aspect, the indication information is further used to indicate that configuration information of another MTCH in a current cell is modified in the next MP or the current MP. It should be understood that, in this application, the configuration information of the another MTCH in the current cell may belong to an MTCH different from the current MTCH that is being received in the current cell. The another MTCH may be an MTCH that is not used by the terminal device.

With reference to any one of the first aspect or the foregoing implementations of the first aspect, in a fourth implementation of the first aspect, the indication information is further used to indicate that multicast configuration information of the current cell is modified in the current MP or the next MP. It should be understood that, in this application, the multicast configuration information of the current cell may include that configuration information of an existing multicast traffic channel MTCH in the current cell is modified, or that a multicast traffic channel MTCH is added to the cell, or that an existing traffic channel MTCH is removed.

With reference to any one of the first aspect or the foregoing implementations of the first aspect, in a fifth implementation of the first aspect, before the terminal device receives the DCI transmitted by the base station, the terminal device monitors, in a physical downlink control channel, the search space of the DCI for scheduling the current MTCH, but does not monitor a search space of DCI for scheduling an MCCH.

According to a second aspect, a multicast-based wireless communication method is provided and includes: generating, by a base station, downlink control information DCI, where the DCI is used to schedule a first multicast traffic channel MTCH, the DCI includes indication information, and the indication information is used to indicate that configuration information of the first MTCH is modified in a next modification period MP or a current MP; and transmitting, by the base station, the DCI to a terminal device.

In a process in which the base station transmits the current MTCH to the terminal device by using the DCI for scheduling the current MTCH, in this solution, the indication information is added to the DCI to indicate that the configuration information of the current MTCH is modified. Therefore, when the terminal device obtains the current MTCH through the DCI, the terminal device can learn that the configuration information of the current MTCH is modified, without detecting a search space corresponding to an MCCH or obtaining an MCCH according to DCI transmitted in a search space and used for scheduling the MCCH. In this way, for a low-capability terminal device that is incapable of receiving an MCCH and an MTCH simultaneously, the terminal device can modify configuration information of a current MTCH in a process of receiving a multicast service. This improves system flexibility.

With reference to the second aspect, in a first implementation of the second aspect, the configuration information of the MTCH includes configuration information of a physical downlink control channel PDCCH search space, and the PDCCH search space is used to transmit the DCI for scheduling the MTCH.

With reference to the second aspect or the first implementation of the second aspect, in a second implementation of the second aspect, the indication information is further used to indicate that configuration information of a second MTCH in a current cell is modified in the next MP or the current MP. It should be understood that, in this application, the configuration information of the second MTCH in the current cell may be configuration information of an MTCH different from the first MTCH that is currently being received in the current cell.

With reference to any one of the second aspect or the foregoing implementations of the second aspect, in a third implementation of the second aspect, the indication information is further used to indicate that multicast configuration information of the current cell is modified in the current MP or the next MP. It should be understood that, in this application, the multicast configuration information of the current cell may include that configuration information of an existing multicast traffic channel MTCH in the current cell is modified, or that a multicast traffic channel MTCH is added to the cell, or that an existing traffic channel MTCH is removed.

According to a third aspect, a multicast-based wireless communication method is provided and includes: receiving, by a terminal device, indication information transmitted by a base station, where the indication information is used to indicate that multicast configuration information of a current cell is modified in a current modification period MP or a next MP, and the indication information is included in downlink control information DCI for scheduling a multicast control channel MCCH, or included in a master information block MIB, or included in a direct indication format DIF for indicating a system information modification on a paging occasion PO; and obtaining, by the terminal device, modified multicast configuration information of the current cell according to the indication information.

When the terminal device does not receive any multicast service, the terminal device only needs to detect a search space corresponding to the MCCH, and obtain, from the search space, the indication information included in the DCI for scheduling the MCCH, or detect the indication information included in the system master information block MIB, or detect the indication information included in the direct indication format DIF for indicating the system information modification on the paging occasion PO, so that the terminal device can learn whether the multicast configuration information of the current cell is modified. The terminal device learns, through the indication information, that the multicast configuration information of the current cell is modified, and then re-obtains the modified multicast configuration information of the current cell. In this way, when the multicast configuration information of the current cell is not modified, the terminal device is prevented from re-obtaining the multicast configuration information of the current cell. This reduces resource overheads of the terminal device and improves system flexibility.

With reference to the third aspect, in a first implementation of the third aspect, the multicast configuration information of the current cell includes a set of configuration information of at least one multicast traffic channel MTCH in the current cell, and configuration information of each MTCH in the set includes configuration information of a physical downlink control channel PDCCH search space for each MTCH.

With reference to the third aspect or the first implementation of the third aspect, in a second implementation of the third aspect, the indication information is further used to indicate that configuration information of an existing MTCH in the current cell is modified, or that an MTCH is added to the current cell, or that an existing MTCH in the current cell is removed.

According to a fourth aspect, a multicast-based wireless communication method is provided and includes: generating, by a base station, indication information, where the indication information is used to indicate that multicast configuration information of a current cell is modified in a current modification period MP or a next MP, and the indication information is included in downlink control information DCI for scheduling a multicast control channel MCCH, or included in a master information block MIB, or included in a direct indication format DIF for indicating a system information modification on a paging occasion PO; and transmitting, by the base station, the indication information to a terminal device.

In this solution, the base station generates the indication information, and the indication information may be included in the DCI for scheduling the MCCH, or included in the master information block MIB, or included in the direct indication format DIF for indicating the system information modification on the paging occasion PO. The base station transmits the indication information to the terminal device, so that the terminal device can learn whether the multicast configuration information of the current cell is modified. The terminal device learns, through the indication information, that the multicast configuration information of the current cell is modified, and then re-obtains the modified multicast configuration information of the current cell. In this way, when the multicast configuration information of the current cell is not modified, the terminal device is prevented from re-obtaining the multicast configuration information of the current cell. This improves system flexibility.

With reference to the fourth aspect, in a first implementation of the fourth aspect, the multicast configuration information of the current cell includes a set of configuration information of at least one multicast traffic channel MTCH in the current cell, configuration information of each MTCH in the set includes configuration information of a physical downlink control channel PDCCH search space, and the PDCCH search space is used to transmit DCI for scheduling the MTCH.

With reference to the fourth aspect or the first implementation of the fourth aspect, in a second implementation of the fourth aspect, the indication information is further used to indicate that configuration information of an existing MTCH in the current cell is modified, or that an MTCH is added to the current cell, or that an existing MTCH in the current cell is removed.

According to a fifth aspect, a multicast-based wireless communication method is provided and includes: receiving, by a terminal device, cell multicast configuration information transmitted by a base station, where the cell multicast configuration information includes a set of configuration information of at least one MTCH in a cell, configuration information of each MTCH in the set includes configuration information of a physical downlink control channel PDCCH search space, and the PDCCH search space is used to transmit DCI for scheduling the MTCH; and obtaining, by the terminal device, the MTCH in the cell according to the cell multicast configuration information.

With reference to the fifth aspect, in a first implementation of the fifth aspect, the configuration information of the PDCCH search space for the MTCH includes at least one of the following: a maximum quantity of times Rmax that a physical downlink control channel candidate PDCCH candidate for the MTCH is transmitted repeatedly, a ratio of time occupied by the search space for the MTCH, or offset configuration information $\alpha_{offset}$.

With reference to the fifth aspect or the first implementation of the fifth aspect, in a second implementation of the fifth aspect, different MTCHs have different MTCH search spaces.

With reference to any one of the fifth aspect or the foregoing implementations of the fifth aspect, in a third implementation of the fifth aspect, the configuration information of the MTCH further includes discontinuous reception DRX configuration information of the MTCH and/or a group radio network temporary identifier G-RNTI corresponding to a session ID of the MTCH.

With reference to any one of the fifth aspect or the foregoing implementations of the fifth aspect, in a fourth implementation of the fifth aspect, the cell multicast configuration information is carried on a multicast control channel MCCH or in a system information block SIB.

According to a sixth aspect, a multicast-based wireless communication method is provided and includes: generating, by a base station, cell multicast configuration information, where the cell multicast configuration information includes a set of configuration information of at least one multicast traffic channel MTCH in a cell, configuration information of each MTCH in the set includes configuration information of a physical downlink control channel PDCCH search space, and the PDCCH search space is used to transmit DCI for scheduling the MTCH; and transmitting, by the base station, the cell multicast configuration information to a terminal device.

With reference to the sixth aspect, in a first implementation of the sixth aspect, the configuration information of the search space for the MTCH includes at least one of the following: a maximum quantity of times Rmax that a physical downlink control channel candidate PDCCH candidate for the MTCH is transmitted repeatedly, a ratio of time occupied by the search space for the MTCH, or offset configuration information $\alpha_{offset}$.

With reference to the sixth aspect or the first implementation of the sixth aspect, in a second implementation of the sixth aspect, different MTCHs have different MTCH search spaces.

With reference to any one of the sixth aspect or the foregoing implementations of the sixth aspect, in a third implementation of the sixth aspect, the configuration information of the MTCH further includes discontinuous reception DRX configuration information of the MTCH and/or a group radio network temporary identifier G-RNTI corresponding to a session ID of the MTCH.

With reference to any one of the sixth aspect or the foregoing implementations of the sixth aspect, in a fourth implementation of the sixth aspect, the cell multicast configuration information is carried on a multicast control channel MCCH or in a system information block SIB.

According to a seventh aspect, a multicast-based wireless communication method is provided and includes: in a process of receiving a multicast traffic channel MTCH or a multicast control channel MCCH, receiving, by a terminal device, downlink control information DCI transmitted by a base station, where the DCI is used to schedule the MTCH or the MCCH, the DCI includes indication information, and the indication information is used to indicate whether paging of the terminal device exists in a preset time-frequency resource; and if the terminal device determines that the paging does not exist in the preset time-frequency resource, stopping, by the terminal device, monitoring a search space corresponding to the paging in the preset time-frequency resource; or if the terminal device determines that the paging exists in the preset time-frequency resource, and at least one paging occasion of the terminal device exists in the preset time-frequency resource, monitoring, by the terminal device, a search space corresponding to the paging on the paging occasion, and stopping receiving the MTCH or the MCCH.

In this solution, the indication information included in the DCI for scheduling the MTCH and the MCCH is used to indicate whether the paging of the terminal device exists in the preset time-frequency resource; and if the paging does not exist in the preset time-frequency resource, the terminal device does not monitor the search space corresponding to the paging in the preset time-frequency resource. This avoids adverse impact caused on multicast service transmission if the terminal device needs to stop receiving the MTCH or the MCCH on the paging occasion (PO) when the paging of the terminal device does not exist in the preset time-frequency resource.

With reference to the seventh aspect, in a first implementation of the seventh aspect, the preset time-frequency resource is a time-frequency resource for transmitting the paging in a preset period, or a time-frequency resource for transmitting the paging in a period of time occupied by the DCI for scheduling the MTCH or the MCCH.

According to an eighth aspect, a multicast-based wireless communication method is provided and includes: generating, by a base station, downlink control information DCI, where the DCI is used to schedule a multicast traffic channel MTCH or a multicast control channel MCCH, the DCI includes indication information, and the indication information is used to indicate whether paging exists in a preset time-frequency resource; and transmitting, by the base station, the DCI to the terminal device.

In this solution, the DCI generated by the base station and used for scheduling the MTCH and the MCCH includes the indication information, and the indication information is used to indicate whether the paging of the terminal device exists in the preset time-frequency resource. This avoids adverse impact caused on multicast service transmission if the terminal device needs to stop receiving the MTCH or the MCCH on the paging occasion when the paging of the terminal does not exist in the preset time-frequency resource.

With reference to the eighth aspect, in a first implementation of the eighth aspect, the preset time-frequency resource is a time-frequency resource for transmitting the paging in a preset period, or a time-frequency resource for transmitting the paging in a period of time occupied by the DCI for scheduling the MTCH or the MCCH.

According to a ninth aspect, a terminal device is provided and includes units configured to perform any one of the first aspect or the implementations of the first aspect.

According to a tenth aspect, a base station is provided and includes units configured to perform any one of the second aspect or the implementations of the second aspect.

According to an eleventh aspect, a terminal device is provided and includes units configured to perform any one of the third aspect or the implementations of the third aspect.

According to a twelfth aspect, a base station is provided and includes units configured to perform any one of the fourth aspect or the implementations of the fourth aspect.

According to a thirteenth aspect, a terminal device is provided and includes units configured to perform any one of the fifth aspect or the implementations of the fifth aspect.

According to a fourteenth aspect, a base station is provided and includes units configured to perform any one of the sixth aspect or the implementations of the sixth aspect.

According to a fifteenth aspect, a terminal device is provided and includes units configured to perform any one of the seventh aspect or the implementations of the seventh aspect.

According to a sixteenth aspect, a base station is provided and includes units configured to perform any one of the eighth aspect or the implementations of the eighth aspect.

According to a seventeenth aspect, a terminal device is provided, where the terminal device includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution causes the processor to perform the method in any one of the first aspect or the implementations of the first aspect.

According to an eighteenth aspect, a base station is provided, where the base station includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution causes the processor to perform the method in any one of the second aspect or the implementations of the second aspect.

According to a nineteenth aspect, a terminal device is provided, where the terminal device includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution causes the processor to perform the method in any one of the third aspect or the implementations of the third aspect.

According to a twentieth aspect, a base station is provided, where the base station includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution causes the processor to perform the method in any one of the fourth aspect or the implementations of the fourth aspect.

According to a twenty-first aspect, a terminal device is provided, where the terminal device includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution causes the processor to perform the method in any one of the fifth aspect or the implementations of the fifth aspect.

According to a twenty-second aspect, a base station is provided, where the base station includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution causes the processor to perform the method in any one of the sixth aspect or the implementations of the sixth aspect.

According to a twenty-third aspect, a terminal device is provided, where the terminal device includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution causes the processor to perform the method in any one of the seventh aspect or the implementations of the seventh aspect.

According to a twenty-fourth aspect, a base station is provided, where the base station includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution causes the processor to perform the method in any one of the eighth aspect or the implementations of the eighth aspect.

According to a twenty-fifth aspect, a computer-readable medium is provided, where the computer-readable medium stores a computer program for execution by a terminal device, and the computer program includes an instruction for performing the method in any one of the first aspect or the implementations of the first aspect.

According to a twenty-sixth aspect, a computer-readable medium is provided, where the computer-readable medium stores a computer program for execution by a base station, and the computer program includes an instruction for performing the method in any one of the second aspect or the implementations of the second aspect.

According to a twenty-seventh aspect, a computer-readable medium is provided, where the computer-readable medium stores a computer program for execution by a terminal device, and the computer program includes an instruction for performing the method in any one of the third aspect or the implementations of the third aspect.

According to a twenty-eighth aspect, a computer-readable medium is provided, where the computer-readable medium stores a computer program for execution by a base station, and the computer program includes an instruction for performing the method in any one of the fourth aspect or the implementations of the fourth aspect.

According to a twenty-ninth aspect, a computer-readable medium is provided, where the computer-readable medium stores a computer program for execution by a terminal device, and the computer program includes an instruction for performing the method in any one of the fifth aspect or the implementations of the fifth aspect.

According to a thirtieth aspect, a computer-readable medium is provided, where the computer-readable medium stores a computer program for execution by a base station, and the computer program includes an instruction for performing the method in any one of the sixth aspect or the implementations of the sixth aspect.

According to a thirty-first aspect, a computer-readable medium is provided, where the computer-readable medium stores a computer program for execution by a terminal device, and the computer program includes an instruction for performing the method in any one of the seventh aspect or the implementations of the seventh aspect.

According to a thirty-second aspect, a computer-readable medium is provided, where the computer-readable medium stores a computer program for execution by a base station, and the computer program includes an instruction for performing the method in any one of the eighth aspect or the implementations of the eighth aspect.

According to a thirty-third aspect, a multicast-based wireless communications system is provided and includes the terminal device in the ninth aspect and the base station in the tenth aspect.

According to a thirty-fourth aspect, a multicast-based wireless communications system is provided and includes the terminal device in the eleventh aspect and the base station in the twelfth aspect.

According to a thirty-fifth aspect, a multicast-based wireless communications system is provided and includes the terminal device in the thirteenth aspect and the base station in the fourteenth aspect.

According to a thirty-sixth aspect, a multicast-based wireless communications system is provided and includes the terminal device in the fifteenth aspect and the base station in the sixteenth aspect.

In some implementations, the foregoing obtaining or receiving an MTCH may mean receiving multicast data on the MTCH.

In some implementations, the foregoing obtaining or receiving an MCCH may mean receiving multicast configuration information on the MCCH, where the multicast configuration information may be a set of configuration information of all multicast services in a cell or may be configuration information of a multicast service in a cell.

In some implementations, the foregoing MTCH may correspond to a multicast service.

Optionally, the terminal device can obtain an MTCH in a cell according to multicast configuration information of the cell, that is, obtain multicast data on the MTCH.

This embodiment further provides a multicast-based wireless communication method, including: receiving, by a terminal device, downlink control information DCI transmitted by a base station, where the DCI is used to schedule a current multicast traffic channel MTCH, the DCI includes indication information, and the indication information is used to indicate that configuration information of the current MTCH is modified in an indicated modification period MP; and obtaining, by the terminal device, modified configuration information of the current MTCH according to the indication information.

Optionally, the configuration information of the MTCH includes configuration information of a physical downlink control channel PDCCH search space, and the PDCCH search space is used to transmit the DCI for scheduling the MTCH.

Optionally, the indication information is further used to indicate that configuration information of another MTCH in a current cell of the base station is modified in the indicated MP.

Optionally, before the receiving, by a terminal device, DCI transmitted by a base station, the method further includes: monitoring, by the terminal device, the search space of the DCI for scheduling the current MTCH on a physical downlink control channel, but skipping monitoring a search space of DCI for scheduling an MCCH.

This embodiment further provides a terminal device, where the terminal device includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution of the instruction causes the processor to execute the foregoing method.

This embodiment further provides a multicast-based wireless communication method, including: generating, by a base station, downlink control information DCI, where the DCI is used to schedule a first multicast traffic channel MTCH, the DCI includes indication information, and the indication information is used to indicate that configuration information of the first MTCH is modified in an indicated modification period MP; and transmitting, by the base station, the DCI to a terminal device.

Optionally, the configuration information of the MTCH includes configuration information of the physical downlink control channel PDCCH search space, and the PDCCH search space is used to transmit the DCI for scheduling the MTCH.

Optionally, the indication information is further used to indicate that configuration information of a second MTCH in a current cell is modified in the indicated MP.

This embodiment further provides a base station, where the base station includes a receiver, a transmitter, a memory, a processor, and a bus system. The receiver, the transmitter, the memory, and the processor are connected by the bus system; the memory is configured to store an instruction; the processor is configured to execute the instruction stored in the memory, so as to control the receiver to receive a signal and control the transmitter to transmit a signal; and when the processor executes the instruction stored in the memory, the execution of the instruction causes the processor to execute the foregoing method.

Optionally, an embodiment of the present invention further provides a computer-readable medium, where the computer-readable medium stores a computer program for execution by a terminal device, and the computer program includes an instruction for performing the foregoing method.

This embodiment further provides a multicast-based wireless communications terminal device, including: a first module, configured to receive downlink control information DCI transmitted by a base station, where the DCI is used to schedule a current multicast traffic channel MTCH, the DCI includes indication information, and the indication information is used to indicate that configuration information of the current MTCH is modified in an indicated modification period MP; and a second module, configured to obtain modified configuration information of the current MTCH according to the indication information.

Optionally, the configuration information of the MTCH includes configuration information of a physical downlink control channel PDCCH search space, and the PDCCH search space is used to transmit the DCI for scheduling the MTCH.

Optionally, the indication information is further used to indicate that configuration information of another MTCH in a current cell of the base station is modified in the indicated MP.

Optionally, a third module is further included and configured to: before the DCI transmitted by the base station is received, monitor, the search space of the DCI for scheduling the current MTCH on a physical downlink control channel, but skip monitoring a search space of DCI for scheduling an MCCH.

This embodiment further provides a multicast-based wireless communications base station, including: a first module, configured to generate downlink control information DCI, where the DCI is used to schedule a first multicast traffic channel MTCH, the DCI includes indication information, and the indication information is used to indicate that configuration information of the first MTCH is modified in an indicated modification period MP; and a second module, configured to transmit the DCI to a terminal device.

Optionally, the configuration information of the MTCH includes configuration information of the physical downlink control channel PDCCH search space, and the PDCCH search space is used to transmit the DCI for scheduling the MTCH.

Optionally, the indication information is further used to indicate that configuration information of a second MTCH in a current cell is modified in the indicated MP.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 10 is a schematic block diagram of a base station according to an embodiment of the present invention;

FIG. 11 is a flowchart of a multicast-based wireless communication method according to an embodiment of the present invention;

FIG. 22 is a schematic block diagram of a base station according to an embodiment of the present invention;

FIG. 23 is a flowchart of a multicast-based wireless communication method according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, a future 5G system, or the like.

Figure 1:
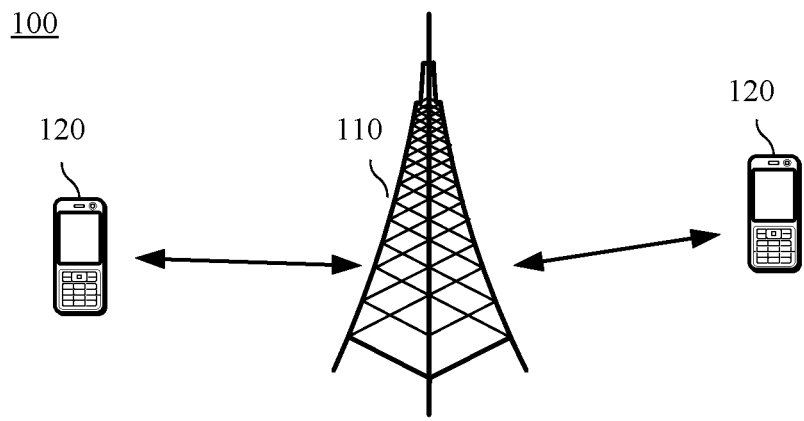
FIG. 1 is a schematic diagram of a communications system to which an embodiment of the present invention can be applied.

FIG. 1 shows a communications system 100 to which an embodiment of the present invention is applied. The communications system 100 may include at least one network device 110. The network device 110 may be a device that communicates with a terminal device 120, for example, a base station or a base station controller. Each network device 110 may provide communication coverage for a specific geographic area, and may communicate with a terminal device (for example, UE) in the coverage area (a cell). The network device 110 may be a base transceiver station (BTS) in a GSM system or a Code Division Multiple Access (CDMA) system, or may be a NodeB in a WCDMA system, or may be an evolved NodeB (eNB or eNodeB) in an LTE system or a radio controller in a cloud radio access network (CRAN); or the network device may be a relay station, an access point, a vehicle-mounted device, a wearable device, a network-side device in a future 5G network, a network device in a future evolved public land mobile network (PLMN), or the like.

In this embodiment of the present invention, the communications system 100 may be the Internet of things (IoT). A cellular IoT (CIoT) system is an important machine type communication (MTC) system based on a cellular network infrastructure. A main service scope of future Internet of things communication may cover smart metering, medical examination and monitoring, logistics inspection, industrial inspection and monitoring, Internet of vehicles, smart communities, communication of wearable devices, and the like. The Internet of things industry constructed centering on MTC communication is considered as a fourth wave of the information industry after the computer, the Internet, and the mobile communications network, and is a development direction of a future network. In addition, with respect to the network and terminal devices, the CIoT system has requirements for large coverage, a large quantity of connections, low costs, and low power consumption.

The wireless communications system 100 further includes multiple terminal devices 120 within coverage of the network device 110. The terminal devices 120 may be mobile or fixed. The terminal device 120 may be an access terminal, user equipment (UE), a subscriber unit, a subscriber station, a mobile station, a mobile device, a remote station, a remote terminal, a mobile terminal, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

FIG. 1 shows one network device and two terminal devices as an example. Optionally, the communications system 100 may include multiple network devices, and coverage of each network device may include other quantities of terminal devices. This is not limited in this embodiment of the present invention.

Optionally, the wireless communications system 100 may further include other network entities such as a network controller and a mobility management entity, but this embodiment of the present invention is not limited thereto.

Specifically, in the system 100, the base station 110 performs multicast to the terminal devices 120 based on a single cell point-to multipoint (SC-PTM) technology, that is, the base station 110 transmits same downlink data to multiple terminal devices 120. The base station 110 configures terminal devices 120 that need to receive downlink data as a multicast group. The base station 110 transmits downlink data to the multicast group, and each terminal device in the multicast group can receive the downlink data. In the SC-PTM technology, two logical channels are included: a single cell multicast control channel (SC-MCCH) and a single cell multicast traffic channel (SC-MTCH). The SC-MTCH is a multicast traffic channel, and is used to transmit multicast service data. The SC-MCCH is a control channel and is used to transmit control information required by UE for receiving the SC-MTCH. Both the two logical channels are carried on a physical downlink shared channel (PDSCH) at a physical layer. When the base station transmits a multicast service to a terminal device, the base station first transmits configuration information of an SC-MCCH, carried in a system information block (SIB), to the terminal device. For example, the configuration information of the SC-MCCH may be carried in a SIB 20. Specifically, the configuration information of the SC-MCCH included in the SIB 20 may include one or more of the following content:

(1) a modification period (MP) of the SC-MCCH, where the MP indicates how soon the SC-MCCH may be modified, in units of frames;

(2) a repetition period (RP) of the SC-MCCH, where the RP indicates how soon the SC-MCCH is transmitted repeatedly in a modification period, in units of frames;

(3) a transmission subframe of the SC-MCCH, indicating in which specific subframe the SC-MCCH is transmitted in a frame; or (4) a transmission offset of the SC-MCCH, indicating, in a modification period, an offset of a transmission frame of the SC-MCCH relative to a start of the period.

The terminal device obtains the SC-MCCH according to the received configuration information of the SC-MCCH. The SC-MCCH includes cell multicast configuration information. The cell multicast configuration information is specifically indicated by an SC-MTCH information table, and the cell multicast configuration information includes a set of configuration information of at least one SC-MTCH in a cell. Optionally, the terminal device can obtain the SC-MTCH in the cell according to the cell multicast configuration information, that is, obtain multicast data on the SC-MTCH. Specifically, the configuration information of the SC-MTCH may include one or more of the following content:

(1) session information, where the session information may include a session identifier (identification, ID for short);

(2) a group radio network temporary identifier (G-RNTI), where the G-RNTI is used to mask a cyclic redundancy check (CRC) part of downlink control information (DCI);

(3) scheduling information of the SC-MTCH, where the scheduling information includes information such as receiving and sleeping of the SC-MTCH; or (4) neighboring cell information or the like, where the neighboring cell information is used to indicate whether a neighboring cell provides a session that the terminal device is interested in.

Figure 2:
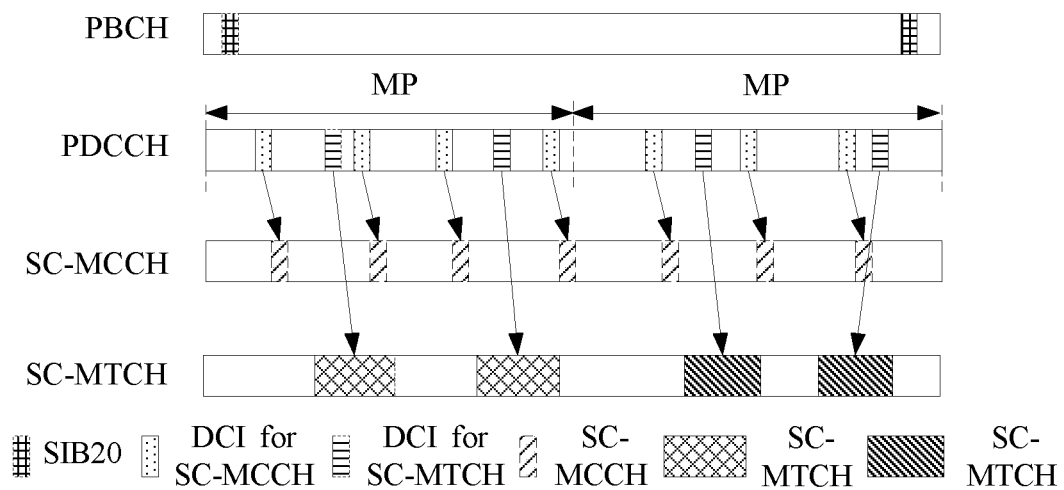
FIG. 2 is a schematic diagram of a scheduling relationship between a logical channel and a physical channel in SC-PTM.

In the SC-PTM technology, the SC-MCCH and the SC-MTCH that are carried on the PDSCH may be adjusted dynamically by using DCI carried on a physical downlink control channel (PDCCH). FIG. 2 shows a schematic diagram of a scheduling relationship between a logical channel and a physical channel in the SC-PTM technology. Before receiving the SC-MCCH, the terminal device needs to first obtain the configuration information of the SC-MCCH that is included in the SIB20, receive, according to the configuration information of the SC-MCCH, DCI for scheduling the SC-MCCH, and receive the SC-MCCH according to the DCI for scheduling the SC-MCCH. After obtaining the SC-MCCH, the terminal device determines whether session IDs included in the SC-MCCH include a service ID that the terminal device is interested in, and after determining that the SC-MCCH includes the session ID that the terminal device is interested in, starts to receive DCI for scheduling the SC-MTCH, and receives the SC-MTCH according to the DCI for scheduling the SC-MCCH.

The PDCCH in this embodiment of the present invention may be a PDCCH in LTE, or a narrowband physical downlink control channel (NPDCCH) in the NB-IoT, or a machine physical downlink control channel (MPDCCH) in eMTC, or any combination of the foregoing PDCCHs. For ease of description, only the PDCCH or the NPDCCH is used for description in the description of this embodiment of the present invention. Unless otherwise specified in this document, the PDCCH, the NPDCCH, and the MPDCCH may be interchanged.

In a scheduling mode shown in FIG. 2, two different common search spaces (CSS), namely, a CSS type 1 and a CSS type 2, may be defined for the SC-MCCH and the SC-MTCH. On the PDCCH for scheduling the SC-MCCH and SC-MTCH, a same PDCCH DCI format may be used, but the DCI for scheduling the SC-MCCH and the DCI for scheduling the SC-MTCH may be transmitted in the defined CSS of the SC-MCCH and the defined CSS of the SC-MTCH respectively.

Figure 3:
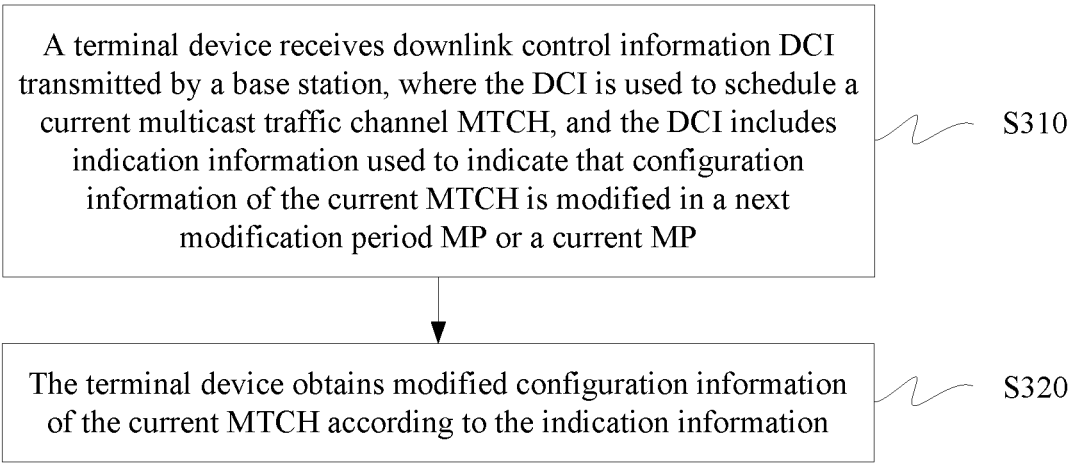
FIG. 3 is a flowchart of a multicast-based wireless communication method according to an embodiment of the present invention.

FIG. 3 shows a multicast-based wireless communication method according to an embodiment of the present invention. The method may be applied to the communications system in FIG. 1, but this embodiment of the present invention is not limited thereto. The method includes the following steps.

S310. A terminal device receives downlink control information DCI transmitted by a base station, where the DCI is used to schedule a current multicast traffic channel MTCH, the DCI includes indication information, and the indication information is used to indicate that configuration information of the current MTCH is modified in a next modification period MP or a current MP.

S320. The terminal device obtains modified configuration information of the current MTCH according to the indication information.

In a process of receiving a multicast service, the terminal device receives the DCI that is transmitted by the base station and used for scheduling the current MTCH, and obtains, according to the DCI, multicast service data carried in the MTCH. In the solution of this embodiment of the present invention, indication information is added to the DCI to indicate whether the configuration information of the current MTCH is modified. That is, the terminal device can learn whether the configuration information of the current MTCH is modified, without detecting a search space for an MCCH or receiving an MCCH, and therefore determine whether the modified configuration information needs to be re-obtained. This improves system flexibility.

In this embodiment of the present invention, the configuration information of the MTCH may include configuration information of a PDCCH search space for the MTCH. It should be understood that, in this embodiment of the present invention, the configuration information of the MTCH may further include other information, for example, may include at least one of the following information: DRX configuration information of the MTCH, a G-RNTI corresponding to a session ID of the MTCH, scheduling information of the MTCH, or neighboring cell information. This is not limited in this embodiment of the present invention.

It should be understood that, this embodiment of the present invention may be applied to processing of a multicast service. The multicast service may be, for example, a multimedia broadcast multicast service (MBMS) and/or a multicast service in SC-PTM. In this embodiment of the present invention, unless otherwise specified, the MTCH and the SC-MTCH may be interchanged, and the MCCH and the SC-MCCH may be interchanged.

The following uses an SC-PTM technology as an example to describe this embodiment of the present invention in detail. However, it should be understood that, this embodiment of the present invention may be further applied to other multicast technologies.

In this embodiment of the present invention, a terminal device with a simple functional structure, for example, a metering module in a smart water meter or electricity meter, cannot receive an SC-MCCH (or cannot detect other search spaces, such as a search space for an SC-MCCH) due to a limited capability when receiving a current SC-MTCH. For a terminal device that has started to receive a current multicast service, the terminal device can monitor, according to obtained configuration information of the multicast service, in a corresponding search space, DCI for scheduling a current SC-MTCH. The terminal device receives, according to the DCI for scheduling the SC-MTCH, the SC-MTCH transmitted by the base station. Further, in this embodiment of the present invention, the DCI for scheduling the SC-MTCH may include indication information, and the indication information is used to indicate that configuration information of the current SC-MTCH is modified in a next MP or a current MP.

In this embodiment of the present invention, the configuration information of the SC-MTCH may include configuration information of a search space for the SC-MTCH. It should be understood that, in this embodiment of the present invention, the configuration information of the SC-MTCH may further include other information, for example, may include at least one of the following information: DRX configuration information of the SC-MTCH, a G-RNTI corresponding to a session ID of the SC-MTCH, scheduling information of the SC-MTCH, or neighboring cell information.

In this embodiment of the present invention, before or when the terminal device receives the current multicast service, the terminal device can determine, according to a session ID of the current multicast service, a G-RNTI corresponding to the session ID, and detect, on a PDCCH according to the obtained configuration information of the current multicast service, DCI for scheduling the current SC-MTCH, where the G-RNTI corresponding to the session ID may be used to mask or scramble a CRC of the DCI. The terminal device receives, according to the DCI, the SC-MTCH transmitted by the base station. Further, in this embodiment of the present invention, the DCI may include indication information, and the indication information is used to indicate that the configuration information of the current SC-MTCH is modified in the next MP or the current MP.

Specifically, in this embodiment of the present invention, the indication information in the DCI may be an indication field of at least one bit in the DCI, and the indication field may be used to indicate that the configuration information of the current SC-MTCH is modified in the next MP or the current MP. For example, the indication field includes one bit. When a value of the indication field is 0, the indication information specifically indicates that the configuration information of the current SC-MTCH is modified in the next MP or the current MP; or when a value of the indication field is 1, the indication information specifically indicates that the configuration information of the current SC-MTCH is modified in the current MP or the next MP. For another example, the indication field includes two bits. When a value of the indication field is "00", it may indicate that the configuration information of the current SC-MTCH is modified in the next MP or the current MP; or when a value of the indication field is "01", the indication information indicates that the configuration information of the current SC-MTCH is modified in the current MP or the next MP.

Specifically, in this embodiment of the present invention, the indication information in the DCI may be an indication field of at least one bit in the DCI, and the indication field may be used to indicate that the configuration information of the current SC-MTCH is modified in the next MP or the current MP. For example, the indication field includes one bit. When a value of the indication field is 0, the indication information specifically indicates that the configuration information of the current SC-MTCH is modified in the next MP; or when a value of the indication field is 1, the indication information specifically indicates that the configuration information of the current SC-MTCH is not modified in the next MP or is modified in the current MP.

It should be understood that, in this embodiment of the present invention, the indication information in the DCI for scheduling the current SC-MTCH is used to indicate that the configuration information of the current SC-MTCH is modified in the next MP or the current MP. The indication information may be carried in at least one bit in the DCI. The foregoing descriptions of the examples are only a specific implementation of the present invention, but this embodiment of the present invention is not limited thereto. For example, the DCI for scheduling the SC-MTCH may include three bits, and any binary bit combination of the three bits may indicate that the current SC-MTCH is modified in the next MP or the current MP.

It should be understood that, in this embodiment of the present invention, the indication information may be carried in an existing field of the DCI for scheduling the current SC-MTCH, or a new field for carrying the indication information may be added to the DCI. In addition, the indication information may be indicated in an implicit or explicit indication manner. This is not limited in this embodiment of the present invention.

Figure 4:
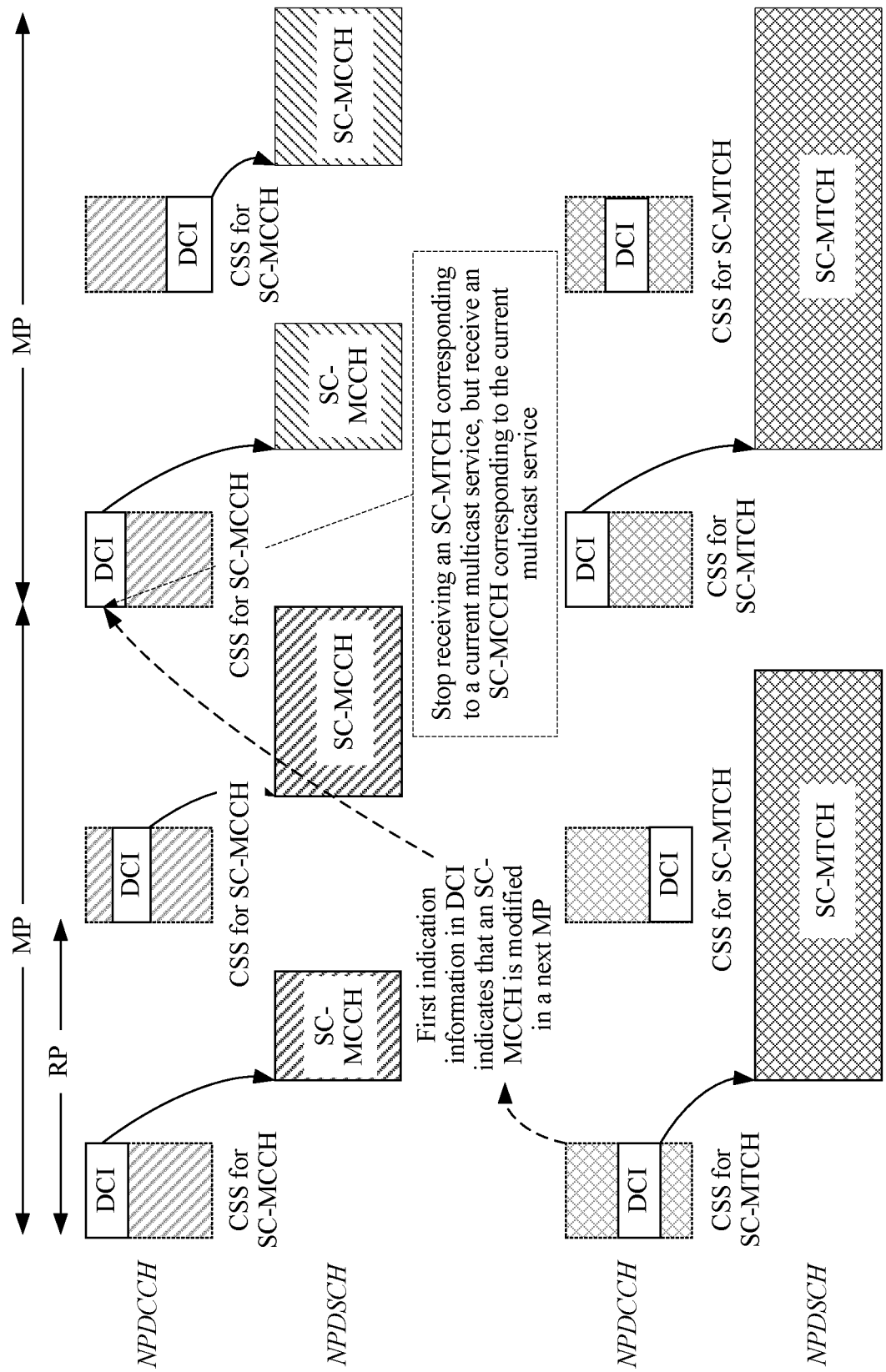
FIG. 4 is a schematic diagram of a scheduling relationship between a logical channel and a physical channel according to an embodiment of the present invention.

FIG. 4 shows a schematic diagram of receiving a multicast service by a terminal device according to an embodiment of the present invention. This embodiment of the present invention uses an NB-IoT system as an example, but is also applicable to other communications systems. Therefore, although an NPDSCH and an NPDCCH are used to describe a physical-layer channel in this embodiment of the present invention, the NPDSCH and the NPDCCH may also be replaced with corresponding physical-layer channels in a system, for example, a PDSCH and a PDCCH. As can be seen from FIG. 4, an SC-MTCH carrying a multicast service and an SC-MCCH carrying configuration information of the multicast service are transmitted on the NPDSCH, and transmission of the SC-MCCH and the SC-MTCH is scheduled by using DCI carried on the NPDCCH.

In this embodiment of the present invention, different search spaces may be defined for the SC-MTCH and the SC-MCCH, and a format of DCI for scheduling the SC-MTCH may be different from a format of DCI for scheduling the SC-MCCH. As can be seen from FIG. 4, the DCI for scheduling the SC-MTCH and the DCI for scheduling the SC-MCCH are transmitted in the search spaces for the SC-MTCH and the SC-MCCH respectively. It should be understood that, in a specific implementation, the search space for the SC-MTCH and the search space for the SC-MCCH may be configured to overlap each other.

In a process of receiving the current SC-MTCH or monitoring, in an NPDCCH search space, the DCI for scheduling the NPDSCH used to carry the SC-MTCH, the terminal device cannot receive the SC-MCCH carried on the NPDSCH, or monitor, in the search space for scheduling the SC-MCCH, the DCI for scheduling the NPDSCH used to carry the SC-MCCH. In this embodiment, in the process in which the terminal device receives the current SC-MTCH, indication information is added to the DCI for scheduling the NPDSCH used to carry the SC-MTCH, and the indication information may indicate that the configuration information of the multicast service corresponding to the current SC-MTCH is modified in the next MP or the current MP. When the indication information indicates that the configuration information of the multicast service corresponding to the current SC-MTCH is modified in the next MP or the current MP, the terminal device stops receiving the current SC-MTCH in the next MP or the current MP, monitors, in the search space for scheduling the NPDSCH used to carry the SC-MCCH, the DCI for scheduling the SC-MCCH, re-obtains the SC-MCCH according to the DCI, and obtains modified configuration information of the multicast service according to the SC-MCCH.

It should be understood that, in this embodiment of the present invention, the indication information may further indicate that the configuration information of the current SC-MTCH is not modified in the next MP or the current MP. In this case, the terminal device may continue to monitor the related search space according to the configuration information of the current SC-MTCH, and receive the current SC-MTCH.

Optionally, in this embodiment of the present invention, the indication information in the DCI for scheduling the current MTCH may be further used to indicate that configuration information of another MTCH in a current cell is modified in the next MP or the current MP. Therefore, the terminal device receiving the current multicast can determine, according to an implementation of the terminal device, whether to re-read multicast configuration information of the current cell. This improves system flexibility.

It should be understood that, the another MTCH may be another MTCH different from the current MTCH that the terminal device is receiving in the current cell. The another MTCH may be an MTCH that is not used by the terminal device.

In this embodiment of the present invention, the terminal device only needs to detect the search space corresponding to the MTCH of the multicast service that the terminal device is receiving, and can directly learn, from the indication information in the DCI transmitted in the search space, whether the configuration information of the current multicast service is modified, and can also learn whether the configuration information of the another MTCH is modified. Therefore, the terminal device can determine, according to the indication information without reading additional DCI, whether the modified configuration information needs to be re-obtained. This improves system flexibility.

Specifically, in this embodiment of the present invention, in the process of receiving the current multicast service, the terminal device receives the DCI that is transmitted by the base station and used for scheduling the current SC-MTCH, and the indication information in the DCI may be further used to indicate that the configuration information of the another SC-MTCH is modified in the next MP or the current MP. For example, an indication field of at least one bit may be introduced in the DCI. When a value of the indication field is 1, the indication information indicates that the configuration information of the another SC-MTCH is modified in the current MP or the next MP; when a value of the indication field is 0, the indication information indicates that the configuration information of the another MTCH is not modified in the current MP or the next MP. Therefore, the terminal device can determine, according to the indication information, whether the modified configuration information needs to be re-obtained. This improves system flexibility.

It should be understood that, in this embodiment of the present invention, the DCI may further include an indication field of two bits. When a value of the two bits is "01", the indication information indicates that the configuration information of the another SC-MTCH is modified in the next MP or the current MP; when a value of the two bits is "11", the indication information indicates that the configuration information of the another SC-MCCH is not modified in the current MP or the next MP.

It should also be understood that, the indication information included in the DCI for scheduling the current SC-MTCH may be further indicated by any binary combination of three bits. For example, a bit value "000" of three bits is used to indicate that the configuration information of the another SC-MCCH is modified in the next MP or the next MP. Certainly, the foregoing is only a specific implementation of the present invention, and this embodiment of the present invention is not limited thereto.

It should also be understood that, in this embodiment of the present invention, the indication information may be carried in an existing field of the DCI for scheduling the current SC-MTCH, or a new field for carrying the indication information may be added to the DCI. In addition, the indication information may be indicated in an implicit or explicit indication manner. This is not limited in this embodiment of the present invention.

It should also be understood that, in this embodiment of the present invention, that the configuration information of the another MTCH in the cell is modified includes: configuration information of a current existing multicast service (any existing multicast service except the current multicast service of the terminal device in the cell) in the cell is modified, a multicast service is added to the cell, or an existing multicast service is removed.

It should also be understood that, in this embodiment of the present invention, the configuration information of the current multicast service and the configuration information of the another MTCH are carried on the SC-MCCH logical channel. The SC-MCCH is carried on the NPDSCH, and is scheduled by the DCI. The DCI may be transmitted in a preset or preconfigured search space, and a CRC may be masked by using a preset UEID, for example, an SC-RNTI. In this embodiment of the present invention, when the terminal device determines, according to the indication information, that the modified configuration information needs to be re-obtained in the current MP and the next MP, the terminal device can monitor the DCI for scheduling the SC-MCCH on the NPDCCH, and receive, according to the DCI, the SC-MCCH transmitted by the base station. The SC-MCCH includes the multicast configuration information of the current cell, and the multicast configuration information of the current cell includes configuration information of at least one SC-MTCH. The SC-MTCH is a multicast service that is being multicast in the cell. The terminal can obtain, by re-obtaining the multicast configuration information of the current cell, the configuration information of the current SC-MTCH and the configuration information of the another SC-MTCH that is being multicast.

Optionally, in another embodiment of the present invention, the indication information included in the DCI for scheduling the current SC-MTCH is further used to indicate that the multicast configuration information of the current cell is modified in the current MP or the next MP.

Specifically, in this embodiment of the present invention, the multicast configuration information of the current cell is a set or list of configuration information of at least one multicast traffic channel MTCH in the cell. Further, the configuration information of the MTCH may include at least one of the following information: configuration information of the search space for the MTCH, DRX configuration information of the MTCH, a G-RNTI corresponding to a session ID of the MTCH, scheduling information of the MTCH, neighboring cell information, or the like. This is not specifically limited in this embodiment of the present invention.

It should be understood that, that the multicast configuration information of the current cell is modified may include at least one of the following: configuration information of a current existing MTCH in the cell is modified, an MTCH is added to the cell, or an existing MTCH is removed.

Specifically, in this embodiment of the present invention, in the process of receiving the current SC-MTCH, the terminal device can learn, according to the indication information in the DCI for scheduling the current SC-MTCH, that the multicast configuration information of the current cell is modified in the current MP or the next MP. For example, an indication field of at least bit may be introduced in the DCI for scheduling the current SC-MTCH. When a value of the indication field is 1, the indication information indicates that the multicast configuration information of the current cell is modified in the next MP or the current MP; when a value of the indication field is 0, the indication information indicates that the multicast configuration information of the current cell is not modified in the next MP or the current MP. Therefore, the terminal device can determine, according to the indication information, whether modified multicast configuration information of the current cell needs to be re-obtained. This improves system flexibility.

It should be understood that, in this embodiment of the present invention, the DCI may further include an indication field of two bits. When a value of the indication field is "01", the indication information indicates that an SC-MTCH is added to the current cell; when a value of the indication field is "11", the indication information indicates that an existing SC-MTCH in the current cell is removed. Certainly, a bit 0 in the indication field may be further used to indicate whether an SC-MTCH is added, and a bit 1 is used to indicate whether an existing SC-MTCH is removed. For example, when a bit value of the bit 0 is 1, the indication information indicates that an SC-MTCH is added to the current cell; when a bit value of the bit 1 is 1, the indication information indicates that an existing SC-MTCH in the current cell is removed.

It should also be understood that, the indication information in the DCI for scheduling the current SC-MTCH may further use any binary combination of three bits to indicate that an SC-MTCH is added to the current cell or that an existing SC-MTCH is removed. Certainly, the foregoing is only a specific implementation of this embodiment of the present invention, and this embodiment of the present invention is not limited thereto.

It should also be understood that, in this embodiment of the present invention, the indication information may be carried in an existing field of the DCI for scheduling the current SC-MTCH, or a new field for carrying the indication information may be added to the DCI. In addition, the indication information may be indicated in an implicit or explicit indication manner. This is not limited in this embodiment of the present invention.

Figure 5:
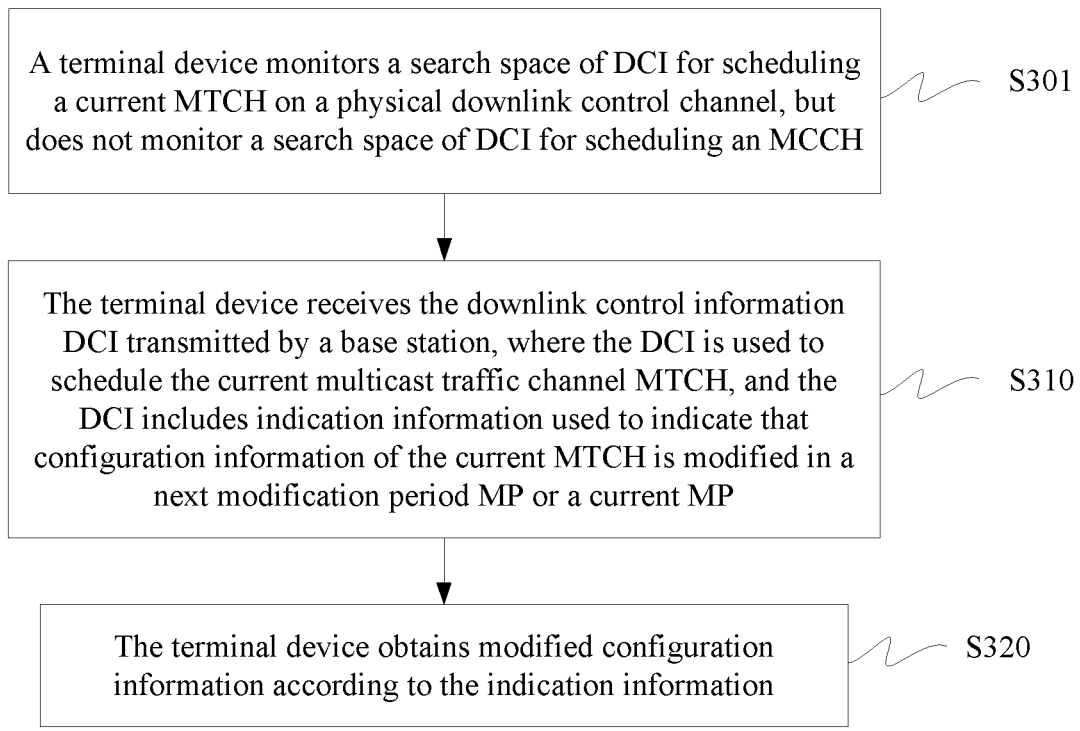
FIG. 5 is a flowchart of another multicast-based wireless communication method according to an embodiment of the present invention.

As shown in FIG. 5, in this embodiment of the present invention, optionally, before the terminal device receives the DCI, the method further includes:

S301. The terminal device monitors a search space of the DCI for scheduling the current MTCH on a physical downlink control channel, but does not monitor a search space of DCI for scheduling an MCCH.

Specifically, in this embodiment of the present invention, before receiving the downlink control information DCI transmitted by the base station, the terminal device monitors the search space of the DCI for scheduling the current SC-MTCH on the NPDCCH, but does not monitor the search space of the DCI for scheduling the SC-MCCH.

The foregoing describes in detail the multicast-based wireless communication methods according to the embodiments of the present invention from a terminal device side with reference to FIG. 3 to FIG. 5. The following describes in detail a multicast-based wireless communication method according to an embodiment of the present invention from a base station side with reference to FIG. 6. It should be understood that, descriptions of the base station side correspond to descriptions of the terminal device side. For similar descriptions, refer to the foregoing text.

Figure 6:
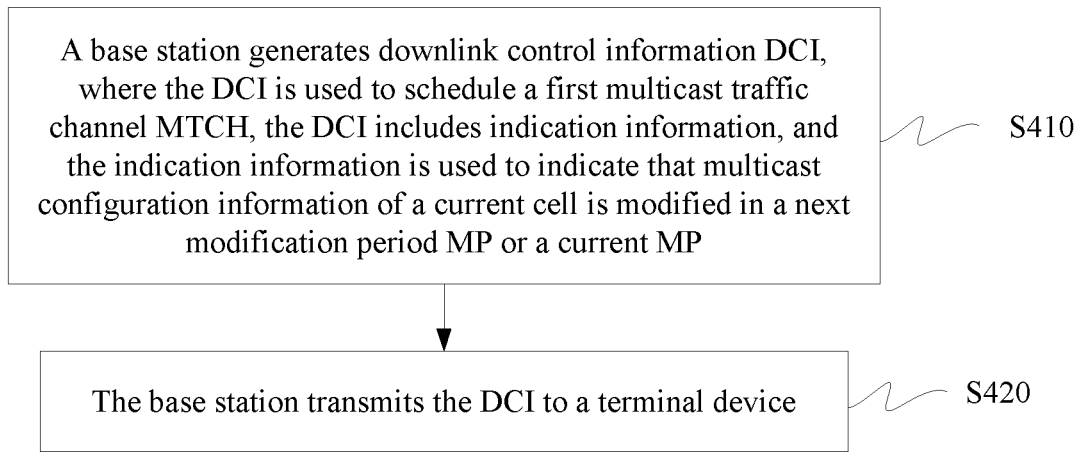
FIG. 6 is a flowchart of a multicast-based wireless communication method according to an embodiment of the present invention.

As shown in FIG. 6, the multicast-based wireless communication method according to this embodiment of the present invention includes the following steps.

S410. A base station generates downlink control information DCI, where the DCI is used to schedule a first multicast traffic channel MTCH, the DCI includes indication information, and the indication information is used to indicate that configuration information of the MTCH is modified in a next modification period MP or a current MP.

S420. The base station transmits the DCI to a terminal device.

In this embodiment of the present invention, the base station adds the indication information to the DCI for scheduling the MTCH, and the indication information is used to indicate that the configuration information of the MTCH is modified. Therefore, the terminal device only needs to detect a search space corresponding to the MTCH of a multicast service that the terminal device is receiving, can directly learn, from the indication information in the DCI transmitted in the search space, that configuration information of the current multicast service is modified, and can determine, according to the indication information without reading additional DCI, whether modified configuration information needs to be re-obtained. This improves system flexibility.

In this embodiment of the present invention, the configuration information of the MTCH may include configuration information of a PDCCH search space for the MTCH. In addition, the configuration information of the MTCH may further include other information, for example, may include at least one of the following information: DRX configuration information of the MTCH, a G-RNTI corresponding to a session ID of the MTCH, scheduling information of the MTCH, or neighboring cell information. This is not specifically limited in this embodiment of the present invention.

It should be understood that, content of this embodiment of the present invention is mainly applicable to multicast services, including a multimedia broadcast multicast service (MBMS) and SC-PTM. Therefore, in this embodiment of the present invention, unless otherwise specified, the MTCH and the SC-MTCH may be interchanged, and the MCCH and the SC-MCCH may be interchanged.

Specifically, in this embodiment of the present invention, the base station generates downlink control information DCI, where the DCI includes indication information, and the indication information may be specifically used to indicate that configuration information of an SC-MTCH is modified in a next modification period MP or a current MP. The indication information may be carried in at least one bit in the DCI. For a specific implementation, refer to related descriptions of the terminal device side. For brevity, details are not described again herein.

Optionally, in this embodiment of the present invention, the indication information included in the DCI for scheduling the SC-MTCH may be further used to indicate that configuration information of a second SC-MTCH is modified in the next MP or the current MP. Specifically, in this embodiment of the present invention, the indication information may be carried in at least one bit in the DCI. For a specific implementation, refer to related descriptions of the terminal device side. For brevity, details are not described again herein.

It should be understood that, in this embodiment of the present invention, the second SC-MTCH may be an SC-MTCH different from the first SC-MTCH that is currently being received in a current cell, for example, may be any SC-MTCH except the first SC-MTCH that is currently being received.

Optionally, in another embodiment of the present invention, the indication information in the DCI for scheduling the SC-MTCH may be further used to indicate that multicast configuration information of the current cell is modified in the current MP or the next MP. Specifically, in this embodiment of the present invention, the indication information may be carried in at least one bit in the DCI. For a specific implementation, refer to related descriptions of the terminal device side. For brevity, details are not described again herein.

The multicast configuration information of the current cell is a set or list of configuration information of a multicast traffic channel MTCH included in the cell. Further, the configuration information of the MTCH may include at least one of the following information: configuration information of the search space for the MTCH, DRX configuration information of the MTCH, a G-RNTI corresponding to a session ID of the MTCH, scheduling information of the MTCH, neighboring cell information, or the like. This is not specifically limited in this embodiment of the present invention.

It should be understood that, that the multicast configuration information of the current cell is modified includes at least one of the following: configuration information of an existing multicast service in the current cell is modified, a multicast service is added to the cell, or an existing multicast service in the cell is removed.

The foregoing describes in detail the multicast-based wireless communication methods according to the embodiments of the present invention with reference to FIG. 1 to FIG. 6. The following describes in detail a terminal device and a base station according to embodiments of the present invention with reference to FIG. 7 to FIG. 10. Because apparatuses described in FIG. 7 to FIG. 10 can perform the foregoing methods, for a part that is not described in detail, refer to each of the foregoing method embodiments.

Figure 7:
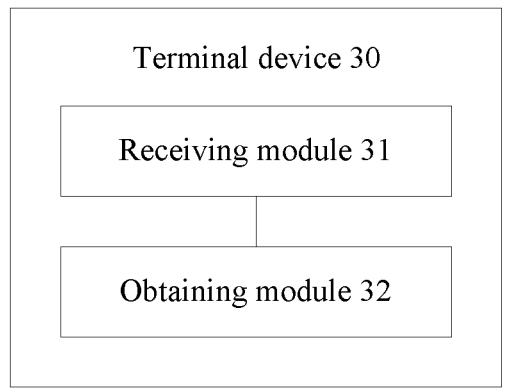
FIG. 7 is a schematic block diagram of a terminal device according to an embodiment of the present invention.

FIG. 7 shows a terminal device 30 according to an embodiment of the present invention. The terminal device 30 includes:

a receiving module 31, configured to receive downlink control information DCI transmitted by a base station, where the DCI is used to schedule a current multicast traffic channel MTCH, the DCI includes indication information, and the indication information is used to indicate that configuration information of the current MTCH is modified in a next modification period MP or a current MP; and an obtaining module 32, configured to obtain modified configuration information of the current MTCH according to the indication information.

The terminal device in this embodiment of the present invention receives the DCI that is transmitted by the base station and used for scheduling the current MTCH, and obtains, according to the DCI, multicast service data carried in the MTCH. In the solution of this embodiment of the present invention, indication information is added to the DCI to indicate whether the configuration information of the current MTCH is modified. That is, the terminal device can learn whether the configuration information of the current MTCH is modified, without detecting a search space for an MCCH or receiving an MCCH, and therefore determine whether the modified configuration information needs to be re-obtained. This improves system flexibility.

In this embodiment of the present invention, the configuration information of the MTCH may include configuration information of a PDCCH search space for the MTCH. It should be understood that, in this embodiment of the present invention, the configuration information of the MTCH may further include other information, for example, may include at least one of the following information: DRX configuration information of the MTCH, a G-RNTI corresponding to a session ID of the MTCH, scheduling information of the MTCH, or neighboring cell information. This is not specifically limited in this embodiment of the present invention.

Optionally, in this embodiment of the present invention, the DCI may include the indication information, and the indication information may be used to indicate that the configuration information of the current MTCH is modified in the next MP or the current MP.

Optionally, in this embodiment of the present invention, the indication information in the DCI may be further used to indicate that configuration information of another MTCH is modified in the next MP or the current MP. Therefore, the terminal device receiving the current multicast can determine, according to an implementation of the terminal device, whether to re-obtain the configuration information of the another MTCH. This improves system flexibility.

Optionally, in this embodiment of the present invention, the indication information in the DCI may be further used to indicate that multicast configuration information of a current cell is modified in the current MP or the next MP.

Optionally, in this embodiment of the present invention, the terminal device 30 further includes:

a monitoring module, configured to: before the receiving module receives the DCI, monitor the search space of the DCI for scheduling the current MTCH on a physical downlink control channel, but skip monitoring a search space of DCI for scheduling an MCCH.

Specifically, in this embodiment of the present invention, before the receiving module 31 receives the downlink control information DCI transmitted by the base station, the monitoring module monitors the search space of the DCI for scheduling the current SC-MTCH on the PDCCH, but does not monitor the search space of the DCI for scheduling the SC-MCCH.

It should be understood that, the terminal device 30 according to this embodiment of the present invention may correspond to the terminal device in the method embodiment of the present invention, and the foregoing and other operations and/or functions of each module in the terminal device 30 can implement each step in each method in FIG. 3 and FIG. 5. For brevity, details are not described again herein.

Figure 8:
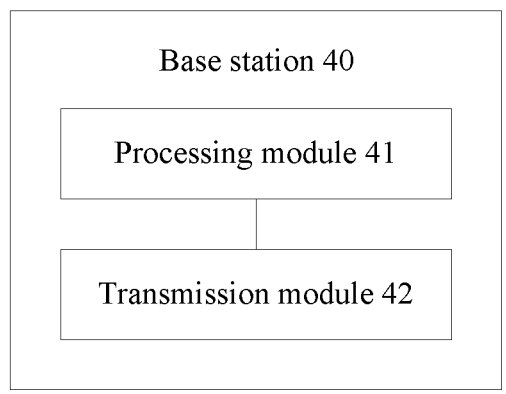
FIG. 8 is a schematic block diagram of a base station according to an embodiment of the present invention.

FIG. 8 shows a base station 40 according to an embodiment of the present invention. The base station 40 includes:

a processing module 41, configured to generate downlink control information DCI, where the DCI is used to schedule a first multicast traffic channel MTCH, the DCI includes indication information, and the indication information is used to indicate that configuration information of the current MTCH is modified in a next modification period MP or a current MP; and a transmission module 42, configured to transmit the DCI to a terminal device.

In this embodiment of the present invention, the base station adds the indication information to the DCI for scheduling the first MTCH, and the indication information is used to indicate that the configuration information of the first MTCH is modified. Therefore, the terminal device only needs to detect a search space corresponding to the MTCH of a multicast service that the terminal device is receiving, can directly learn, from the indication information in the DCI transmitted in the search space, that configuration information of the current multicast service is modified, and can determine, according to the indication information without reading additional DCI, whether modified configuration information needs to be re-obtained. This improves system flexibility.

In this embodiment of the present invention, the configuration information of the MTCH may include configuration information of a search space for the MTCH. It should be understood that, in this embodiment of the present invention, the configuration information of the MTCH may further include other information, for example, may include at least one of the following information: DRX configuration information of the MTCH, a G-RNTI corresponding to a session ID of the MTCH, scheduling information of the MTCH, or neighboring cell information. This is not specifically limited in this embodiment of the present invention.

Optionally, in this embodiment of the present invention, the processing module 41 generates the downlink control information DCI, where the DCI includes the indication information, and the indication information may be used to indicate that the configuration information of the first MTCH is modified in the next modification period MP or the current MP. Specifically, in this embodiment of the present invention, the indication information may be carried in at least one bit in the DCI. For a specific implementation, refer to related descriptions of the terminal device side. For brevity of the application document, details are not described again herein.

Optionally, in this embodiment of the present invention, the indication information in the DCI that is generated by the processing module 41 and used for scheduling the MTCH may be further used to indicate that configuration information of a second MTCH is modified in the next MP or the current MP.

Optionally, in this embodiment of the present invention, the indication information in the DCI that is generated by the processing module 41 and used for scheduling the MTCH may be further used to indicate that multicast configuration information of a current cell is modified.

It should be understood that, the base station 40 according to this embodiment of the present invention may correspond to the network device in the method embodiment of the present invention, and the foregoing and other operations and/or functions of each module in the base station 40 can implement each step in the method in FIG. 6. For brevity, details are not described again herein.

Figure 9:
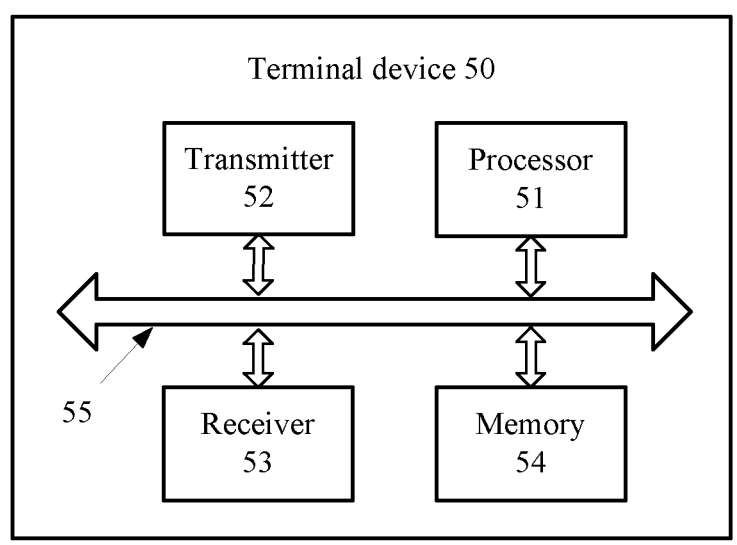
FIG. 9 is a schematic block diagram of a terminal device according to an embodiment of the present invention.

FIG. 9 shows a terminal device 50 according to an embodiment of the present invention. The terminal device 50 includes a processor 51, a transmitter 52, a receiver 53, a memory 54, and a bus system 55. The processor 51, the transmitter 52, the receiver 53, and the memory 54 are connected by the bus system 55. The memory 54 is configured to store an instruction. The processor 51 is configured to execute the instruction stored in the memory 54, so as to control the transmitter 52 to transmit a signal and control the receiver 53 to receive a signal.

The receiver 53 is configured to receive downlink control information DCI transmitted by a base station, where the DCI is used to schedule a current multicast traffic channel MTCH, the DCI includes indication information, and the indication information is used to indicate that configuration information of the current MTCH is modified in a next modification period MP or a current MP.

The processor 51 is configured to obtain modified configuration information of the current MTCH according to the indication information received by the receiver 53.

Optionally, in this embodiment of the present invention, the processor 51 is further configured to: before the receiver 53 receives the DCI, monitor a search space of the DCI for scheduling the current MTCH on a physical downlink control channel, but skip monitoring a search space of DCI for scheduling an MCCH.

Optionally, the memory 54 may include a read-only memory and a random access memory, and provide an instruction and data to the processor. A part of the memory may further include a non-volatile random access memory. For example, the memory may further store information about a device type. The processor 51 may be configured to execute the instruction stored in the memory, and when the processor executes the instruction stored in the memory, the processor is configured to perform each step and/or procedure in the foregoing method embodiment.

FIG. 10 shows a base station 60 according to an embodiment of the present invention. The base station 60 includes a processor 61, a transmitter 62, a receiver 63, a memory 64, and a bus system 65. The processor 61, the transmitter 62, the receiver 63, and the memory 64 are connected by the bus system 65. The memory 64 is configured to store an instruction. The processor 61 is configured to execute the instruction stored in the memory 64, so as to control the transmitter 62 to transmit a signal and control the receiver 63 to receive a signal.

The processor 61 is configured to generate downlink control information DCI, where the DCI is used to schedule a first multicast traffic channel MTCH, the DCI includes indication information, and the indication information is used to indicate that configuration information of the current MTCH is modified in a next modification period MP or a current MP.

The transmitter 62 is configured to transmit the DCI to a terminal device.

Optionally, the memory 64 may include a read-only memory and a random access memory, and provide an instruction and data to the processor. A part of the memory may further include a non-volatile random access memory. For example, the memory may further store information about a device type. The processor 61 may be configured to execute the instruction stored in the memory, and when the processor executes the instruction, the processor can perform each step and/or procedure corresponding to the terminal device in the foregoing method embodiment.

It should be understood that, in each of the foregoing embodiments of the present invention, the modification period MP may be a modification period MP of an MCCH in FIG. 4, or may be an SC-MTCH configuration information modification period MP defined for an SC-MTCH. The SC-MTCH configuration information modification period MP defined for the SC-MTCH may be equal to the modification period of the MCCH or several times longer than the modification period of the MCCH. The SC-MTCH configuration information modification period MP defined for the SC-MTCH may be configured by using system information, or configured on an SC-MCCH. The SC-MTCH configuration information modification period MP defined for the SC-MTCH may be configured for each MTCH separately, or a same SC-MTCH configuration information modification period MP may be used for all SC-MTCHs in a cell.

The foregoing describes in detail a method and an apparatus for indicating a modification of configuration information of a current SC-MTCH by using indication information in DCI for scheduling the current SC-MTCH when a terminal device receives a current multicast service. The following describes in detail a multicast-based wireless communication method when a terminal device does not receive any multicast service.

When the terminal device does not receive any multicast service transmitted by a base station, the terminal device can monitor a search space of DCI for scheduling an MCCH on a PDCCH, or receive an MCCH, or receive another service. After the terminal device obtains, by monitoring, the DCI for scheduling the MCCH, the terminal device receives the MCCH by using the DCI, and thereby obtains multicast configuration information of a current cell. If the multicast configuration information of the current cell is not modified, the terminal device still monitors the search space of the DCI for scheduling the MCCH, and obtains the MCCH according to the DCI. This increases overheads of the terminal device, causes a resource waste, and reduces system flexibility. Based on the foregoing technical problem, an embodiment of the present invention provides a multicast-based wireless communication method to resolve the problem that if the multicast configuration information of the current cell is not modified, the overheads of the terminal devices are increased and the system flexibility is reduced when the terminal device still obtains the multicast configuration information of the cell after the terminal device detects the DCI for scheduling the MCCH.

FIG. 11 shows a multicast-based wireless communication method according to an embodiment of the present invention. The method includes the following steps.

S510. A terminal device receives indication information transmitted by a base station, where the indication information is used to indicate that multicast configuration information of a current cell is modified in a current modification period MP or a next MP, and the indication information is included in downlink control information DCI for scheduling a multicast control channel MCCH, or included in a master information block MIB, or included in a direct indication format DIF for indicating a system information modification on a paging occasion PO.

S520. The terminal device obtains modified multicast configuration information of the current cell according to the indication information.

In this embodiment of the present invention, when the terminal device does not receive any multicast service, the terminal device only needs to detect a search space corresponding to the MCCH, and obtain, from the search space, the indication information included in the DCI for scheduling the MCCH, or detect the indication information included in the system master information block MIB, or detect the indication information included in the direct indication format DIF for indicating the system information modification on the paging occasion PO, so that the terminal device can learn whether the multicast configuration information of the current cell is modified. The terminal device learns, through the indication information, that the multicast configuration information of the current cell is modified, and then re-obtains the modified multicast configuration information of the current cell. In this way, when the multicast configuration information of the current cell is not modified, the terminal device is prevented from re-obtaining the multicast configuration information of the current cell. This reduces resource overheads of the terminal device and improves system flexibility.

Specifically, in this embodiment of the present invention, when the terminal device does not receive a current multicast service, the terminal device can detect a search space corresponding to an SC-MCCH, and obtain, from the search space, DCI for scheduling the SC-MCCH, where the DCI includes indication information indicating that the multicast configuration information of the current cell is modified in the current MP or the next MP, or receive a master information block MIB transmitted by the base station, where the MIB includes indication information indicating that the multicast configuration information of the current cell is modified in the current MP or the next MP, or receive a direct indication format DIF that is transmitted by the base station and used to indicate a system information modification on a paging occasion PO, where the DIF includes indication information indicating that the multicast configuration information of the current cell is modified in the current MP or the next MP. The terminal device obtains the modified multicast configuration information of the current cell according to the indication information.

In an embodiment of the present invention, the terminal device receives downlink control information DCI transmitted by the base station, where the DCI is used to schedule an MCCH, and the DCI may include indication information indicating that the multicast configuration information of the current cell is modified in the current MP or the next MP.

Specifically, in this embodiment of the present invention, when the terminal device does not receive any multicast service, the terminal device can monitor the search space corresponding to the SC-MCCH on an NPDCCH, and obtain, from the search space, the DCI for scheduling the SC-MCCH. The DCI for scheduling the SC-MCCH may include an indication field of at least one bit, and the indication field may indicate that the multicast configuration information of the current cell is modified in the current MP or the next MP. For example, the indication field may include one bit. When a value of the indication field is 0, the indication information may indicate that the multicast configuration information of the current cell is modified in the next MP or the current MP; or when a value of the indication field is 1, the indication information may indicate that the multicast configuration information of the current cell is not modified in the current MP or the next MP. Certainly, it should be understood that, in this embodiment of the present invention, the indication field may further include two bits. When a value of the indication field is "00", the indication information may indicate that the multicast configuration information of the current cell is modified in the current MP or the next MP; or when a value of the indication field is "01", the indication information may indicate that the multicast configuration information of the current cell is not modified in the next MP or the next MP.

It should be understood that, in this embodiment of the present invention, the indication information included in the DCI for scheduling the SC-MCCH is used to indicate that the multicast configuration information of the current cell is modified in the current MP or the next MP. The indication information may be indicated by using at least one bit in the DCI. The foregoing descriptions of the examples are only a specific implementation of this embodiment of the present invention, but this embodiment of the present invention is not limited thereto. For example, the indication field may further include three bits, and any binary combination of all the bits in the indication field may be used to indicate whether the multicast configuration information of the current cell is modified in the current MP or the next MP.

It should also be understood that, in this embodiment of the present invention, in the DCI for scheduling the SC-MCCH, at least one bit may be added to explicitly indicate that multicast service configuration information of the current cell is modified, or an existing bit in the DCI may be used to implicitly indicate that multicast service configuration information of the current cell is modified. This is not limited in this embodiment of the present invention.

Therefore, when the terminal device does not receive any multicast service, the terminal device detects the search space corresponding to the MCCH, obtains, from the search space, the DCI for scheduling the MCCH, and learns, according to the indication included in the DCI, that the multicast configuration information of the current cell is modified. Therefore, a low-capability terminal device in an NB-IoT system does not need to receive multiple pieces of DCI in a same search space (for example, one piece of DCI for scheduling an MCCH, and another piece of DCI for indicating that multicast configuration information of a current cell is modified). To learn whether the multicast configuration information of the current cell is modified in the next MP or the current MP, the terminal device only needs to receive the DCI for scheduling the MCCH. In this way, when the multicast configuration information of the current cell is not modified, the terminal device is prevented from still re-obtaining the multicast configuration information of the cell.

In another embodiment of the present invention, the terminal device may receive a master information block (MIB) transmitted by the base station, where the MIB may include indication information indicating that the multicast configuration information of the current cell is modified in the current MP or the next MP.

Specifically, in this embodiment of the present invention, the multicast configuration information of the current cell may be directly broadcast as system information. Therefore, a SIB may be redefined in the system. Specifically, a SIB20 may be redefined, so that the SIB20 may include the multicast configuration information of the current cell. After the terminal device accesses the cell, the terminal device may first obtain a MIB and a SIB. The MIB and the SIB include basic parameters configured for the cell. The multicast configuration information of the current cell in this embodiment may be carried in the SIB. Therefore, the DCI does not need to be used for scheduling. The terminal device can learn the multicast configuration information of the current cell by reading the SIB.

It should be understood that, after obtaining the SIB for a first time, the terminal device does not need to read the SIB continuously all the time. Therefore, in this embodiment of the present invention, the MIB includes the indication information, and the indication information is used to indicate that the multicast configuration information of the current cell is modified in the current MP or the next MP. Therefore, the terminal device does not need to read the related SIB (for example, the SIB20). To learn whether the SIB (for example, the SIB20) including the multicast configuration information of the current cell needs to be re-read, the terminal device only needs to periodically read the MIB.

Specifically, in this embodiment of the present invention, the MIB may include an indication field of at least one bit, and the indication field is used to indicate that the multicast configuration information of the current cell is modified in the current MP or the next MP. For example, the indication field may include one bit. In the indication field, when a value of the indication field is 0, it indicates that the multicast configuration information of the current cell is modified in the current MP or the next MP; or when a value of the indication field is 0, the indication field indicates that the multicast configuration information of the current cell is not modified in the next MP or the current MP. For another example, the indication field may further include two bits. In the indication field, when a value of the indication field is "00", the indication field indicates that the multicast configuration information of the current cell is modified in the current MP or the next MP; or when a value of the indication field is "01", the indication field indicates that the multicast configuration information of the current cell is not modified in the next MP or the current MP.

It should be understood that, in this embodiment of the present invention, the indication information included in the MIB is used to indicate that the multicast configuration information of the current cell is modified in the current MP or the next MP. The indication information may be indicated by using at least one bit in the MIB. The foregoing descriptions of the examples are only a specific implementation of the present invention, but this embodiment of the present invention is not limited thereto. For example, the MIB may include three bits, and any binary bit combination of all the three bits may be used to indicate whether the multicast configuration information of the current cell is modified in the current MP or the next MP.

It should also be understood that, in this embodiment of the present invention, at least one bit may be added to the MIB to explicitly indicate that a multicast service configuration list of the current cell is modified, or an existing bit in the MIB may be used to implicitly indicate that a multicast service configuration list of the current cell is modified. This is not limited in this embodiment of the present invention.

Therefore, by receiving the MIB, the terminal device learns that the multicast configuration information of the current cell is modified. In this way, when the multicast configuration information of the current cell is not modified, the terminal device is prevented from still re-obtaining the multicast configuration information of the cell. This improves system flexibility.

In an embodiment of the present invention, the terminal device may receive a direct indication format (DIF) transmitted by the base station, where the DIF may include indication information indicating that the multicast configuration information of the current cell is modified in the current modification period MP or the next MP.

Specifically, in this embodiment of the present invention, the multicast configuration information of the current cell may be placed in an SC-MCCH logical channel for transmission, or may be placed in a system information SIB for broadcasting. When the multicast configuration information of the current cell is placed in system information, a SIB may be redefined in the system. Specifically, a SIB20 may be redefined, so that the SIB20 includes the multicast configuration information of the current cell. The terminal device may receive a direct indication format (DIF) for indicating a system information modification on a paging occasion PO. The DIF may include indication information, and the indication information may indicate that the multicast configuration information of the current cell is modified in the current MP or the next MP.

Specifically, in this embodiment of the present invention, the DIF may include an indication field of at least one bit, and the indication field is used to indicate that the multicast configuration information of the current cell is modified in the current MP or the next MP. For example, the indication field may include one bit. In the indication field, when a value of the indication field is 0, it indicates that the multicast configuration information of the current cell is modified in the current MP; or when a value of the indication field is 0, the indication field indicates that the multicast configuration information of the current cell is not modified in the current MP. It should be understood that, in this embodiment of the present invention, the indication field may further include two bits. In the indication field, when a value of the indication field is "00", the indication field indicates that the multicast configuration information of the current cell is modified in the current MP; or when a value of the indication field is "01", the indication field indicates that the multicast configuration information of the current cell is not modified in the current MP.

It should be understood that, in this embodiment of the present invention, the indication information included in the DIF is used to indicate that the multicast configuration information of the current cell is modified in the current MP or the next MP. The indication information may be indicated by using at least one bit in the DIF. The foregoing descriptions of the examples are only a specific implementation of this embodiment of the present invention, but this embodiment of the present invention is not limited thereto. For example, the DIF may include three bits, and any binary combination of all the three bits may be used to indicate whether the multicast configuration information of the current cell is modified in the current MP or the next MP.

It should also be understood that, in this embodiment of the present invention, at least one bit may be added to the DIF to explicitly indicate that the multicast configuration information of the current cell is modified, or an existing bit in the DIF may be used to implicitly indicate that the multicast configuration information of the current cell is modified. For example, the DIF may be a DCI format N2 in the NB-IoT, and the DCI format N2 may be used to indicate a system information modification on a paging occasion of the terminal device. Herein an unallocated bit in the DCI format N2 may be used as the indication information indicating that the multicast configuration information of the current cell is modified. This is not limited in this embodiment of the present invention.

Optionally, in this embodiment of the present invention, the multicast configuration information of the current cell includes a set of configuration information of at least one MTCH in the cell, and configuration information of each MTCH in the set includes configuration information of a search space for scheduling each MTCH. It should be understood that, in this embodiment of the present invention, the configuration information of the MTCH may further include discontinuous reception (DRX) configuration information of the MTCH, a G-RNTI corresponding to a session ID of the MTCH, scheduling information of the MTCH, neighboring cell information, and the like. This is not limited in this embodiment of the present invention.

It should be understood that, in this embodiment of the present invention, when the terminal device does not receive any multicast service, the indication information indicates that the multicast configuration information of the current cell is modified in the current MP or the next MP. Specifically, that the multicast configuration information of the current cell is modified includes: an existing MTCH in the current cell is removed, an MTCH is added to the current cell, or configuration information of an existing MTCH in the current cell is modified.

Optionally, in another embodiment of the present invention, the indication information may be used to indicate that configuration information of an existing MTCH in the current cell is modified, or that an MTCH is added to the current cell, or that an existing MTCH in the current cell is removed.

Specifically, in this embodiment of the present invention, when the terminal device does not receive any multicast service, the terminal device can detect, on the NPDCCH, the search space corresponding to the SC-MCCH, and obtain, from the search space, the DCI for scheduling the SC-MCCH. The DCI for scheduling the SC-MCCH may include an indication field of at least one bit, and the indication field may indicate that configuration information of an existing MTCH in the current cell is modified, or that an MTCH is added to the current cell, or that an existing MTCH in the current cell is removed.

Specifically, in another embodiment of the present invention, the terminal device may receive a master information block (MIB) transmitted by the base station, the MIB may include indication information, and the indication information is used to indicate that configuration information of an existing MTCH in the current cell is modified, or that an MTCH is added to the current cell, or that an existing MTCH in the current cell is removed.

Specifically, in still another embodiment of the present invention, the terminal device may receive a direct indication format (DIF) transmitted by the base station and used to indicate a system information modification on a paging occasion PO, the DIF may include indication information, and the indication information is used to indicate that configuration information of an existing MTCH in the current cell is modified, or that an MTCH is added to the current cell, or that an existing MTCH in the current cell is removed.

It should be understood that, the indication information used to indicate that configuration information of an existing MTCH in the current cell is modified, or that an MTCH is added to the current cell, or that an existing MTCH in the current cell is removed, may be an indication field of at least one bit in the DCI or the MIB or the DIF.

The foregoing describes in detail the multicast-based wireless communication method according to the embodiment of the present invention from a terminal device side. The following describes in detail a multicast-based wireless communication method according to an embodiment of the present invention from a base station side.

Figure 12:
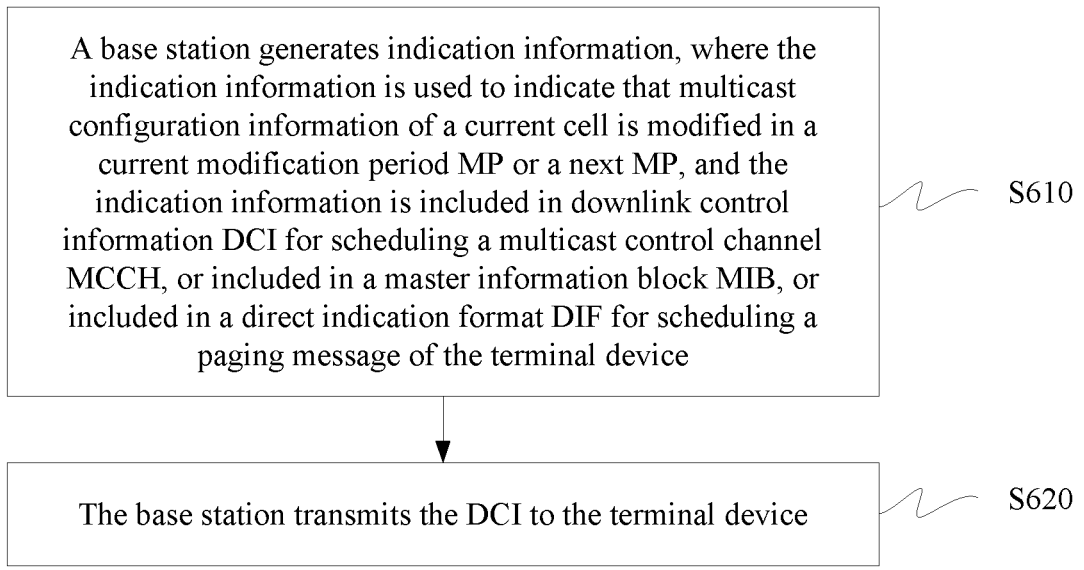
FIG. 12 is a flowchart of a multicast-based wireless communication method according to an embodiment of the present invention.

FIG. 12 shows a multicast-based wireless communication method according to an embodiment of the present invention. The method includes the following steps.

S610. A base station generates indication information, where the indication information is used to indicate that multicast configuration information of a current cell is modified in a current modification period MP or a next MP, and the indication information is included in downlink control information DCI for scheduling a multicast control channel MCCH, or included in a master information block MIB, or included in a direct indication format DIF for indicating a system information modification on a paging occasion PO.

S620. The base station transmits the indication information to a terminal device.

In this embodiment of the present invention, the base station generates the indication information, and the indication information may be included in the DCI for scheduling the MCCH, or included in the master information block MIB, or included in the direct indication format DIF for indicating the system information modification on the paging occasion PO. The base station transmits the indication information to the terminal device, so that the terminal device can learn whether the multicast configuration information of the current cell is modified. The terminal device learns, through the indication information, that the multicast configuration information of the current cell is modified, and then re-obtains the modified multicast configuration information of the current cell. In this way, when the multicast configuration information of the current cell is not modified, the terminal device is prevented from re-obtaining the multicast configuration information of the current cell. This improves system flexibility.

In an embodiment of the present invention, the base station may transmit downlink control information DCI to the terminal device, where the DCI is used to schedule an MCCH, and the DCI includes indication information indicating that the multicast configuration information of the current cell is modified in the current MP or the next MP.

Specifically, in this embodiment of the present invention, the indication information may be information in DCI for scheduling a single cell multicast control channel SC-MCCH. The base station transmits, in a PDCCH search space, the DCI for scheduling the SC-MCCH. The DCI for scheduling the SC-MCCH may include an indication field of at least one bit, and the indication field may indicate that the multicast configuration information of the current cell is modified. For a specific implementation, refer to related descriptions of the terminal device side. For brevity of the application document, details are not described again herein.

In an embodiment of the present invention, the base station may transmit a master information block (MIB) to the terminal device, where the MIB may include indication information indicating that the multicast configuration information of the current cell is modified in the current MP or the next MP. After the terminal device receives, for a first time, a SIB transmitted by the base station, the terminal device does not need to read the SIB continuously all the time. To learn whether a SIB (for example, a SIB20) including the multicast configuration information of the current cell needs to be re-read, the terminal device only needs to periodically read the MIB transmitted by the base station. Therefore, by receiving the MIB, the terminal device learns that the multicast configuration information of the current cell is modified. In this way, when the multicast configuration information of the current cell is not modified, the terminal device is prevented from still re-obtaining the multicast configuration information of the cell. This improves system flexibility.

Specifically, in this embodiment of the present invention, the base station may broadcast the multicast configuration information of the current cell to the terminal device. Therefore, a SIB may be redefined in the system. Specifically, a SIB20 may be redefined, so that the SIB20 includes the multicast configuration information of the current cell. After the terminal device accesses the cell, the terminal device first obtains a MIB and a SIB. The MIB and the SIB include basic parameters configured for the cell. The multicast configuration information of the current cell in this embodiment of the present invention is carried in the SIB. Therefore, the DCI does not need to be used for scheduling. The terminal device can learn the multicast configuration information of the current cell by reading the SIB. After obtaining the SIB for the first time, the terminal device does not need to read the SIB continuously all the time. Therefore, in this embodiment of the present invention, the MIB includes the indication information, and the indication information is used to indicate that the multicast configuration information of the current cell is modified in the current MP or the next MP. Therefore, the terminal does not need to read the related SIB (for example, the SIB20). To learn whether the SIB (for example, the SIB20) including the multicast configuration information of the current cell needs to be re-read, the terminal device only needs to periodically read the MIB. For a specific implementation, refer to related descriptions of the terminal device side. For brevity of the application document, details are not described again herein.

In another embodiment of the present invention, the base station transmits a direct indication format (DIF) to the terminal device, where the DIF may include indication information indicating that the multicast configuration information of the current cell is modified in the current modification period MP or the next MP. For a specific implementation, refer to related descriptions of the terminal device side. For brevity of the application document, details are not described again herein.

Optionally, in this embodiment of the present invention, the multicast configuration information of the current cell includes configuration information of at least one SC-MTCH in the current cell, and configuration information of the MTCH includes configuration information of a search space for scheduling the MTCH. It should be understood that, in this embodiment of the present invention, the configuration information of the MTCH may further include discontinuous reception (DRX) configuration information of the MTCH, a G-RNTI corresponding to a session ID of the MTCH, scheduling information of the MTCH, neighboring cell information, and the like. This is not specifically limited in this embodiment of the present invention.

Optionally, in this embodiment of the present invention, the indication information may further indicate that an existing MTCH in the current cell is removed, or that an MTCH is added to the current cell, or that configuration information of an existing MTCH in the current cell is modified.

The foregoing describes in detail the multicast-based wireless communication methods according to the embodiments of the present invention with reference to FIG. 11 and FIG. 12. The following describes in detail a terminal device and a base station according to embodiments of the present invention.

Figure 13:
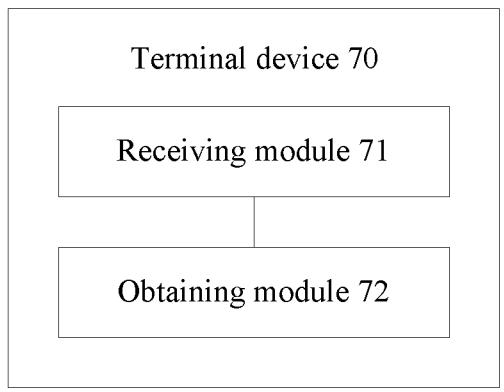
FIG. 13 is a schematic block diagram of a terminal device according to an embodiment of the present invention.

FIG. 13 shows a terminal device 70 according to an embodiment of the present invention. The terminal device 70 can perform each step performed by the terminal device in FIG. 11 and FIG. 12. Details are not described again herein for avoiding repetition. The terminal device 70 includes:

a receiving module 71, configured to receive indication information transmitted by a base station, where the indication information is used to indicate that multicast configuration information of a current cell is modified in a current modification period MP or a next MP, and the indication information is included in downlink control information DCI for scheduling a multicast control channel MCCH, or included in a master information block MIB, or included in a direct indication format DIF for indicating a system information modification on a paging occasion PO; and an obtaining module 72, configured to obtain modified multicast configuration information of the current cell according to the indication information.

In this embodiment of the present invention, when the terminal device does not receive any multicast service, the terminal device only needs to detect a search space corresponding to the MCCH, and obtain, from the search space, the indication information included in the DCI for scheduling the MCCH, or detect the indication information included in the system master information block MIB, or detect the indication information included in the direct indication format DIF for indicating the system information modification on the paging occasion PO, so that the terminal device can learn whether the multicast configuration information of the current cell is modified. The terminal device learns, through the indication information, that the multicast configuration information of the current cell is modified, and then re-obtains the modified multicast configuration information of the current cell. In this way, when the multicast configuration information of the current cell is not modified, the terminal device is prevented from re-obtaining the multicast configuration information of the current cell. This reduces resource overheads of the terminal device and improves system flexibility.

In an embodiment of the present invention, the receiving module 71 may receive downlink control information DCI transmitted by the base station, where the DCI is used to schedule a multicast control channel MCCH, and the DCI includes indication information indicating that the multicast configuration information of the current cell is modified in the current modification period MP or the next MP.

Specifically, in this embodiment of the present invention, when the terminal device does not receive any multicast service, the terminal device may continuously monitor, in a PDCCH search space, DCI for scheduling an SC-MCCH. The DCI for scheduling the SC-MCCH may include an indication field of at least one bit, and the indication field may indicate that the multicast configuration information of the current cell is modified.

In an embodiment of the present invention, the receiving module 71 may receive a master information block (MIB) transmitted by the base station, where the MIB may include indication information indicating that the multicast configuration information of the current cell is modified in the current modification period MP or the next MP.

Specifically, in this embodiment of the present invention, the multicast configuration information of the current cell may be directly broadcast as system information. Therefore, a SIB may be redefined in the system. Specifically, a SIB20 may be redefined, so that the SIB20 includes the multicast configuration information of the current cell. After the terminal device accesses the cell, the terminal device first obtains a MIB and a SIB. The MIB and the SIB include basic parameters configured for the cell. The terminal device may receive dedicated or common DCI on a PDCCH according to the cell configuration in the MIB and the SIB. The DCI may schedule the terminal device to receive an SC-MCCH or an SC-MTCH. When the terminal device does not receive a multicast service, the terminal device may first read related information in the MIB. The information in the MIB may include indication information, and the indication information is used to indicate that the multicast configuration information of the current cell is modified in the current MP or the next MP.

In an embodiment of the present invention, the receiving module 71 may receive a direct indication format (DIF) transmitted by the base station, where the DIF is used to indicate a system information modification on a paging occasion PO, and the DIF may include indication information indicating that the multicast configuration information of the current cell is modified in the current modification period MP or the next MP.

Specifically, in this embodiment of the present invention, a multicast configuration list of the current cell may not be placed in an SC-MCCH logical channel for transmission, but may be directly broadcast as system information. Therefore, a SIB may be redefined in the system. Specifically, a SIB20 may be redefined, so that the SIB20 includes the multicast configuration information of the current cell. After the terminal device accesses the cell, the terminal device first obtains a MIB and a SIB. The MIB and the SIB include basic parameters configured for the cell. The terminal device may receive dedicated or common DCI on a PDCCH according to the cell configuration in the MIB and the SIB. The DCI may schedule the terminal device to receive an SC-MCCH or an SC-MTCH. When the terminal device does not receive any multicast service, a direct indication format (DIF) for indicating a system information modification on a paging occasion PO may include indication information, and the indication information may indicate that the multicast configuration information of the current cell is modified in the current MP or the next MP.

Optionally, in this embodiment of the present invention, the multicast configuration information of the current cell includes a set of configuration information of at least one SC-MTCH in the current cell, and configuration information of each MTCH in the set includes configuration information of a PDCCH search space for scheduling each MTCH. It should be understood that, in this embodiment of the present invention, the configuration information of the MTCH may further include discontinuous reception (DRX) configuration information of the MTCH, a G-RNTI corresponding to a session ID of the MTCH, scheduling information of the MTCH, neighboring cell information, and the like. This is not limited in this embodiment of the present invention.

Optionally, in this embodiment of the present invention, the indication information may further indicate that an existing MTCH in the current cell is removed, or that an MTCH is added to the current cell, or that configuration information of an existing MTCH in the current cell is modified.

Figure 14:
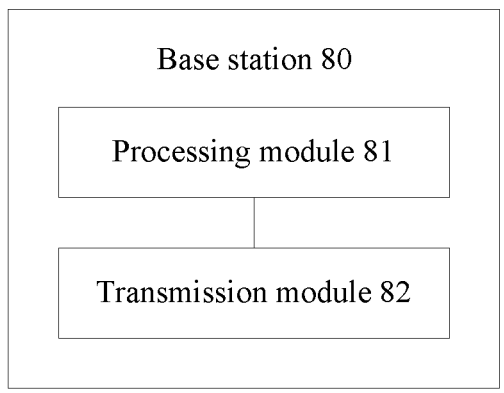
FIG. 14 is a schematic block diagram of a base station according to an embodiment of the present invention.

FIG. 14 shows a base station 80 according to an embodiment of the present invention. The base station 80 can perform each step performed by the base station in FIG. 11 and FIG. 12. Details are not described again herein for avoiding repetition. The base station 80 includes:

a processing module 81, configured to generate indication information, where the indication information is used to indicate that multicast configuration information of a current cell is modified in a current modification period MP or a next MP, and the indication information is included in downlink control information DCI for scheduling a multicast control channel MCCH, or included in a master information block MIB, or included in a direct indication format DIF for indicating a system information modification on a paging occasion PO; and a transmission module 82, configured to transmit the indication information to a terminal device.

In this embodiment of the present invention, the base station generates the indication information, and the indication information may be included in the DCI for scheduling the MCCH, or included in the master information block MIB, or included in the direct indication format DIF for indicating the system information modification on the paging occasion PO. The base station transmits the indication information to the terminal device, so that the terminal device can learn whether the multicast configuration information of the current cell is modified. The terminal device learns, through the indication information, that the multicast configuration information of the current cell is modified, and then re-obtains the modified multicast configuration information of the current cell. In this way, when the multicast configuration information of the current cell is not modified, the terminal device is prevented from re-obtaining the multicast configuration information of the current cell. This improves system flexibility.

In an embodiment of the present invention, the processing module 81 generates indication information, where the indication information may be information in DCI, and the DCI is used to schedule a multicast control channel MCCH.

Specifically, in this embodiment of the present invention, the base station generates indication information, where the indication information may be information in DCI for scheduling a multicast control channel MCCH. The base station transmits, in a PDCCH search space, DCI for scheduling an SC-MCCH. The DCI for scheduling the SC-MCCH may include an indication field of at least one bit, and the indication field may indicate that the multicast configuration information of the current cell is modified. For a specific implementation, refer to related descriptions of the terminal device side. For brevity of the application document, details are not described again herein.

In an embodiment of the present invention, the processing module 81 generates indication information, where the indication information may be information in a master information block (MIB).

Specifically, in this embodiment of the present invention, the multicast configuration information of the current cell may be directly broadcast as system information. Therefore, a SIB may be redefined in the system. Specifically, a SIB20 may be redefined, so that the SIB20 includes the multicast configuration information of the current cell. After the terminal device accesses the cell, the terminal device first obtains a MIB and a SIB. The MIB and the SIB include basic parameters configured for the cell. The terminal device may receive dedicated or common DCI on a PDCCH according to the cell configuration in the MIB and the SIB. The DCI may schedule the terminal device to receive an SC-MCCH or an SC-MTCH. The indication information generated by the base station may be included in the MIB, and the indication information is used to indicate that the multicast configuration information of the current cell is modified in the current MP or the next MP. For a specific implementation, refer to related descriptions of the terminal device side. For brevity of the application document, details are not described again herein.

In an embodiment of the present invention, the processing module 81 generates indication information, where the indication information may be information in a direct indication format (DIF), and the DIF is used to schedule a paging message of the terminal device.

Specifically, in this embodiment of the present invention, the multicast configuration information of the current cell may not be placed in an SC-MCCH logical channel for transmission, but may be directly broadcast as system information. Therefore, a SIB may be redefined in the system. Specifically, a SIB20 may be redefined, so that the SIB20 includes the multicast configuration information of the current cell. After the terminal device accesses the cell, the terminal device first obtains a MIB and a SIB. The MIB and the SIB include basic parameters configured for the cell. The terminal device may receive dedicated or common DCI on a PDCCH according to the cell configuration in the MIB and the SIB. The DCI may schedule the terminal device to receive an SC-MCCH or an SC-MTCH. The indication information generated by the base station may be included in a direct indication format (DIF) for indicating a system information modification on a paging occasion PO. The indication information may indicate that the multicast configuration information of the current cell is modified in the current MP or the next MP. For a specific implementation, refer to related descriptions of the terminal device side. For brevity of the application document, details are not described again herein.

Optionally, in this embodiment of the present invention, the multicast configuration information of the current cell includes a set of configuration information of at least one SC-MTCH in the cell, and configuration information of each MTCH in the set includes configuration information of a search space for scheduling each MTCH. It should be understood that, in this embodiment of the present invention, the configuration information of the MTCH may further include discontinuous reception (DRX) configuration information of the MTCH, a G-RNTI corresponding to a session ID of the MTCH, scheduling information of the MTCH, neighboring cell information, and the like. This is not limited in this embodiment of the present invention.

Optionally, in this embodiment of the present invention, the base station generates indication information, where the indication information may further indicate that an existing MTCH in the current cell is removed, or that an MTCH is added to the current cell, or that configuration information of an existing MTCH in the current cell is modified.

Figure 15:
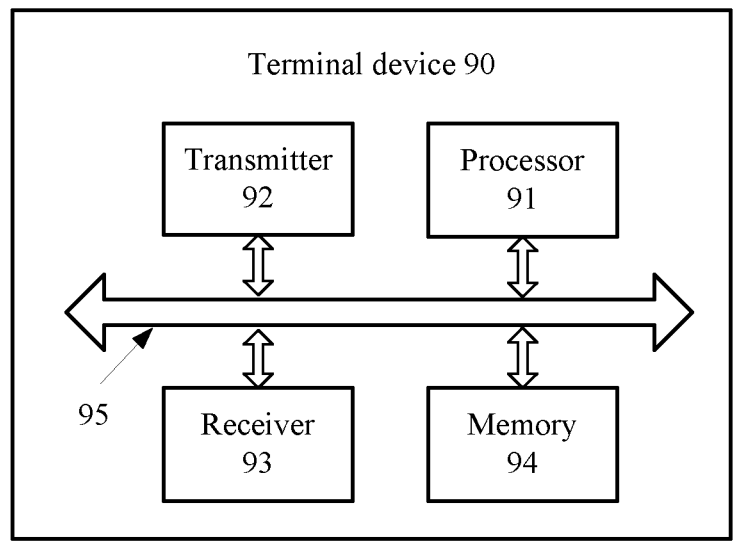
FIG. 15 is a schematic block diagram of a terminal device according to an embodiment of the present invention.

FIG. 15 shows a terminal device 90 according to an embodiment of the present invention. The terminal device 90 includes a processor 91, a transmitter 92, a receiver 93, a memory 94, and a bus system 95. The processor 91, the transmitter 92, the receiver 93, and the memory 94 are connected by the bus system 95. The memory 94 is configured to store an instruction. The processor 91 is configured to execute the instruction stored in the memory 94, so as to control the transmitter 92 to transmit a signal and control the receiver 93 to receive a signal.

The receiver 93 is configured to receive indication information transmitted by a base station, where the indication information is used to indicate that multicast configuration information of a current cell is modified in a current modification period MP or a next MP, and the indication information is included in downlink control information DCI for scheduling a multicast control channel MCCH, or included in a master information block MIB, or included in a direct indication format DIF for indicating a system information modification on a paging occasion PO.

The processor 91 is configured to obtain the multicast configuration information of the current cell according to the indication information.

Optionally, in this embodiment of the present invention, the indication information may be information in DCI, and the DCI is used to schedule a multicast control channel MCCH.

Optionally, in this embodiment of the present invention, the indication information may be information in a master information block (MIB).

Optionally, in this embodiment of the present invention, the indication information indicating that the multicast configuration information of the current cell is modified in the current modification period MP or the next MP may be information in a direct indication format (DIF), and the DIF indicates a system information modification on a paging occasion PO.

Optionally, in this embodiment of the present invention, the multicast configuration information of the current cell includes a set of configuration information of at least one SC-MTCH in the cell, and configuration information of each MTCH in the set includes configuration information of a search space for scheduling each MTCH. It should be understood that, in this embodiment of the present invention, the configuration information of the MTCH may further include discontinuous reception (DRX) configuration information of the MTCH, a G-RNTI corresponding to a session ID of the MTCH, scheduling information of the MTCH, neighboring cell information, and the like. This is not limited in this embodiment of the present invention.

Optionally, in this embodiment of the present invention, the indication information may further indicate that an existing MTCH in the current cell is removed, or that an MTCH is added to the current cell, or that configuration information of an existing MTCH in the current cell is modified.

Optionally, the memory 94 may include a read-only memory and a random access memory, and provide an instruction and data to the processor. A part of the memory may further include a non-volatile random access memory. For example, the memory may further store information about a device type. The processor 91 may be configured to execute the instruction stored in the memory, and when the processor executes the instruction, the processor can perform each step and/or procedure corresponding to the terminal device in the foregoing method embodiment.

Figure 16:
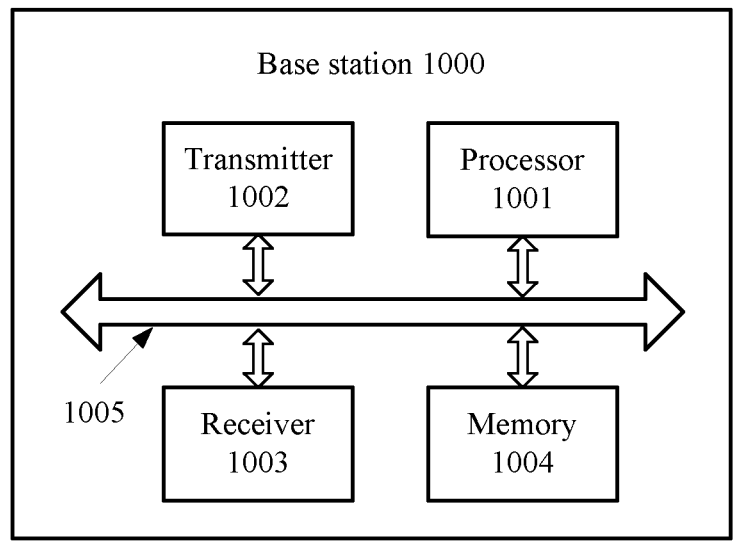
FIG. 16 is a schematic block diagram of a base station according to an embodiment of the present invention.

FIG. 16 shows a multicast-based base station 1000 according to an embodiment of the present invention. The base station 1000 includes a processor 1001, a transmitter 1002, a receiver 1003, a memory 1004, and a bus system 1005. The processor 1001, the transmitter 1002, the receiver 1003, and the memory 1004 are connected by the bus system 1005. The memory 1004 is configured to store an instruction. The processor 1001 is configured to execute the instruction stored in the memory 1004, so as to control the transmitter 1002 to transmit a signal and control the receiver 1003 to receive a signal.

The processor 1001 generates indication information, where the indication information is used to indicate that multicast configuration information of a current cell is modified in a current modification period MP or a next MP, and the indication information is included in downlink control information DCI for scheduling a multicast control channel MCCH, or included in a master information block MIB, or included in a direct indication format DIF for indicating a system information modification on a paging occasion PO.

The transmitter 1002 is configured to transmit the indication information to a terminal device.

Optionally, in this embodiment of the present invention, the indication information may be information in DCI, and the DCI is used to schedule a multicast control channel MCCH.

Optionally, in this embodiment of the present invention, the indication information may be information in a master information block (MIB).

Optionally, in this embodiment of the present invention, the indication information may be information in a direct indication format (DIF), and the DIF is used to indicate a system information modification on a paging occasion PO.

Optionally, in this embodiment of the present invention, the multicast configuration information of the current cell includes a set of configuration information of at least one SC-MTCH in the cell, and configuration information of each MTCH in the set includes configuration information of a search space for scheduling each MTCH. It should be understood that, in this embodiment of the present invention, the configuration information of the MTCH may further include discontinuous reception (DRX) configuration information of the MTCH, a G-RNTI corresponding to a session ID of the MTCH, scheduling information of the MTCH, neighboring cell information, and the like. This is not limited in this embodiment of the present invention.

Optionally, in this embodiment of the present invention, the base station generates indication information, where the indication information may further indicate that an existing MTCH in the current cell is removed, or that an MTCH is added to the current cell, or that configuration information of an existing MTCH in the current cell is modified.

Optionally, the memory 1004 may include a read-only memory and a random access memory, and provide an instruction and data to the processor. A part of the memory may further include a non-volatile random access memory. For example, the memory may further store information about a device type. The processor 1001 may be configured to execute the instruction stored in the memory, and when the processor executes the instruction stored in the memory, the processor is configured to perform each step and/or procedure in the foregoing method embodiment.

In an existing multicast service based on SC-PTM, different multicast services share a same SC-MTCH search space. When the multicast service based on SC-PTM needs to be introduced in the NB-IoT, because the NB-IoT has a higher coverage requirement than ordinary LTE (for example, a 20 dB improvement over ordinary LTE), a retransmission method needs to be used in the NB-IoT to extend multicast coverage. Different multicast services may have different coverage requirements. For example, for an NB-IoT terminal in a water metering service, because a water meter is generally installed indoors, a multicast service (marked as a multicast service 1) for updating software in a metering module of the water meter has a high multicast coverage requirement, and a coverage objective needs to be achieved by using multiple times of repetition. For a service (marked as a multicast service 2) for updating software in an NB-IoT module installed on a street lamp, because NB-IoT modules of such street lamps are generally deployed outdoors, their coverage requirements are generally not high, and the base station can meet the coverage requirements without using multiple times of repetition. Therefore, if SC-MTCHs of all multicast services share a same search space similarly to conventional SC-PTM, multiple times of repetition are also required in the multicast service 2 to transmit DCI, and therefore, a waste of downlink resources is caused.

To resolve this problem, in the present invention, when the multicast service based on SC-PTM needs to be introduced in the NB-IoT, different search spaces are configured for SC-MTCHs of different multicast services, configurations of the search spaces for the SC-MTCHs are introduced in SC-MTCH configuration information, and different maximum quantities of repetition times Rmax can be configured for search spaces for different SC-MTCHs, that is, for different SC-MTCH services, there are search spaces with different coverage requirements.

Figure 17:
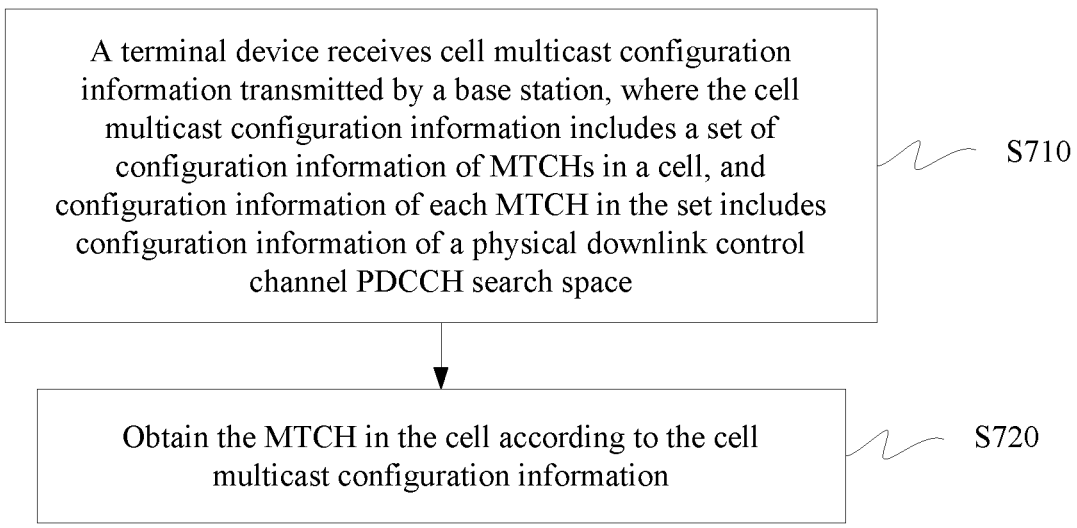
FIG. 17 is a flowchart of a multicast-based wireless communication method according to an embodiment of the present invention.

FIG. 17 shows a multicast-based wireless communication method according to an embodiment of the present invention. The method includes the following steps.

S710. A terminal device receives cell multicast configuration information transmitted by a base station, where the cell multicast configuration information includes a set of configuration information of at least one MTCH in a cell, configuration information of each MTCH in the set includes configuration information of a physical downlink control channel PDCCH search space, and the PDCCH search space is used to transmit DCI for scheduling the MTCH.

In the present invention, when a multicast service based on SC-PTM needs to be introduced in the NB-IoT, different search spaces are configured for SC-MTCHs of different multicast services, and configuration information of the search spaces for the SC-MTCHs is introduced in SC-MTCH configuration information. Therefore, there are different search spaces of DCI for scheduling the MTCHs, a quantity of times that a multicast service is retransmitted is reduced, and downlink resources are saved.

S720. Obtain the MTCH in the cell according to the cell multicast configuration information, that is, obtain multicast data.

Specifically, in this embodiment of the present invention, the terminal device may receive cell multicast configuration information transmitted by the base station, where the cell multicast configuration information includes a set of configuration information of at least one SC-MTCH in the cell, and the configuration information of each SC-MTCH in the set includes configuration information of a PDCCH search space for each SC-MTCH; and the terminal device obtains the SC-MTCH in the cell according to the cell multicast configuration information. The configuration information of the SC-MTCH may further include scheduling information of the SC-MTCH, neighboring cell information, discontinuous reception DRX configuration information of the SC-MTCH, a group radio network temporary identifier G-RNTI corresponding to a session ID of the SC-MTCH, and the like. This is not limited in this embodiment of the present invention.

Specifically, in this embodiment of the present invention, the configuration information of the PDCCH search space for the MTCH may include at least one of the following information:

a maximum quantity of times Rmax that a physical downlink control channel candidate (PDCCH Candidate) for the MTCH is transmitted repeatedly, a ratio of time occupied by the search space for the MTCH, or offset configuration information $\alpha_{offset}$. In this embodiment and subsequent embodiments, the occupancy ratio is indicated by G.

Specifically, if configuration information of a search space in configuration information of an SC-MTCH includes parameters Rmax, G, and $\alpha_{offset}$, a start subframe of the search space satisfies the following formula: $(10n_f + \lfloor n_s/2 \rfloor)$ mod $T = \alpha_{offset} \cdot T$, where $T = R_{max} \cdot G$, $n_f$ is a radio frame number of the start subframe, and $n_s$ is a timeslot number corresponding to the start subframe. The parameter Rmax indicates a quantity of consecutive available subframes occupied by the search space.

It should be understood that, the configuration information of the PDCCH search space for the MTCH may include other information. This is not limited in this embodiment of the present invention.

Specifically, in this embodiment of the present invention, different MTCHs have different MTCH search spaces.

Optionally, in this embodiment of the present invention, the cell multicast configuration information may be carried on a multicast control channel MCCH or an SC-MCCH, and may be dynamically scheduled in a preset search space by the base station by using DCI, or may be semi-persistently scheduled by using system broadcast information. If the SC-MCCH is semi-persistently scheduled by using system information, after reading a SIB, the terminal can obtain, on a corresponding resource according to scheduling information in the SIB, the SC-MCCH transmitted by the base station, and the SC-MCCH includes the cell multicast configuration information. Specifically, in this embodiment of the present invention, after the terminal device accesses the cell, the terminal device detects a search space corresponding to the SC-MCCH, obtains, from the search space, DCI for scheduling the SC-MCCH, and obtains, according to the DCI, the SC-MCCH transmitted by the base station, where the SC-MCCH includes the cell multicast configuration information.

Optionally, in this embodiment of the present invention, the cell multicast configuration information may be carried in a system information block SIB.

Specifically, in this embodiment of the present invention, after accessing the cell, the terminal device obtains a MIB and a SIB, where the SIB may include the cell multicast configuration information.

The foregoing describes in detail the multicast-based wireless communication method according to the present invention from a terminal device side. The following describes in detail a multicast-based wireless communication method according to the present invention from a base station side.

Figure 18:
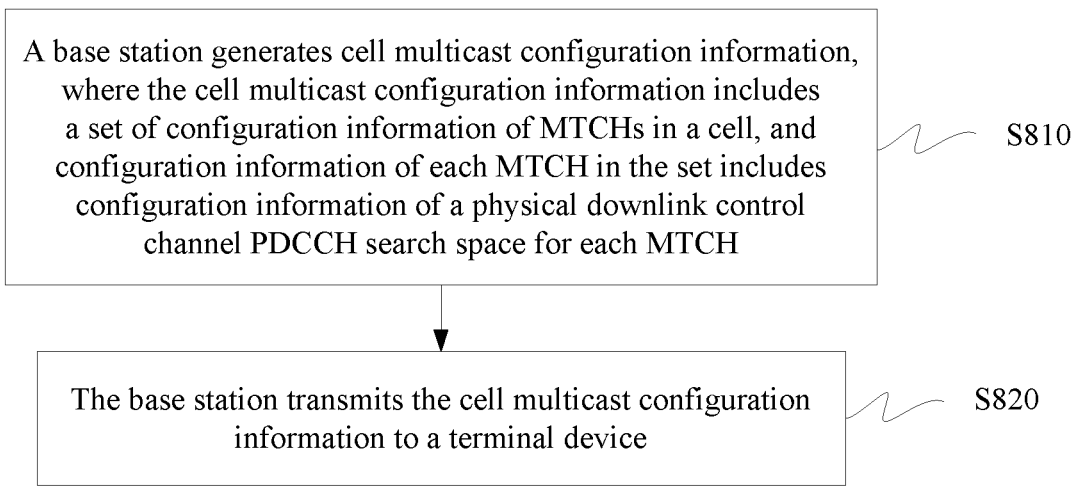
FIG. 18 is a flowchart of a multicast-based wireless communication method according to an embodiment of the present invention.

FIG. 18 shows a multicast-based wireless communication method according to an embodiment of the present invention. The method includes the following steps.

S810. A base station generates cell multicast configuration information, where the cell multicast configuration information includes a set of configuration information of at least one MTCH in a cell, and configuration information of each MTCH in the set includes configuration information of a physical downlink control channel PDCCH search space for each MTCH.

S820. The base station transmits the cell multicast configuration information to a terminal device.

In the present invention, when a multicast service based on SC-PTM needs to be introduced in the NB-IoT, different search spaces are configured for SC-MTCHs of different multicast services, and configuration information of the search spaces for the SC-MTCHs is introduced in SC-MTCH configuration information. Therefore, there are different search spaces of DCI for scheduling the MTCHs, a quantity of times that a multicast service is retransmitted is reduced, and downlink resources are saved.

Specifically, in this embodiment of the present invention, the base station may generate cell multicast configuration information, where the cell multicast configuration information includes a set of configuration information of at least one SC-MTCH in the cell, and the configuration information of each SC-MTCH in the set includes configuration information of a PDCCH search space for each SC-MTCH; and the terminal device obtains the SC-MTCH in the cell according to the cell multicast configuration information. The configuration information of the SC-MTCH may further include neighboring cell information, discontinuous reception DRX configuration information of the SC-MTCH, a group radio network temporary identifier G-RNTI corresponding to a session ID of the SC-MTCH, and the like. This is not limited in this embodiment of the present invention.

Specifically, in this embodiment of the present invention, the configuration information of the PDCCH search space for the MTCH may include at least one of the following information:

a maximum quantity of times Rmax that a physical downlink control channel candidate (PDCCH Candidate) for the MTCH is transmitted repeatedly, a ratio of time occupied by the search space for the MTCH, or offset configuration information $\alpha_{offset}$.

It should be understood that, the configuration information of the PDCCH search space for the MTCH may include other information. This is not limited in this embodiment of the present invention.

Specifically, in this embodiment of the present invention, different MTCHs have different MTCH search spaces.

Optionally, in this embodiment of the present invention, the cell multicast configuration information may be carried on a multicast control channel MCCH, and may be dynamically scheduled in a preset search space by the base station by using DCI, or may be semi-persistently scheduled by using system broadcast information.

Specifically, in this embodiment of the present invention, after the terminal device accesses the cell, the terminal device detects a search space corresponding to the SC-MCCH, obtains, from the search space, DCI for scheduling the SC-MCCH, and obtains, according to the DCI, the SC-MCCH transmitted by the base station, where the SC-MCCH includes the cell multicast configuration information. Alternatively, if the SC-MCCH is semi-persistently scheduled by using system information, after reading a SIB, the terminal obtains, on a corresponding resource according to scheduling information in the SIB, the SC-MCCH transmitted by the base station, and the SC-MCCH includes the cell multicast configuration information.

Optionally, in this embodiment of the present invention, the cell multicast configuration information may be carried in a system information block SIB.

Specifically, in this embodiment of the present invention, after the terminal device accesses the cell, the base station transmits a MIB and a SIB to the terminal device, where the SIB may include the cell multicast configuration information.

The foregoing describes the multicast-based wireless communication methods according to the present invention. The following describes in detail multicast-based wireless communications apparatuses according to the present invention.

Figure 19:
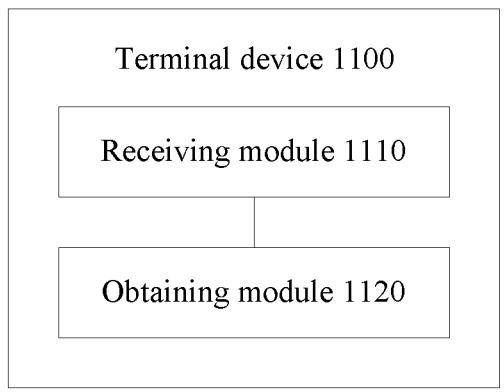
FIG. 19 is a schematic block diagram of a terminal device according to an embodiment of the present invention.

FIG. 19 shows a terminal device 1100 according to an embodiment of the present invention. The terminal device 1100 includes:

a receiving module 1110, configured to receive cell multicast configuration information transmitted by a base station, where the cell multicast configuration information includes a set of configuration information of at least one MTCH in a cell, configuration information of each MTCH in the set includes configuration information of a physical downlink control channel PDCCH search space, and the PDCCH search space is used to transmit DCI for scheduling the MTCH; and an obtaining module 1120, configured to obtain the MTCH in the cell according to the cell multicast configuration information.

Specifically, in this embodiment of the present invention, the terminal device may receive cell multicast configuration information transmitted by the base station, where the cell multicast configuration information includes a set of configuration information of at least one SC-MTCH in the cell, and the configuration information of each SC-MTCH in the set includes configuration information of a PDCCH search space for each SC-MTCH; and the terminal device obtains the SC-MTCH in the cell according to the cell multicast configuration information. The configuration information of the SC-MTCH may further include neighboring cell information, discontinuous reception DRX configuration information of the SC-MTCH, a group radio network temporary identifier G-RNTI corresponding to a session ID of the SC-MTCH, and the like. This is not limited in this embodiment of the present invention.

Specifically, in this embodiment of the present invention, the configuration information of the PDCCH search space for the MTCH may include at least one of the following information:

a maximum quantity of times Rmax that a physical downlink control channel candidate (PDCCH Candidate) for the MTCH is transmitted repeatedly, a ratio of time occupied by the search space for the MTCH, or offset configuration information $\alpha_{offset}$.

It should be understood that, the configuration information of the PDCCH search space for the MTCH may include other information. This is not limited in this embodiment of the present invention.

Specifically, in this embodiment of the present invention, different MTCHs have different MTCH search spaces.

In this embodiment of the present invention, the cell multicast configuration information may be carried on a multicast control channel MCCH or an SC-MCCH, and may be dynamically scheduled in a preset search space by the base station by using DCI, or may be semi-persistently scheduled by using system broadcast information.

Specifically, in this embodiment of the present invention, after the terminal device accesses the cell, the terminal device detects a search space corresponding to the SC-MCCH, obtains, from the search space, DCI for scheduling the SC-MCCH, and obtains, according to the DCI, the SC-MCCH transmitted by the base station, where the SC-MCCH includes the cell multicast configuration information. Alternatively, if the SC-MCCH is semi-persistently scheduled by using system information, after reading a SIB, the terminal obtains, on a corresponding resource according to scheduling information in the SIB, the SC-MCCH transmitted by the base station, and the SC-MCCH includes the cell multicast configuration information.

Optionally, in this embodiment of the present invention, the cell multicast configuration information may be carried in a system information block SIB.

Specifically, in this embodiment of the present invention, after accessing the cell, the terminal device obtains a MIB and a SIB, where the SIB may include the cell multicast configuration information.

It should be understood that, the terminal device 1100 according to this embodiment of the present invention may correspond to the terminal device in the method embodiment of the present invention, and the foregoing and other operations and/or functions of each module in the terminal device 1100 are intended to implement the corresponding procedure of the method in FIG. 17. For brevity, details are not described again herein.

Figure 20:
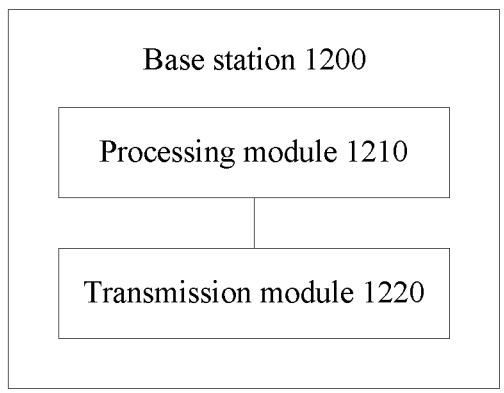
FIG. 20 is a schematic block diagram of a base station according to an embodiment of the present invention.

FIG. 20 shows a base station 1200 according to the present invention. The base station 1200 includes:

a processing module 1210, configured to generate cell multicast configuration information, where the cell multicast configuration information includes a set of configuration information of MTCHs in a cell, and configuration information of each MTCH in the set includes configuration information of a physical downlink control channel PDCCH search space for each MTCH; and a transmission module 1220, configured to transmit the cell multicast configuration information to a terminal device.

Specifically, in this embodiment of the present invention, the base station may generate cell multicast configuration information, where the cell multicast configuration information includes a set of configuration information of at least one SC-MTCH in the cell, and the configuration information of each SC-MTCH in the set includes configuration information of a PDCCH search space for each SC-MTCH; and the terminal device obtains the SC-MTCH in the cell according to the cell multicast configuration information. The configuration information of the SC-MTCH may further include discontinuous reception DRX configuration information of the SC-MTCH, neighboring cell information, a group radio network temporary identifier G-RNTI corresponding to a session ID of the SC-MTCH, and the like. This is not limited in this embodiment of the present invention.

Specifically, in this embodiment of the present invention, the configuration information of the PDCCH search space for the MTCH may include at least one of the following information:

a maximum quantity of times Rmax that a physical downlink control channel candidate (PDCCH Candidate) for the MTCH is transmitted repeatedly, a ratio of time occupied by the search space for the MTCH, or offset configuration information $\alpha_{offset}$.

It should be understood that, the configuration information of the PDCCH search space for the MTCH may include other information. This is not limited in this embodiment of the present invention.

Specifically, in this embodiment of the present invention, different MTCHs have different MTCH search spaces.

Optionally, the cell multicast configuration information may be carried on a multicast control channel MCCH or an SC-MCCH, and may be dynamically scheduled in a preset search space by the base station by using DCI, or may be semi-persistently scheduled by using system broadcast information.

Optionally, in this embodiment of the present invention, the cell multicast configuration information may be carried in a system information block SIB.

Specifically, in this embodiment of the present invention, after the terminal device accesses the cell, the base station transmits a MIB and a SIB to the terminal device, where the SIB may include the cell multicast configuration information.

It should be understood that, the base station 1200 according to this embodiment of the present invention may correspond to the base station in the method embodiment of the present invention, and the foregoing and other operations and/or functions of each module in the base station 1200 are intended to implement the corresponding procedure of the method in FIG. 18. For brevity, details are not described again herein.

Figure 21:
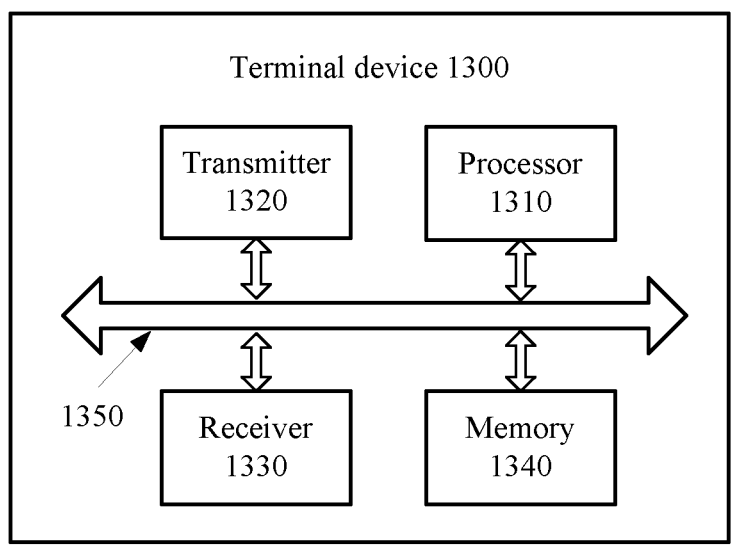
FIG. 21 is a schematic block diagram of a terminal device according to an embodiment of the present invention.

FIG. 21 shows a terminal device 1300 according to an embodiment of the present invention. The terminal device 1300 includes a receiver 1330, a processor 1310, a transmitter 1320, a memory 1340, and a bus system 1350. The receiver 1330, the processor 1310, the transmitter 1320, and the memory 1340 are connected by the bus system 1350. The memory 1340 is configured to store an instruction. The processor 1310 is configured to execute the instruction stored in the memory 1340, so as to control the receiver 1330 to receive a signal and control the transmitter 1320 to transmit a signal.

The receiver 1330 is configured to receive cell multicast configuration information transmitted by a base station, where the cell multicast configuration information includes a set of configuration information of MTCHs in a cell, configuration information of each MTCH in the set includes configuration information of a physical downlink control channel PDCCH search space, and the PDCCH search space is used to transmit DCI for scheduling the MTCH.

The processor 1310 is configured to obtain the MTCH in the cell according to the cell multicast configuration information.

Specifically, in this embodiment of the present invention, the terminal device may receive cell multicast configuration information transmitted by the base station, where the cell multicast configuration information includes a set of configuration information of at least one SC-MTCH in the cell, and the configuration information of each SC-MTCH in the set includes configuration information of a PDCCH search space for each SC-MTCH; and the terminal device obtains the SC-MTCH in the cell according to the cell multicast configuration information. The configuration information of the SC-MTCH may further include neighboring cell information, discontinuous reception DRX configuration information of the SC-MTCH, a group radio network temporary identifier G-RNTI corresponding to a session ID of the SC-MTCH, and the like. This is not limited in this embodiment of the present invention.

Specifically, in this embodiment of the present invention, the configuration information of the PDCCH search space for the MTCH may include at least one of the following information:

a maximum quantity of times Rmax that a physical downlink control channel candidate (PDCCH Candidate) for the MTCH is transmitted repeatedly, a ratio of time occupied by the search space for the MTCH, or offset configuration information $\alpha_{offset}$.

It should be understood that, the configuration information of the PDCCH search space for the MTCH may include other information. This is not limited in this embodiment of the present invention.

Specifically, in this embodiment of the present invention, different MTCHs have different MTCH search spaces.

Optionally, in this embodiment of the present invention, the cell multicast configuration information may be carried on a multicast control channel MCCH or an SC-MCCH, and may be dynamically scheduled in a preset search space by the base station by using DCI, or may be semi-persistently scheduled by using system broadcast information.

Specifically, in this embodiment of the present invention, after the terminal device accesses the cell, the terminal device detects a search space corresponding to the SC-MCCH, obtains, from the search space, DCI for scheduling the SC-MCCH, and obtains, according to the DCI, the SC-MCCH transmitted by the base station, where the SC-MCCH includes the cell multicast configuration information. Alternatively, if the SC-MCCH is semi-persistently scheduled by using system information, after reading a SIB, the terminal obtains, on a corresponding resource according to scheduling information in the SIB, the SC-MCCH transmitted by the base station, and the SC-MCCH includes the cell multicast configuration information.

Optionally, in this embodiment of the present invention, the cell multicast configuration information may be carried in a system information block SIB.

Specifically, in this embodiment of the present invention, after accessing the cell, the terminal device obtains a MIB and a SIB, where the SIB may include the cell multicast configuration information.

It should be understood that, the terminal device 1300 may be specifically the terminal device in the foregoing embodiment, and may be configured to perform each step and/or procedure corresponding to the terminal device in the foregoing method embodiment. Optionally, the memory 1340 may include a read-only memory and a random access memory, and provide an instruction and data to the processor. A part of the memory may further include a non-volatile random access memory. For example, the memory may further store information about a device type. The processor 1310 may be configured to execute the instruction stored in the memory, and when the processor executes the instruction, the processor can perform each step and/or procedure corresponding to the terminal device in the foregoing method embodiment.

FIG. 22 shows a base station 1400 according to an embodiment of the present invention. The base station 1400 includes a receiver 1430, a processor 1410, a transmitter 1420, a memory 1440, and a bus system 1450. The receiver 1430, the processor 1410, the transmitter 1420, and the memory 1440 are connected by the bus system 1450. The memory 1440 is configured to store an instruction. The processor 1410 is configured to execute the instruction stored in the memory 1440, so as to control the receiver 1430 to receive a signal and control the transmitter 1420 to transmit a signal.

The processor 1410 is configured to generate cell multicast configuration information, where the cell multicast configuration information includes a set of configuration information of MTCHs in a cell, and configuration information of each MTCH in the set includes configuration information of a physical downlink control channel PDCCH search space for each MTCH. The transmitter 1420 is configured to transmit the cell multicast configuration information to a terminal device.

Specifically, in this embodiment of the present invention, the base station may generate cell multicast configuration information, where the cell multicast configuration information includes a set of configuration information of at least one SC-MTCH in the cell, and the configuration information of each SC-MTCH in the set includes configuration information of a PDCCH search space for each SC-MTCH; and the terminal device obtains the SC-MTCH in the cell according to the cell multicast configuration information. The configuration information of the SC-MTCH may further include neighboring cell information, discontinuous reception DRX configuration information of the SC-MTCH, a group radio network temporary identifier G-RNTI corresponding to a session ID of the SC-MTCH, and the like. This is not limited in this embodiment of the present invention.

Specifically, in this embodiment of the present invention, the configuration information of the PDCCH search space for the MTCH may include at least one of the following information:

a maximum quantity of times Rmax that a physical downlink control channel candidate (PDCCH Candidate) for the MTCH is transmitted repeatedly, a ratio of time occupied by the search space for the MTCH, or offset configuration information $\alpha_{offset}$.

It should be understood that, the configuration information of the PDCCH search space for the MTCH may include other information. This is not limited in this embodiment of the present invention.

Specifically, in this embodiment of the present invention, different MTCHs have different MTCH search spaces.

Optionally, in this embodiment of the present invention, the cell multicast configuration information may be carried on a multicast control channel MCCH or an SC-MCCH, and may be dynamically scheduled in a preset search space by the base station by using DCI, or may be semi-persistently scheduled by using system broadcast information.

Specifically, in this embodiment of the present invention, after the terminal device accesses the cell, the terminal device detects a search space corresponding to the SC-MCCH, obtains, from the search space, DCI for scheduling the SC-MCCH, and obtains, according to the DCI, the SC-MCCH transmitted by the base station, where the SC-MCCH includes the cell multicast configuration information. Alternatively, if the SC-MCCH is semi-persistently scheduled by using system information, after reading a SIB, the terminal obtains, on a corresponding resource according to scheduling information in the SIB, the SC-MCCH transmitted by the base station, and the SC-MCCH includes the cell multicast configuration information. Optionally, in this embodiment of the present invention, the cell multicast configuration information may be carried in a system information block SIB.

Specifically, in this embodiment of the present invention, after the terminal device accesses the cell, the base station transmits a MIB and a SIB to the terminal device, where the SIB may include the cell multicast configuration information.

It should be understood that, the device 1400 may be specifically the terminal device in the foregoing embodiment, and may be configured to perform each step and/or procedure corresponding to the terminal device in the foregoing method embodiment. Optionally, the memory 1440 may include a read-only memory and a random access memory, and provide an instruction and data to the processor. A part of the memory may further include a non-volatile random access memory. For example, the memory may further store information about a device type. The processor 1410 may be configured to execute the instruction stored in the memory, and when the processor executes the instruction, the processor can perform each step and/or procedure corresponding to the terminal device in the foregoing method embodiment.

In a CIoT system, for a terminal device that has high requirements on power consumption and terminal costs, a capability of the terminal device is always limited. When such a terminal device in an idle state receives a multicast service, the terminal device is always incapable of monitoring and receiving paging information simultaneously. For example, in an NB-IoT system, if an NB-IoT terminal needs to monitor an SC-PTM multicast service, the NB-IoT terminal needs to monitor a search space for an SC-MTCH continuously on a physical resource block (PRB) (marked as a PRB1) on which the SC-MTCH is located, and receive the SC-MTCH according to detected DCI. If the NB-IoT terminal device is in an idle state in this case, but all paging messages in a cell are transmitted only on a PRB2, the NB-IoT terminal cannot simultaneously receive, on a corresponding paging occasion (PO), the multicast service on the PRB1 and a paging message that may be transmitted on the PRB. In this case, because bandwidth of the NB-IoT terminal is one PRB, the NB-IoT terminal can work only on one PRB. Therefore, when the multicast service based on SC-PTM is introduced in the NB-IoT, a problem about how the terminal device receives paging needs to be resolved.

In an embodiment of the present invention, when an NB-IoT terminal in an idle state receives a multicast service, on every paging occasion (PO) of the NB-IoT terminal, if the NB-IoT terminal is receiving a single cell multicast control channel (SC-MCCH) or a single cell multicast traffic channel (SC-MTCH)SC-MTCH, and if the NB-IoT terminal preferentially receives a paging message on every paging occasion, the terminal device stops receiving the SC-MCCH or SC-MTCH that is currently being received, but detects, in a common search space (CSS) corresponding to the paging of the terminal device, whether the terminal device is paged.

The present invention provides a multicast-based wireless communication method to resolve a problem that on every PO of a terminal device, if the terminal device stops receiving an SC-MCCH or an SC-MTCH that is currently being received but receives paging information that may exist on a PRB on which the paging message of the terminal device is located, great adverse impact is caused on a multicast service that is currently being received.

FIG. 23 shows a multicast-based wireless communication method according to the present invention. The method includes the following steps.

S910. In a process of receiving a multicast traffic channel MTCH or a multicast control channel MCCH, a terminal device receives downlink control information DCI transmitted by a base station, where the DCI is used to schedule the MTCH or the MCCH, the DCI includes indication information, and the indication information is used to indicate whether paging of the terminal device exists in a preset time-frequency resource.

S920. If the terminal device determines that the paging scheduled does not exist in the preset time-frequency resource, the terminal device does not monitor a search space corresponding to the paging in the preset time-frequency resource; or if the terminal device determines that the paging scheduled exists in the preset time-frequency resource, and at least one paging occasion of the terminal device exists in the preset time-frequency resource, the terminal device monitors a search space corresponding to the paging on the paging occasion, and stops receiving the MTCH or the MCCH.

In this embodiment of the present invention, the indication information included in the DCI for scheduling the MTCH or the MCCH is used to indicate whether the paging of the terminal device exists in the preset time-frequency resource; and if the paging does not exist in the preset time-frequency resource, the terminal device does not monitor the search space corresponding to the paging in the preset time-frequency resource, and the terminal device may not receive the paging message of the terminal device on the target paging occasion, but continues to monitor a search space for the SC-MTCH or a search space for the SC-MCCH and continues to receive the SC-MTCH or the SC-MCCH according to the DCI corresponding to the SC-MTCH or the SC-MCCH. This avoids great adverse impact caused on a multicast service if the mobile terminal still stops receiving the SC-MCCH or the SC-MTCH when the paging message of the mobile terminal does not exist on the target paging occasion PO.

Specifically, in this embodiment of the present invention, in the process of receiving the SC-MTCH or the SC-MCCH, the terminal device first detects, in a search space corresponding to an NPDCCH, the DCI for scheduling the SC-MCCH or the MTCH. It should be understood that, in this embodiment of the present invention, when the terminal device continuously monitors, in the search space corresponding to the NPDCCH, the DCI for scheduling the SC-MTCH, the terminal device is incapable of detecting DCI for scheduling a paging message. Therefore, when the terminal device detects, in the search space corresponding to the NPDCCH, the DCI for scheduling the SC-MTCH, the DCI for scheduling the SC-MTCH may include indication information used to indicate whether the terminal device is paged in the preset time-frequency resource; or when the terminal device monitors, in the search space corresponding to the NPDCCH, the DCI for scheduling the SC-MCCH, the DCI for scheduling the SC-MCCH may include indication information used to indicate whether the terminal device is paged in the preset time-frequency resource.

It should be understood that, in this embodiment of the present invention, the indication information used to indicate whether the terminal device is paged in the preset time-frequency resource may be included in not only the DCI for scheduling the SC-MCCH but also the DCI for scheduling the SC-MTCH. The terminal device monitors, in NPDCCH search spaces corresponding to the SC-MCCH and the SC-MTCH, according to service requirements of the terminal device, first DCI for scheduling the SC-MCCH and second DCI for scheduling the SC-MTCH. Both the first DCI and the second DCI may include the indication information indicating whether the paging exists in the preset time-frequency resource. The terminal device can determine whether to detect and receive the paging message in the preset time-frequency resource according to the indication information in the first DCI and the indication information in the second DCI. If the terminal device determines that the paging exists in the preset time-frequency resource, and at least one paging occasion PO of the terminal device exists in the preset time-frequency resource, the terminal device monitors, on the paging occasion PO, the search space corresponding to the paging, and may stop receiving the MTCH or the MCCH. If the terminal device determines that the paging does not exist in the preset time-frequency resource, the terminal device does not monitor the search space corresponding to the paging in the preset time-frequency resource. This avoids great adverse impact caused on multicast service reception if the terminal device still stops receiving the SC-MTCH or the SC-MCCH that is currently being received when the paging message of the terminal device does not exist in the preset time-frequency resource.

Specifically, in an SC-PTM technology, in the process of receiving the SC-MTCH or the SC-MTCH transmitted by the base station, the terminal device can monitor, in the search space corresponding to the NPDCCH, the DCI for scheduling the SC-MCCH or the DCI for scheduling the SC-MTCH. It should be understood that, the search space corresponding to the SC-MCCH may be configured by using system information, but the search space for the SC-MTCH may be configured by using multicast configuration information corresponding to the SC-MTCH in a multicast configuration message of a current cell. When the terminal device monitors the DCI for scheduling the SC-MCCH, the DCI for scheduling the SC-MCCH may include an indication field of at least one bit. For example, when a value of a bit 0 in the indication field is 1, the indication information indicates that the terminal device is paged in the preset time-frequency resource, or when a value of the bit 0 is 0, the indication information indicates that the terminal device is not paged in the preset time-frequency resource. Certainly, an indication field of at least one bit may be included in the DCI for scheduling the SC-MTCH and used to indicate whether the terminal device is paged in the preset time-frequency resource.

Optionally, the preset time-frequency resource is a time-frequency resource for transmitting the paging in a preset period; or the preset time-frequency resource is a time-frequency resource for transmitting the paging in a period of time occupied by the SC-MTCH or the SC-MCCH scheduled by the DCI.

Figure 24:
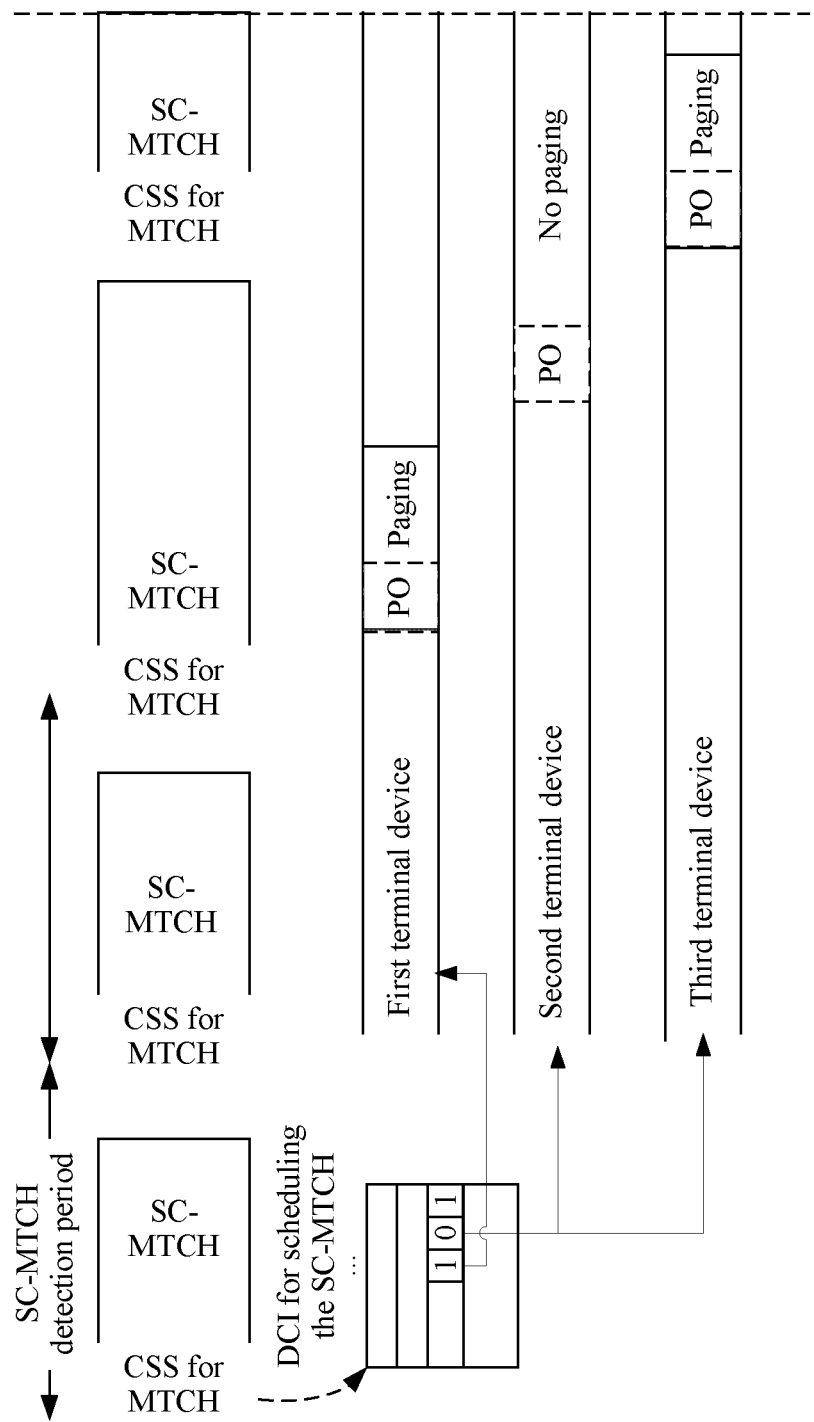
FIG. 24 is a schematic diagram of a method for indicating paging by using indication information according to an embodiment of the present invention.

In the process of receiving the SC-MTCH or SC-MCCH transmitted by the base station, the terminal device can learn, by detecting the indication information in the DCI for scheduling the SC-MCCH or SC-MTCH on the NPDCCH, whether the terminal device is paged in the preset time-frequency resource. For example, FIG. 24 shows an indication field including three bits in the DCI for scheduling the SC-MTCH. Assuming that the terminal device is a first terminal device in FIG. 24, the first terminal device detects a bit 0 including indication information in the DCI; when the bit 0 is 1, the indication information indicates that the first terminal device is paged in the preset time-frequency resource; when the bit 0 is 0, the indication information indicates that the first terminal device is not paged in the preset time-frequency resource. It should be understood that, the preset time-frequency resource is a time-frequency resource for transmitting the paging in a preset period, or may be a time-frequency resource for transmitting the paging in a period of time occupied by the terminal device for receiving the SC-MTCH or the SC-MCCH.

Optionally, in this embodiment of the present invention, an indication field position of the indication information may be specifically mapped to a device identity of the terminal device according to a preset rule. In the process of receiving the SC-MTCH or the SC-MCCH, the terminal can obtain by mapping, according to a private identity (ID) of the terminal device, the indication field position corresponding to the terminal device, and then further determine, by checking the indication field position obtained from the mapping in the DCI for scheduling the SC-MTCH or SC-MCCH, whether the terminal is paged in the preset time-frequency resource. For example, FIG. 24 shows an indication field including three bits in the DCI for scheduling the SC-MTCH. For the first terminal device in FIG. 24, an indication field position corresponding to the device ID of the first terminal device that is obtained according to the preset rule may be a bit 0. In this case, the first terminal device may check indication field information of the bit 0 in the DCI for scheduling the SC-MTCH, and may further determine whether the terminal is paged in a preset next period. It should be understood that, a second terminal device can obtain, by mapping according to a device ID of the second terminal device and according to the preset rule, that an indication field position corresponding to the device ID is a bit 1, and a third terminal can obtain, by mapping according to a device ID of the third terminal device and according to the preset rule, that an indication field position corresponding to the device ID is a bit 2. The second terminal and the third terminal can check the bit 1 and the bit 2 in the corresponding indication field in the DCI for scheduling the SC-MTCH. If the bit corresponding to the terminal device is set to 1, the indication information indicates that paging of the terminal device exists on a paging occasion PO in the preset time-frequency resource. Therefore, the terminal device may stop receiving the multicast service but receive paging information on the corresponding paging occasion PO. When the bit corresponding to the terminal device is set to 0, the terminal can learn that no paging exists in the preset time-frequency resource. In this case, the terminal device stops monitoring, in the preset time-frequency resource, the search space corresponding to the paging, but continues to receive the multicast service. Certainly, FIG. 24 shows only that the DCI for scheduling the SC-MTCH includes three bits for indicating whether the terminal device is paged. However, this embodiment of the present invention is not limited thereto.

Therefore, in this embodiment of the present invention, at least one bit may be added to the DCI for scheduling the SC-MTCH. A position of each bit in the at least one bit may correspond to different terminal devices according to the preset rule. For example, as shown in FIG. 24, the bit 0 in the three bits in the DCI for scheduling the SC-MTCH is used to indicate the device identity of the first terminal device, and the bit 2 is used to indicate the device identity of the third terminal device. Certainly, a same indication method may be used in the DCI for scheduling the SC-MCCH. For brevity, details are not described again herein.

It should be understood that, in this embodiment of the present invention, a bit position of at least one bit in the DCI may further correspond to indexes of different time-frequency resources. For example, in this embodiment of the present invention, the bit 0 may correspond to a time-frequency resource whose resource index value is 0, and the bit 1 may correspond to a time-frequency resource whose resource index value is 1. This is not limited in the present invention.

Optionally, in this embodiment of the present invention, a correspondence between a position of a bit in at least one bit in the DCI for scheduling the SC-MCCH or the SC-MTCH and different resource indexes may be established by modulo mapping.

It should be understood that, in this embodiment of the present invention, a correspondence between an indication field of at least one bit in the DCI for scheduling the SC-MTCH and different resource blocks may be further established according to another rule. This is not limited in the present invention. For example, a correspondence between at least one bit in the DCI and different resource blocks may be further set according to a hash value of the device identity ID of the terminal device.

It should also be understood that, in this embodiment of the present invention, the DCI for scheduling the SC-MTCH may include indication information in the same way as the DCI for scheduling the SC-MTCH includes indication information. For brevity of the application document, details are not described again herein.

Specifically, in this embodiment of the present invention, when the terminal device monitors, in the PDCCH search space, the DCI for scheduling the MCCH, the DCI includes an indication about whether the terminal device is paged on a paging occasion PO in the preset time-frequency resource.

Optionally, in this embodiment of the present invention, the preset time-frequency resource may be a time-frequency resource that may be occupied by a corresponding paging message on a paging occasion in an MP next to a modification period (MP) of the SC-MCCH on which the terminal device receives the current multicast service and by DCI for scheduling the paging message.

Optionally, in this embodiment of the present invention, the preset time-frequency resource may be a time-frequency resource that may be occupied by a corresponding paging message on a paging occasion in a next MP of the SC-MCCH on which the terminal device receives the current multicast service and by DCI for scheduling the paging message.

The foregoing describes in detail the multicast-based wireless communication method according to the embodiment of the present invention from a terminal device side.

The following describes in detail a multicast-based wireless communication method according to an embodiment of the present invention from a base station side.

Figure 25:
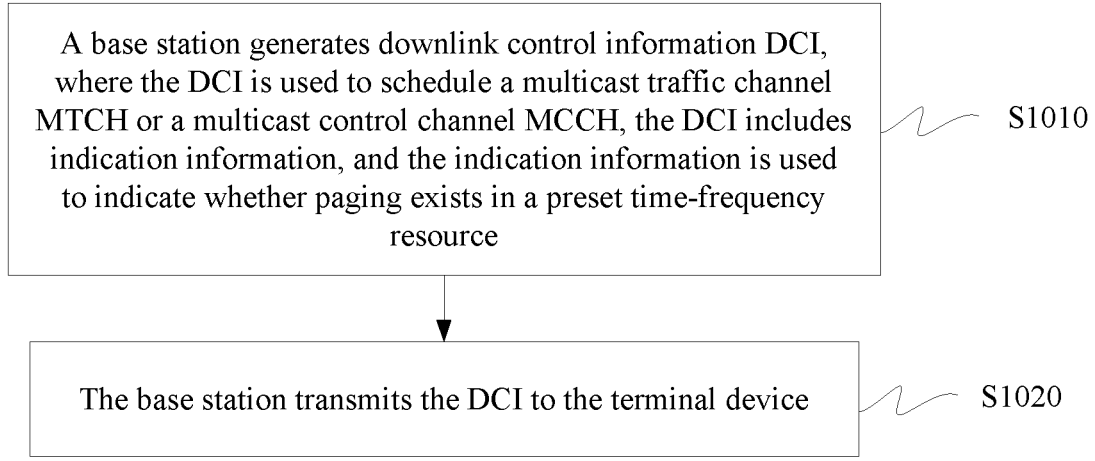
FIG. 25 is a flowchart of a multicast-based wireless communication method according to an embodiment of the present invention.

FIG. 25 shows a multicast-based wireless communication method according to the present invention. The method includes the following steps.

S1010. A base station generates downlink control information DCI, where the DCI is used to schedule a multicast traffic channel MTCH or a multicast control channel MCCH, the DCI includes indication information, and the indication information is used to indicate whether paging exists in a preset time-frequency resource.

S1020. The base station transmits the DCI to the terminal device.

In the technical solution of the present invention, the DCI generated by the base station and used for scheduling the SC-MTCH and the SC-MCCH includes the indication information, and the indication information is used to indicate whether the terminal device is paged in the preset time-frequency resource. This avoids great adverse impact caused on a multicast service if the mobile terminal still stops receiving the MCCH or the MTCH when no paging message from the base station for the mobile terminal exists in the preset time-frequency resource.

It should be understood that, in this embodiment of the present invention, the indication information is used to indicate whether the paging of the terminal device exists on the PO in the preset time-frequency resource. For a specific implementation thereof, refer to related descriptions of the terminal device side. For brevity of the application document, details are not described again herein.

The foregoing describes in detail the multicast-based wireless communication methods according to the embodiments of the present invention. The following describes in detail multicast-based wireless communications apparatuses according to an embodiment of the present invention.

Figure 26:
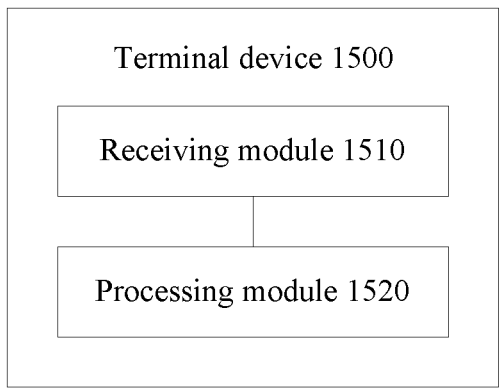
FIG. 26 is a schematic block diagram of a terminal device according to an embodiment of the present invention.

FIG. 26 shows a terminal device 1500 according to an embodiment of the present invention. The terminal device 1500 includes:

a receiving module 1510, configured to receive downlink control information DCI transmitted by a base station, where the DCI is used to schedule the MTCH or the MCCH, the DCI includes indication information, and the indication information is used to indicate whether paging of the terminal device exists in a preset time-frequency resource; and a processing module 1520, configured to: when the terminal device determines that the paging scheduled does not exist in the preset time-frequency resource, skip monitoring a search space corresponding to the paging in the preset time-frequency resource; or when the terminal device determines that the paging scheduled exists in the preset time-frequency resource, and at least one paging occasion of the terminal device exists in the preset time-frequency resource, monitor a search space corresponding to the paging on the paging occasion, and stop receiving the MTCH or the MCCH.

In this embodiment of the present invention, the indication information included in the DCI for scheduling the MTCH and the MCCH is used to indicate whether the paging of the terminal device exists in the preset time-frequency resource; and if the paging does not exist in the preset time-frequency resource, the terminal device does not monitor the search space corresponding to the paging in the preset time-frequency resource, and the terminal device does not receive the paging message of the terminal device on the target paging occasion, but continues to monitor a search space for the SC-MTCH or a search space for the SC-MCCH and continues to receive the SC-MTCH or the SC-MCCH. This avoids great adverse impact caused on a multicast service if the mobile terminal still stops receiving the SC-MCCH or the SC-MTCH when the paging message of the mobile terminal does not exist on the target paging occasion PO.

Optionally, the preset time-frequency resource is a time-frequency resource for transmitting the paging in a preset period; or the preset time-frequency resource is a time-frequency resource for transmitting the paging in a period of time occupied by the terminal device for receiving the SC-MTCH or the SC-MCCH.

Figure 27:
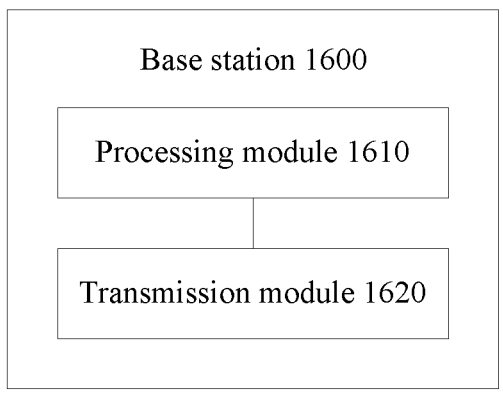
FIG. 27 is a schematic block diagram of a base station according to an embodiment of the present invention.

FIG. 27 shows a base station 1600 according to an embodiment of the present invention. The apparatus may be a base station that communicates with a terminal device. The base station 1600 includes:

a processing module 1610, configured to generate downlink control information DCI, where the DCI is used to schedule a multicast traffic channel MTCH or a multicast control channel MCCH, the DCI includes indication information, and the indication information is used to indicate whether paging exists in a preset time-frequency resource; and a transmission module 1620, configured to transmit the indication information to a terminal device.

In the technical solution of the present invention, the DCI generated by the base station and used for scheduling the SC-MTCH and the SC-MCCH includes the indication information, and the indication information is used to indicate whether the terminal device is paged in the preset time-frequency resource. This avoids great adverse impact caused on a multicast service if the mobile terminal still stops receiving the MCCH or the MTCH when no paging message from the base station for the mobile terminal exists in the preset time-frequency resource.

It should also be understood that, the foregoing and other operations and/or functions of each module in the base station 1600 are intended to implement the corresponding procedure of the method in FIG. 25. Details are not described again herein for brevity.

Figure 28:
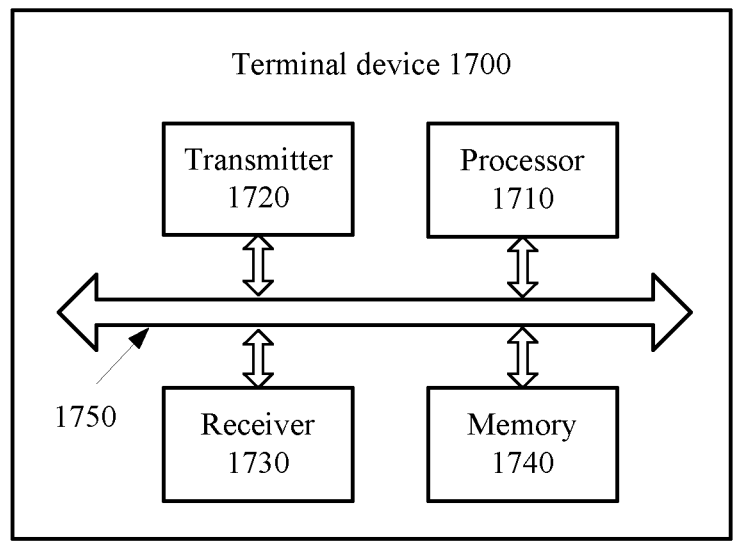
FIG. 28 is a schematic block diagram of a terminal device according to an embodiment of the present invention.

FIG. 28 shows a terminal device 1700 according to an embodiment of the present invention. The terminal device 1700 includes a receiver 1730, a processor 1710, a transmitter 1720, a memory 1740, and a bus system 1750. The receiver 1730, the processor 1710, the transmitter 1720, and the memory 1740 are connected by the bus system 1750. The memory 1740 is configured to store an instruction. The processor 1710 is configured to execute the instruction stored in the memory 1740, so as to control the receiver 1730 to receive a signal and control the transmitter 1720 to transmit a signal.

The receiver 1730 is configured to receive downlink control information DCI transmitted by a base station, where the DCI is used to schedule the MTCH or the MCCH, the DCI includes indication information, and the indication information is used to indicate whether paging of the terminal device exists in a preset time-frequency resource.

The processor 1710 is configured to: when the terminal device determines that the paging scheduled does not exist in the preset time-frequency resource, stop monitoring a search space corresponding to the paging in the preset time-frequency resource; or when the terminal device determines that the paging scheduled exists in the preset time-frequency resource, and at least one paging occasion PO of the terminal device exists in the preset time-frequency resource, monitor a search space corresponding to the paging on the paging occasion, and stop receiving the MTCH or the MCCH.

Optionally, the preset time-frequency resource is a time-frequency resource for transmitting the paging in a preset period; or the preset time-frequency resource is a time-frequency resource for transmitting the paging in a period of time occupied by the SC-MTCH or the SC-MCCH scheduled by the DCI.

Optionally, the memory 1740 may include a read-only memory and a random access memory, and provide an instruction and data to the processor. A part of the memory may further include a non-volatile random access memory. For example, the memory may further store information about a device type. The processor 1710 may be configured to execute the instruction stored in the memory, and when the processor executes the instruction, the processor can perform each step and/or procedure corresponding to the terminal device in the foregoing method embodiment.

Figure 29:
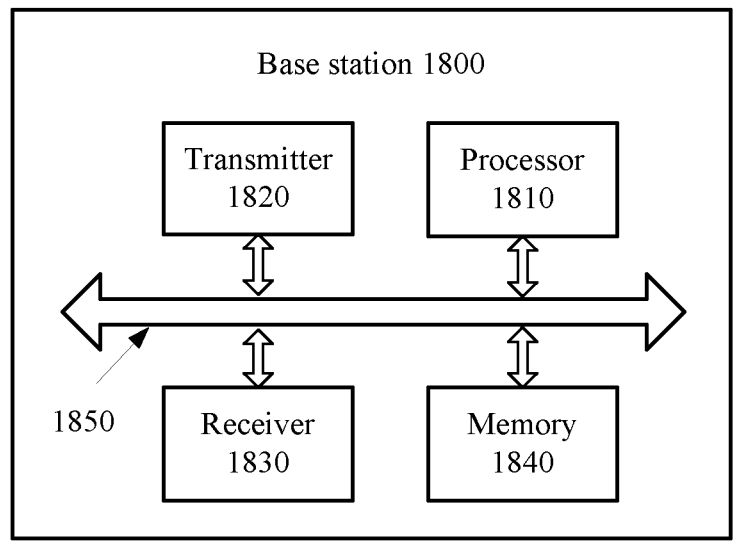
FIG. 29 is a schematic block diagram of a base station according to an embodiment of the present invention.

FIG. 29 shows a base station 1800 according to an embodiment of the present invention. The base station 1800 includes a receiver 1830, a processor 1810, a transmitter 1820, a memory 1840, and a bus system 1850. The receiver 1830, the processor 1810, the transmitter 1820, and the memory 1840 are connected by the bus system 1850. The memory 1840 is configured to store an instruction. The processor 1810 is configured to execute the instruction stored in the memory 1840, so as to control the receiver 1830 to receive a signal and control the transmitter 1820 to transmit a signal.

The processor 1810 is configured to generate downlink control information DCI, where the DCI is used to schedule a multicast traffic channel MTCH or a multicast control channel MCCH, the DCI includes indication information, and the indication information is used to indicate whether paging exists in a preset time-frequency resource.

The transmitter 1820 is configured to transmit the DCI to the terminal device.

Optionally, the preset time-frequency resource is a time-frequency resource for transmitting the paging in a preset period; or the preset time-frequency resource is a time-frequency resource for transmitting the paging in a period of time occupied by the SC-MTCH or the SC-MCCH scheduled by the DCI.

Optionally, the memory 1840 may include a read-only memory and a random access memory, and provide an instruction and data to the processor. A part of the memory may further include a non-volatile random access memory. For example, the memory may further store information about a device type. The processor 1810 may be configured to execute the instruction stored in the memory, and when the processor executes the instruction, the processor can perform each step and/or procedure corresponding to the terminal device in the foregoing method embodiment.

Figure 30:
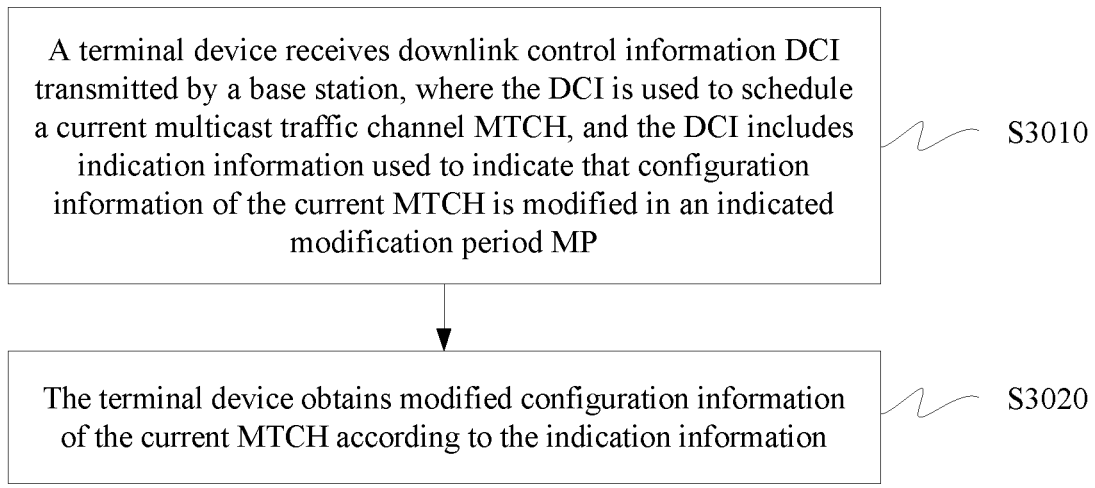
FIG. 30 shows a multicast-based wireless communication method according to an embodiment of the present invention.

FIG. 30 shows a multicast-based wireless communication method according to an embodiment of the present invention. The method may be applied to the communications system in FIG. 1, but this embodiment of the present invention is not limited thereto. The method includes the following steps.

S3010. A terminal device receives downlink control information DCI transmitted by a base station, where the DCI is used to schedule a current multicast traffic channel MTCH, the DCI includes indication information, and the indication information is used to indicate that configuration information of the current MTCH is modified in an indicated modification period MP.

S3020. The terminal device obtains modified configuration information of the current MTCH according to the indication information.

In a process of receiving a multicast service, the terminal device receives the DCI that is transmitted by the base station and used for scheduling the current MTCH, and obtains, according to the DCI, multicast service data carried in the MTCH. In the solution of this embodiment of the present invention, indication information is added to the DCI to indicate whether the configuration information of the current MTCH is modified. That is, the terminal device can learn whether the configuration information of the current MTCH is modified, without detecting a search space for an MCCH or receiving an MCCH, and therefore determine whether the modified configuration information needs to be re-obtained. This improves system flexibility.

In this embodiment of the present invention, the configuration information of the MTCH may include configuration information of a PDCCH search space for the MTCH. It should be understood that, in this embodiment of the present invention, the configuration information of the MTCH may further include other information, for example, may include at least one of the following information: DRX configuration information of the MTCH, a G-RNTI corresponding to a session ID of the MTCH, scheduling information of the MTCH, or neighboring cell information. This is not limited in this embodiment of the present invention.

It should be understood that, this embodiment of the present invention may be applied to processing of a multicast service. The multicast service may be, for example, a multimedia broadcast multicast service (MBMS) and/or a multicast service in SC-PTM. In this embodiment of the present invention, unless otherwise specified, the MTCH and the SC-MTCH may be interchanged, and the MCCH and the SC-MCCH may be interchanged.

It should be understood that, the indicated modification period may be a modification period determined according to the indication information. For example, assuming that the indication information is two bits, "01" indicates that the configuration information of the current MTCH is modified in a next MP (namely, a first MP after a current MP), "10" indicates that the configuration information of the current MTCH is modified in a second MP after the current MP, "11" indicates that the configuration information of the current MTCH is modified in a third MP after the current MP, and "00" indicates that the configuration information of the current MTCH is not modified in any one of the three MPs after the current MP. Without loss of generality, the foregoing 2-bit coding modes may be interchanged, and the present invention is not limited to the corresponding modes in this example.

The following uses an SC-PTM technology as an example to describe this embodiment of the present invention in detail. However, it should be understood that, this embodiment of the present invention may be further applied to other multicast technologies.

In this embodiment of the present invention, a terminal device with a simple functional structure, for example, a metering module in a smart water meter or electricity meter, cannot receive an SC-MCCH (or cannot detect other search spaces, such as a search space for an SC-MCCH) due to a limited capability when receiving a current SC-MTCH. For a terminal device that has started to receive a current multicast service, the terminal device can monitor, according to obtained configuration information of the multicast service, in a corresponding search space, DCI for scheduling a current SC-MTCH. The terminal device receives, according to the DCI for scheduling the SC-MTCH, the SC-MTCH transmitted by the base station. Further, in this embodiment of the present invention, the DCI for scheduling the SC-MTCH may include indication information, and the indication information is used to indicate that configuration information of the current SC-MTCH is modified in an indicated MP.

In this embodiment of the present invention, the configuration information of the SC-MTCH may include configuration information of a search space for the SC-MTCH. It should be understood that, in this embodiment of the present invention, the configuration information of the SC-MTCH may further include other information, for example, may include at least one of the following information: DRX configuration information of the SC-MTCH, a G-RNTI corresponding to a session ID of the SC-MTCH, scheduling information of the SC-MTCH, or neighboring cell information.

In this embodiment of the present invention, before or when the terminal device receives the current multicast service, the terminal device can determine, according to a session ID of the current multicast service, a G-RNTI corresponding to the session ID, and detect, on a PDCCH according to the obtained configuration information of the current multicast service, DCI for scheduling the current SC-MTCH, where the G-RNTI corresponding to the session ID may be used to mask or scramble a CRC of the DCI. The terminal device receives, according to the DCI, the SC-MTCH transmitted by the base station. Further, in this embodiment of the present invention, the DCI may include indication information, and the indication information is used to indicate that the configuration information of the current SC-MTCH is modified in the indicated MP.

Specifically, in this embodiment of the present invention, the indication information in the DCI may be a 2-bit indication field in the DCI. In this case, in the indication field, "01" indicates that the configuration information of the current MTCH is modified in the next MP (namely, the first MP after the current MP), "10" indicates that the configuration information of the current MTCH is modified in the second MP after the current MP, "11" indicates that the configuration information of the current MTCH is modified in the third MP after the current MP, and "00" indicates that the configuration information of the current MTCH is not modified in any one of the three MPs after the current MP. Without loss of generality, the foregoing 2-bit coding modes may be interchanged, and the present invention is not limited to the corresponding modes in this example.

It should be understood that, in this embodiment of the present invention, the indication information in the DCI for scheduling the current SC-MTCH is used to indicate that the configuration information of the current SC-MTCH is modified in the indicated MP. The indication information may be carried in at least one bit in the DCI. The foregoing descriptions of the examples are only a specific implementation of the present invention, but this embodiment of the present invention is not limited thereto. For example, the DCI for scheduling the SC-MTCH may include three bits, and a binary combination of any bits in the three bits may indicate that the current SC-MTCH is modified in the indicated MP.

It should be understood that, in this embodiment of the present invention, the indication information may be carried in an existing field of the DCI for scheduling the current SC-MTCH, or a new field for carrying the indication information may be added to the DCI. In addition, the indication information may be indicated in an implicit or explicit indication manner. This is not limited in this embodiment of the present invention.

It should be understood that, in each of the foregoing or following embodiments of the present invention, the modification period MP may be a modification period MP of an MCCH in FIG. 4, or may be an SC-MTCH configuration information modification period MP defined for an SC-MTCH. The SC-MTCH configuration information modification period MP defined for the SC-MTCH may be equal to the modification period of the MCCH or several times longer than the modification period of the MCCH. The SC-MTCH configuration information modification period MP defined for the SC-MTCH may be configured by using system information, or configured on an SC-MCCH. The SC-MTCH configuration information modification period MP defined for the SC-MTCH may be configured for each MTCH separately, or a same SC-MTCH configuration information modification period MP may be used for all SC-MTCHs in a cell.

Figure 31:
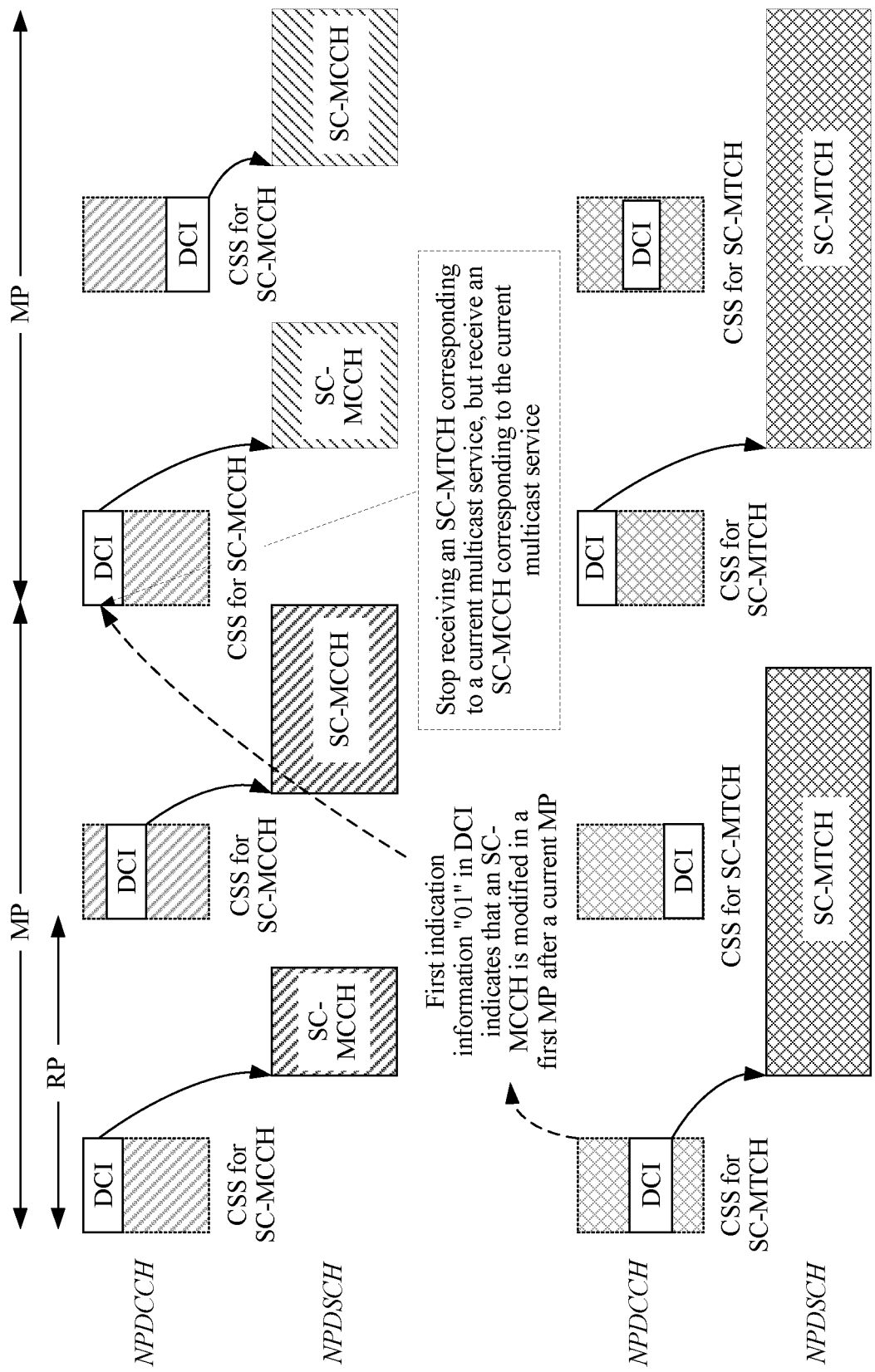
FIG. 31 shows a schematic diagram of receiving a multicast service by a terminal device according to an embodiment of the present invention.

FIG. 31 shows a schematic diagram of receiving a multicast service by a terminal device according to an embodiment of the present invention. This embodiment of the present invention uses an NB-IoT system as an example, but is also applicable to other communications systems. Therefore, although an NPDSCH and an NPDCCH are used to describe a physical-layer channel in this embodiment of the present invention, the NPDSCH and the NPDCCH may also be replaced with corresponding physical-layer channels in a system, for example, a PDSCH and a PDCCH. As can be seen from FIG. 31, an SC-MTCH carrying a multicast service and an SC-MCCH carrying configuration information of the multicast service are transmitted on the NPDSCH, and transmission of the SC-MCCH and the SC-MTCH is scheduled by using DCI carried on the NPDCCH.

In this embodiment of the present invention, different search spaces may be defined for the SC-MTCH and the SC-MCCH, and a format of DCI for scheduling the SC-MTCH may be different from a format of DCI for scheduling the SC-MCCH. As can be seen from FIG. 31, the DCI for scheduling the SC-MTCH and the DCI for scheduling the SC-MCCH are transmitted in the search spaces for the SC-MTCH and the SC-MCCH respectively. It should be understood that, in a specific implementation, the search space for the SC-MTCH and the search space for the SC-MCCH may be configured to overlap each other.

In a process of receiving the current SC-MTCH or monitoring, in an NPDCCH search space, the DCI for scheduling the NPDSCH used to carry the SC-MTCH, the terminal device cannot receive the SC-MCCH carried on the NPDSCH, or monitor, in the search space for scheduling the SC-MCCH, the DCI for scheduling the NPDSCH used to carry the SC-MCCH. In this embodiment, in the process in which the terminal device receives the current SC-MTCH, indication information is added to the DCI for scheduling the NPDSCH used to carry the SC-MTCH, and the indication information may indicate that the configuration information of the multicast service corresponding to the current SC-MTCH is modified in the indicated MP. When the indication information indicates that the configuration information of the multicast service corresponding to the current SC-MTCH is modified in the indicated MP, the terminal device stops receiving the current SC-MTCH in the indicated MP, monitors, in the search space for scheduling the NPDSCH used to carry the SC-MCCH, the DCI for scheduling the SC-MCCH, re-obtains the SC-MCCH according to the DCI, and obtains modified configuration information of the multicast service according to the SC-MCCH.

It should be understood that, in this embodiment of the present invention, the indication information may further indicate that the configuration information of the current SC-MTCH is not modified in the indicated MP. In this case, the terminal device may continue to monitor the related search space according to the configuration information of the current SC-MTCH, and receive the current SC-MTCH.

Optionally, in this embodiment of the present invention, the indication information in the DCI for scheduling the current MTCH may be further used to indicate that configuration information of another MTCH in a current cell is modified in the indicated MP. Therefore, the terminal device receiving the current multicast can determine, according to an implementation of the terminal device, whether to re-read multicast configuration information of the current cell. This improves system flexibility.

It should be understood that, the another MTCH may be another MTCH different from the current MTCH that the terminal device is receiving in the current cell. The another MTCH may be an MTCH that is not used by the terminal device.

In this embodiment of the present invention, the terminal device only needs to detect the search space corresponding to the MTCH of the multicast service that the terminal device is receiving, and can directly learn, from the indication information in the DCI transmitted in the search space, whether the configuration information of the current multicast service is modified, and can also learn whether the configuration information of the another MTCH is modified. Therefore, the terminal device can determine, according to the indication information without reading additional DCI, whether the modified configuration information needs to be re-obtained. This improves system flexibility.

Specifically, in this embodiment of the present invention, in the process of receiving the current multicast service, the terminal device receives the DCI that is transmitted by the base station and used for scheduling the current SC-MTCH, and the indication information in the DCI may be further used to indicate that the configuration information of the another SC-MCTH is modified in the indicated MP. For example, an indication field of at least one bit may be introduced in the DCI. When a value of the indication field is 1, the indication information indicates that the configuration information of the another SC-MTCH is modified in the indicated MP; when a value of the indication field is 0, the indication information indicates that the configuration information of the another MTCH is not modified in the indicated MP. Therefore, the terminal device can determine, according to the indication information, whether the modified configuration information needs to be re-obtained. This improves system flexibility. Without loss of generality, the indicated MP may be specified in advance, for example, specified as the first MP after the current MP.

It should be understood that, in this embodiment of the present invention, the DCI may further include a 2-bit indication field. In this case, in the indication field, "01" indicates that the configuration information of the another MTCH is modified in the next MP (namely, the first MP after the current MP), "10" indicates that the configuration information of the another MTCH is modified in the second MP after the current MP, "11" indicates that the configuration information of the another MTCH is modified in the third MP after the current MP, and "00" indicates that the configuration information of the another MTCH is not modified in any one of the three MPs after the current MP. Without loss of generality, the foregoing 2-bit coding modes may be interchanged, and the present invention is not limited to the corresponding modes in this example.

It should also be understood that, the indication information included in the DCI for scheduling the current SC-MTCH may also be indicated by any binary combination of three bits. Certainly, the foregoing is only a specific implementation of the present invention, and this embodiment of the present invention is not limited thereto.

It should also be understood that, in this embodiment of the present invention, the indication information may be carried in an existing field of the DCI for scheduling the current SC-MTCH, or a new field for carrying the indication information may be added to the DCI. In addition, the indication information may be indicated in an implicit or explicit indication manner. This is not limited in this embodiment of the present invention.

It should also be understood that, in this embodiment of the present invention, that the configuration information of the another MTCH in the cell is modified includes: configuration information of a current existing multicast service (any existing multicast service except the current multicast service of the terminal device in the cell) in the cell is modified, a multicast service is added to the cell, or an existing multicast service is removed.

It should also be understood that, in this embodiment of the present invention, the configuration information of the current multicast service and the configuration information of the another MTCH are carried on the SC-MCCH logical channel. The SC-MCCH is carried on the NPDSCH, and is scheduled by the DCI. The DCI may be transmitted in a preset or preconfigured search space, and a CRC may be masked by using a preset UEID, for example, an SC-RNTI. In this embodiment of the present invention, when the terminal device determines, according to the indication information, that the modified configuration information needs to be re-obtained in the indicated MP, the terminal device can monitor the DCI for scheduling the SC-MCCH on the NPDCCH, and receive, according to the DCI, the SC-MCCH transmitted by the base station. The SC-MCCH includes the multicast configuration information of the current cell, and the multicast configuration information of the current cell includes configuration information of at least one SC-MTCH. The SC-MTCH is a multicast service that is being multicast in the cell. The terminal can obtain, by re-obtaining the multicast configuration information of the current cell, the configuration information of the current SC-MTCH and the configuration information of the another SC-MTCH that is being multicast.

Optionally, in another embodiment of the present invention, the indication information included in the DCI for scheduling the current SC-MTCH is further used to indicate that the multicast configuration information of the current cell is modified in the indicated MP.

Specifically, in this embodiment of the present invention, the multicast configuration information of the current cell is a set or list of configuration information of at least one multicast traffic channel MTCH in the cell. Further, the configuration information of the MTCH may include at least one of the following information: configuration information of the search space for the MTCH, DRX configuration information of the MTCH, a G-RNTI corresponding to a session ID of the MTCH, scheduling information of the MTCH, neighboring cell information, or the like. This is not specifically limited in this embodiment of the present invention.

It should be understood that, that the multicast configuration information of the current cell is modified may include at least one of the following: configuration information of a current existing MTCH in the cell is modified, an MTCH is added to the cell, or an existing MTCH is removed.

Specifically, in this embodiment of the present invention, in the process of receiving the current SC-MTCH, the terminal device can learn, according to the indication information in the DCI for scheduling the current SC-MTCH, that the multicast configuration information of the current cell is modified in the indicated MP. For example, a 2-bit indication field may be introduced in the DCI for scheduling the current SC-MTCH. In this case, in the indication field, "01" indicates that the multicast configuration information of the current cell is modified in the next MP (namely, the first MP after the current MP), "10" indicates that the multicast configuration information of the current cell is modified in the second MP after the current MP, "11" indicates that the multicast configuration information of the current cell is modified in the third MP after the current MP, and "00" indicates that the multicast configuration information of the current cell is not modified in any one of the three MPs after the current MP. Without loss of generality, the foregoing 2-bit coding modes may be interchanged, and the present invention is not limited to the corresponding modes in this example. Specifically, FIG. 31 shows only a case in which the indication field is "01".

It should also be understood that, the indication information in the DCI for scheduling the current SC-MTCH may further use any binary combination of three bits to indicate that an SC-MTCH is added to the current cell or that an existing SC-MTCH is removed. Certainly, the foregoing is only a specific implementation of this embodiment of the present invention, and this embodiment of the present invention is not limited thereto.

It should also be understood that, in this embodiment of the present invention, the indication information may be carried in an existing field of the DCI for scheduling the current SC-MTCH, or a new field for carrying the indication information may be added to the DCI. In addition, the indication information may be indicated in an implicit or explicit indication manner. This is not limited in this embodiment of the present invention.

It should be understood that, in each of the foregoing or following embodiments of the present invention, the modification period MP may be a modification period MP of an MCCH in FIG. 31, or may be an SC-MTCH configuration information modification period MP defined for an SC-MTCH. The SC-MTCH configuration information modification period MP defined for the SC-MTCH may be equal to the modification period of the MCCH or several times longer than the modification period of the MCCH. The SC-MTCH configuration information modification period MP defined for the SC-MTCH may be configured by using system information, or configured on an SC-MCCH. The SC-MTCH configuration information modification period MP defined for the SC-MTCH may be configured for each MTCH separately, or a same SC-MTCH configuration information modification period MP may be used for all SC-MTCHs in a cell.

Figure 32:
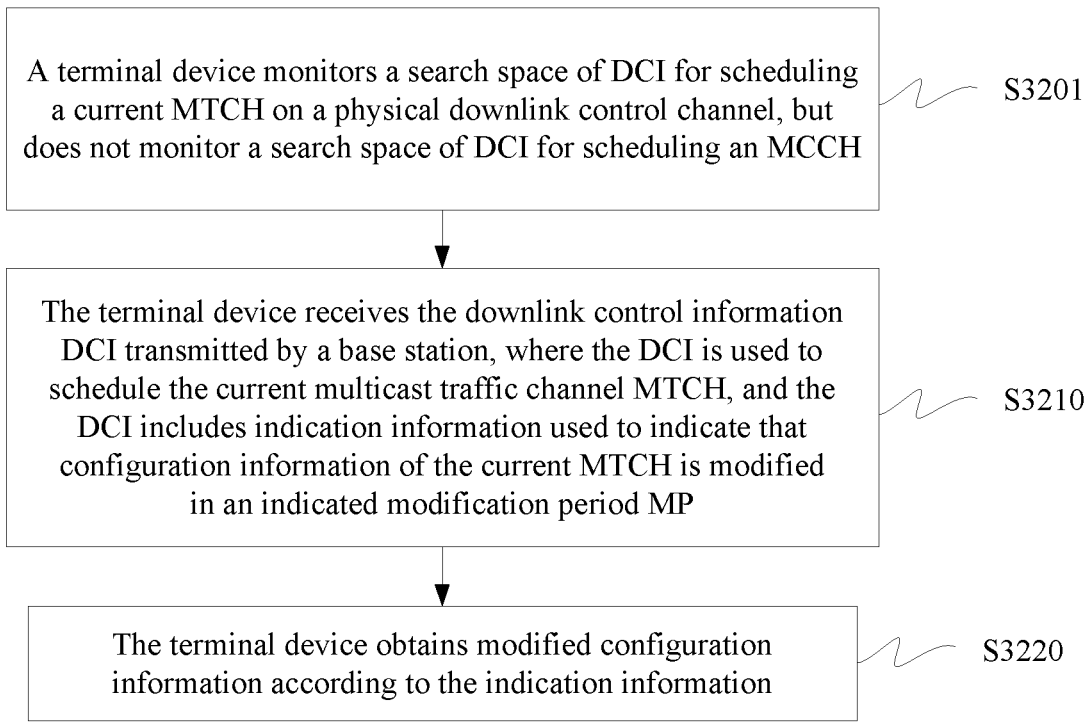
FIG. 32 shows another schematic diagram of receiving a multicast service by a terminal device according to an embodiment of the present invention.

As shown in FIG. 32, in this embodiment of the present invention, optionally, before the terminal device receives the DCI, the method further includes:

S3201. The terminal device monitors a search space of the DCI for scheduling the current MTCH on a physical downlink control channel, but does not monitor a search space of DCI for scheduling an MCCH.

Specifically, in this embodiment of the present invention, before receiving the downlink control information DCI transmitted by the base station, the terminal device monitors the search space of the DCI for scheduling the current SC-MTCH on the NPDCCH, but does not monitor the search space of the DCI for scheduling the SC-MCCH.

For steps S3210 and S3220 after S3201, refer to S3010 and S3020 in the foregoing method embodiment.

The foregoing describes in detail the multicast-based wireless communication methods according to the embodiments of the present invention from a terminal device side with reference to FIG. 30 to FIG. 32. The following describes in detail a multicast-based wireless communication method according to an embodiment of the present invention from a base station side with reference to FIG. 33. It should be understood that, descriptions of the base station side correspond to descriptions of the terminal device side. For similar descriptions, refer to the foregoing text.

Figure 33:
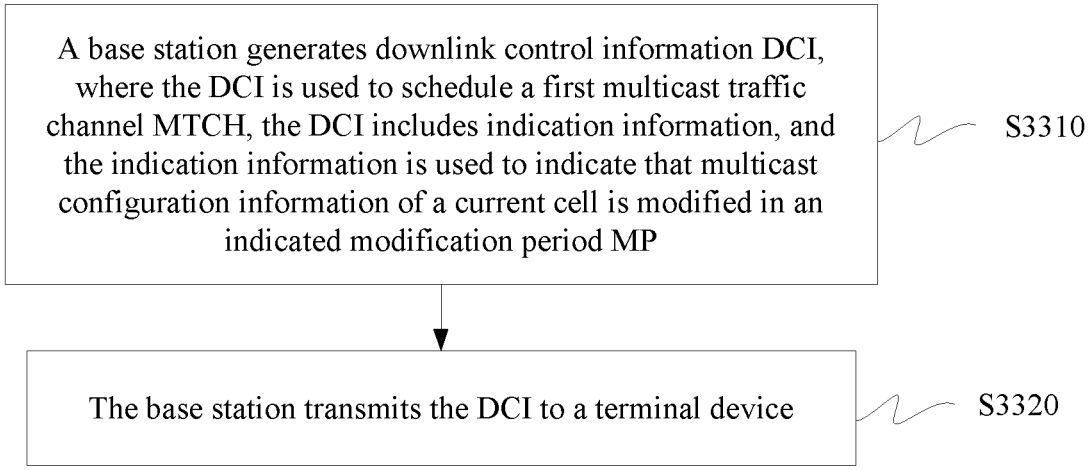
FIG. 33 shows another multicast-based wireless communication method according to an embodiment of the present invention.

As shown in FIG. 33, the multicast-based wireless communication method according to this embodiment of the present invention includes the following steps.

S3310. A base station generates downlink control information DCI, where the DCI is used to schedule a first multicast traffic channel MTCH, the DCI includes indication information, and the indication information is used to indicate that configuration information of the MTCH is modified in an indicated modification period MP.

S3320. The base station transmits the DCI to a terminal device.

In this embodiment of the present invention, the base station adds the indication information to the DCI for scheduling the MTCH, and the indication information is used to indicate that the configuration information of the MTCH is modified. Therefore, the terminal device only needs to detect a search space corresponding to the MTCH of a multicast service that the terminal device is receiving, can directly learn, from the indication information in the DCI transmitted in the search space, that configuration information of the current multicast service is modified, and can determine, according to the indication information without reading additional DCI, whether modified configuration information needs to be re-obtained. This improves system flexibility.

In this embodiment of the present invention, the configuration information of the MTCH may include configuration information of a PDCCH search space for the MTCH. In addition, the configuration information of the MTCH may further include other information, for example, may include at least one of the following information: DRX configuration information of the MTCH, a G-RNTI corresponding to a session ID of the MTCH, scheduling information of the MTCH, or neighboring cell information. This is not specifically limited in this embodiment of the present invention.

It should be understood that, content of this embodiment of the present invention is mainly applicable to multicast services, including a multimedia broadcast multicast service (MBMS) MBMS and SC-PTM. Therefore, in this embodiment of the present invention, unless otherwise specified, the MTCH and the SC-MTCH may be interchanged, and the MCCH and the SC-MCCH may be interchanged.

Specifically, in this embodiment of the present invention, the base station generates downlink control information DCI, where the DCI includes indication information, and the indication information may be specifically used to indicate that configuration information of an SC-MTCH is modified in an indicated MP. The indication information may be carried in two bits in the DCI. For a specific implementation, refer to related descriptions of the terminal device side. For brevity, details are not described again herein.

Optionally, in this embodiment of the present invention, the indication information included in the DCI for scheduling the SC-MTCH may be further used to indicate that configuration information of a second SC-MTCH is modified in the indicated MP. Specifically, in this embodiment of the present invention, the indication information may be carried in at least one bit in the DCI. For a specific implementation, refer to related descriptions of the terminal device side. For brevity, details are not described again herein.

It should be understood that, in this embodiment of the present invention, the second SC-MTCH may be an SC-MTCH different from the first SC-MTCH that is currently being received in a current cell, for example, may be any SC-MTCH except the first SC-MTCH that is currently being received.

Optionally, in another embodiment of the present invention, the indication information in the DCI for scheduling the SC-MTCH may be further used to indicate that multicast configuration information of the current cell is modified in the indicated MP. Specifically, in this embodiment of the present invention, the indication information may be carried in at least one bit in the DCI. For a specific implementation, refer to related descriptions of the terminal device side. For brevity, details are not described again herein.

The multicast configuration information of the current cell is a set or list of configuration information of a multicast traffic channel MTCH included in the cell. Further, the configuration information of the MTCH may include at least one of the following information: configuration information of the search space for the MTCH, DRX configuration information of the MTCH, a G-RNTI corresponding to a session ID of the MTCH, scheduling information of the MTCH, neighboring cell information, or the like. This is not specifically limited in this embodiment of the present invention.

It should be understood that, that the multicast configuration information of the current cell is modified includes at least one of the following: configuration information of an existing multicast service in the current cell is modified, a multicast service is added to the cell, or an existing multicast service in the cell is removed.

In an embodiment of the present invention, when an NB-IoT terminal in an idle state receives a multicast service, on every paging occasion (PO) of the NB-IoT terminal, if the NB-IoT terminal is receiving a single cell multicast control channel (SC-MCCH) or a single cell multicast traffic channel (SC-MTCH)SC-MTCH, if the NB-IoT terminal preferentially receives a paging message on every paging occasion, the terminal device stops receiving the SC-MCCH or the SC-MTCH that is currently being received, but detects, in a common search space (CSS) corresponding to the paging of the terminal device, whether the NB-IoT terminal is paged.

However, on every PO of the terminal device, if the terminal device stops receiving the SC-MCCH or the SC-MTCH that is currently being received, but receives paging information that may exist on a PRB on which a paging message of the terminal device is located, great adverse impact is caused on the multicast service that is currently being received: A multicast packet that temporally overlaps the paging is discarded because it cannot be received, and therefore, reliable transmission of the multicast service is affected.

In addition, every time the terminal device receives a single cell multicast traffic channel (SC-MTCH)SC-MTCH, if the terminal device does not detect, on a corresponding PO, DCI for scheduling a paging message, and read the corresponding paging message, the network is unable to get in contact with the terminal in this case, and therefore performs a necessary communication process. For some types of services, this is intolerable, or user experience is affected greatly. For example, for a metering service, after some users are delinquent, a gas or electric power company temporarily stops gas supply or electric power services for the users. The gas supply or electric power services are not resumed until the users pay off fees. However, after the users pay off the fees, the service provider needs to resume the gas and electric power supply as early as possible; otherwise, user experience is affected severely. For the metering services, an NB-IoT system may perform software or firmware upgrades for terminal devices by means of SC-PTM multicast. Therefore, in a period of time, software upgrades may be performed on the NB-IoT devices. If a paging message initiated by a network cannot be received in a multicast process in which a software upgrade package is received, the network cannot recharge or resume services for the disabled gas meters or electricity meters, and therefore, user experience is affected severely.

The present invention provides a multicast-based wireless communication method to indicate whether a terminal needs to perform reception in a multicast process in different cases.

Figure 34:
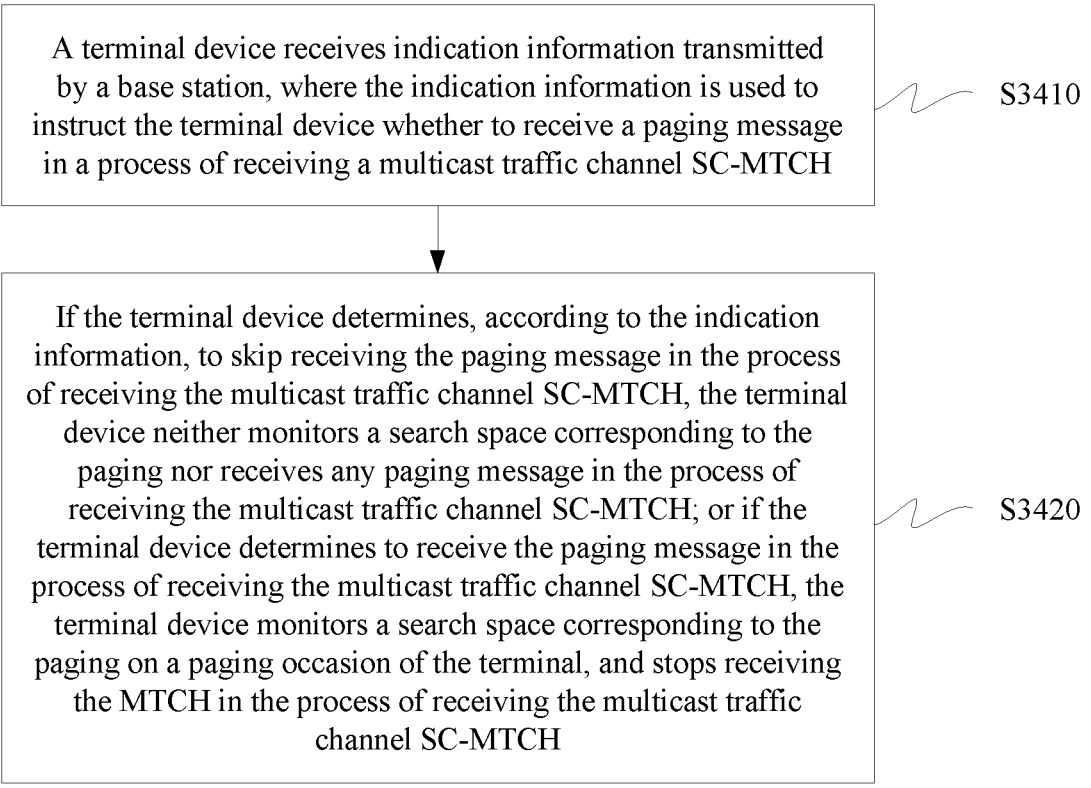
FIG. 34 shows another multicast-based wireless communication method according to an embodiment of the present invention.

FIG. 34 shows another multicast-based wireless communication method according to an embodiment of the present invention. The method includes the following steps.

S3410. A terminal device receives indication information transmitted by a base station, where the indication information is used to instruct the terminal device whether to receive a paging message in a process of receiving a multicast traffic channel SC-MTCH.

S3420. If the terminal device determines, according to the indication information, to skip receiving the paging message in the process of receiving the multicast traffic channel SC-MTCH, the terminal device neither monitors a search space corresponding to the paging nor receives any paging message in the process of receiving the multicast traffic channel SC-MTCH; or if the terminal device determines to receive the paging message in the process of receiving the multicast traffic channel SC-MTCH, the terminal device monitors a search space corresponding to the paging on a paging occasion of the terminal, and stops receiving the MTCH in the process of receiving the multicast traffic channel SC-MTCH.

In this embodiment of the present invention, the indication information is used to instruct the terminal device whether to receive the paging in the process of receiving the multicast traffic channel SC-MTCH. If the terminal device determines to skip receiving the paging message in the process of receiving the multicast traffic channel SC-MTCH, the terminal device neither monitors the search space corresponding to the paging nor receives any paging message in the process of receiving the multicast traffic channel SC-MTCH, but continues to monitor a search space for the SC-MTCH and continues to receive the SC-MTCH according to DCI corresponding to the SC-MTCH. If the terminal device determines to receive the paging message in the process of receiving the multicast traffic channel SC-MTCH, the terminal device monitors the search space corresponding to the paging on the paging occasion of the terminal, and stops receiving the MTCH in the process of receiving the multicast traffic channel SC-MTCH.

According to the method, the base station may use the indication information to instruct the terminal whether to receive the paging message in the process of receiving the SC-MTCH. When the base station can ensure, by means of scheduling or by using a private implementation solution, that the paging message of the terminal and the search space used for paging do not temporally overlap the SC-MTCH, the base station may transmit an indication message instructing the terminal device to receive the paging message in the process of receiving the multicast traffic channel SC-MTCH. When the base station cannot ensure that the paging message of the terminal and the search space used for paging do not temporally overlap the SC-MTCH, and the base station considers that a multicast service success rate is important, the base station may transmit an indication message instructing the terminal device to skip receiving the paging message in the process of receiving the multicast traffic channel SC-MTCH. In this way, the base station has high flexibility, and optimal performance is ensured when there are different service requirements.

It should be understood that, the indication information may be configured for different SC-MTCHs separately, or may be configured for SC-MTCHs that are being transmitted in all cells; the indication information may be transmitted in system information, or transmitted on an SC-MCCH.

It should be understood that, when the paging occasion or the paging message of the terminal device temporally overlaps a multicast control channel SC-MCCH, the terminal device always preferentially monitors the paging occasion or receives the paging message, but abandons receiving the overlapping SC-MCCH.

Figure 35:
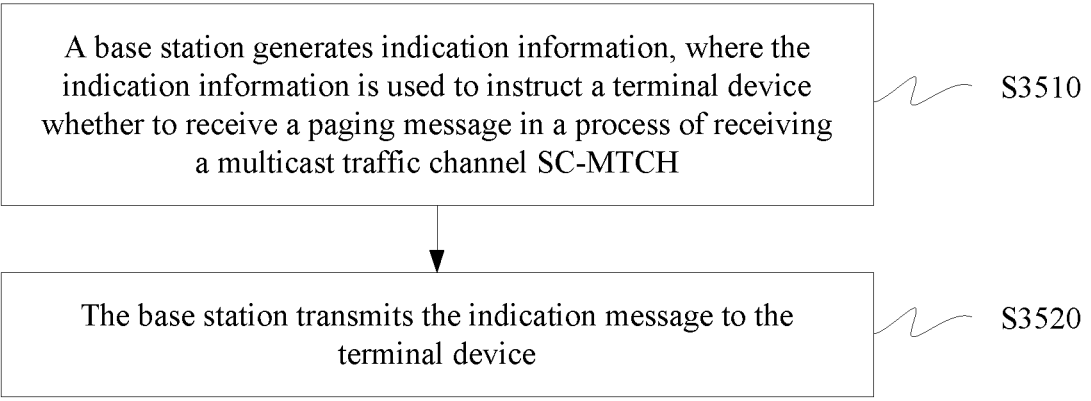
FIG. 35 shows another multicast-based wireless communication method according to an embodiment of the present invention.

FIG. 35 shows another multicast-based wireless communication method according to an embodiment of the present invention. The method includes the following steps.

S3510. A base station generates indication information, where the indication information is used to instruct a terminal device whether to receive a paging message in a process of receiving a multicast traffic channel SC-MTCH.

S3520. The base station transmits the indication message to the terminal device.

In the technical solution of the present invention, the base station generates the indication information, and the indication information is used to instruct the terminal device whether to receive the paging message in the process of receiving the multicast traffic channel SC-MTCH. If the indication information instructs the terminal device to skip receiving the paging in the process of receiving the multicast traffic channel SC-MTCH, the terminal device receiving the indication information does not receive the paging message in the process of receiving the multicast traffic channel SC-MTCH, and the terminal device neither monitors a search space corresponding to the paging nor receives any paging message in the process of receiving the multicast traffic channel SC-MTCH, but continues to monitor a search space for the SC-MTCH and continues to receive the SC-MTCH according to DCI corresponding to the SC-MTCH. If the indication information instructs the terminal device to receive the paging message in the process of receiving the multicast traffic channel SC-MTCH, the terminal device receiving the indication information monitors the search space corresponding to the paging on a paging occasion of the terminal, and stops receiving the MTCH in the process of receiving the multicast traffic channel SC-MTCH.

According to the method, the base station may use the indication information to instruct the terminal whether to receive the paging message in the process of receiving the SC-MTCH. When the base station can ensure, by means of scheduling or by using a private implementation solution, that the paging message of the terminal and the search space used for paging do not temporally overlap the SC-MTCH, the base station may transmit an indication message instructing the terminal device to receive the paging message in the process of receiving the multicast traffic channel SC-MTCH. When the base station cannot ensure that the paging message of the terminal and the search space used for paging do not temporally overlap the SC-MTCH, and the base station considers that a multicast service success rate is important, the base station may transmit an indication message instructing the terminal device to skip receiving the paging message in the process of receiving the multicast traffic channel SC-MTCH. In this way, the base station has high flexibility, and optimal performance is ensured when there are different service requirements.

It should be understood that, the indication information may be configured for different SC-MTCHs separately, or may be configured for SC-MTCHs that are being transmitted in all cells; the indication information may be transmitted in system information, or transmitted on an SC-MCCH.

It should be understood that, when the paging occasion or the paging message of the terminal device temporally overlaps a multicast control channel SC-MCCH, the terminal device always preferentially monitors the paging occasion or receives the paging message, but abandons receiving the overlapping SC-MCCH.

For other specific processing procedures, refer to descriptions of the terminal device side. A corresponding processing mode of the base station cooperates with a processing mode on the terminal side to implement the method in this embodiment. It may be understood that, for the method embodiments in FIG. 30 and FIG. 32 to FIG. 35, the embodiments of the present invention further provide corresponding apparatuses, for example, a base station apparatus corresponding to a base station method embodiment and a terminal device apparatus corresponding to a terminal device method embodiment. Each apparatus includes modules configured to perform steps of the corresponding method. Functions performed by these modules are not described again herein. Refer to the foregoing method embodiments.

In addition, the hardware apparatus corresponding to FIG. 9 or FIG. 10 may also execute the method embodiments in FIG. 30 and FIG. 32 to FIG. 35. A specific execution process of the hardware apparatus is not described again. Refer to the foregoing embodiments.

It should be understood that, the indicated MP in the foregoing embodiments may be a target MP. The target MP may be the current MP or any MP after the current MP.

It should be understood that in the embodiment of the present invention, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may further be any conventional processor, or the like.

In an implementation process, steps in the foregoing methods can be implemented by using a hardware integrated logical circuit in the processor, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor executes an instruction in the memory and completes the steps in the foregoing methods in combination with hardware of the processor. To avoid repetition, details are not described again herein.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A multicast-based wireless communication method, comprising:

monitoring, by a terminal device, a search space of downlink control information (DCI) for scheduling a current multicast traffic channel (MTCH) on a physical downlink control channel (PDCCH), but skipping monitoring a search space of DCI for scheduling a multicast control channel (MCCH);

receiving, by the terminal device, the DCI from a base station, wherein the DCI comprises indication information, and the indication information is used to indicate that configuration information of the current MTCH is modified in a next modification period (MP); and obtaining, by the terminal device, modified configuration information of the current MTCH according to the indication information.

2. The method according to claim 1, wherein
the configuration information of the MTCH comprises configuration information of a physical downlink control channel (PDCCH) search space, and the PDCCH search space is used to transmit the DCI for scheduling the MTCH.

3. The method according to claim 1, wherein the indication information is further used to indicate that configuration information of another MTCH in a current cell of the base station is modified in the next MP.

4. A multicast-based wireless communication method, comprising:

generating, by a base station, downlink control information (DCI), wherein the DCI is used to schedule a first multicast traffic channel (MTCH), the DCI comprises indication information, and the indication information is used to indicate that configuration information of the first MTCH is modified in a next modification period (MP); and transmitting, by the base station, the DCI to a terminal device, wherein the DCI enables the terminal device to skip monitoring a search space of the DCI for scheduling a multicast control channel (MCCH).

5. The method according to claim 4, wherein the configuration information of the MTCH comprises configuration information of physical downlink control channel (PDCCH)

search space, and the PDCCH search space is used to transmit the DCI for scheduling the MTCH.

6. The method according to claim 4, wherein the indication information is further used to indicate that configuration information of a second MTCH in a current cell is modified in the next MP.

7. A terminal device, comprising:
a memory that stores program code;
a processor coupled to the processor; wherein the processor is configured to execute the stored program code to perform the steps of:
monitoring a search space of downlink control information (DCI) for scheduling a current multicast traffic channel (MTCH) on a physical downlink control channel (PDCCH), but skipping the monitoring of a search space of DCI for scheduling a multicast control channel (MCCH);
receiving the DCI from a base station, wherein the DCI comprises indication information, and the indication information is used to indicate that configuration information of the current MTCH is modified in a next modification period (MP); and
obtaining modified configuration information of the current MTCH according to the indication information.

8. The terminal device according to claim 7, wherein the configuration information of the MTCH comprises configuration information of a physical downlink control channel (PDCCH) search space, and the PDCCH search space is used to transmit the DCI for scheduling the MTCH.

9. The terminal device according to claim 7, wherein the indication information is further used to indicate that configuration information of another MTCH in a current cell of the base station is modified in the next MP.

10. A base station, comprising a processor and a memory coupled to the processor; wherein the processor is configured to execute stored program codes to perform the steps of:
generating downlink control information (DCI), wherein the DCI is used to schedule a first multicast traffic channel (MTCH), the DCI comprises indication information, and the indication information is used to indicate that configuration information of the first MTCH is modified in a next modification period (MP); and
transmitting the DCI to a terminal device,
wherein the DCI enables the terminal device to skip monitoring a search space of the DCI for scheduling a multicast control channel (MCCH).

11. The base station according to claim 10, wherein the configuration information of the MTCH comprises configuration information of physical downlink control channel (PDCCH) search space, and the PDCCH search space is used to transmit the DCI for scheduling the MTCH.

12. The base station according to claim 10, wherein the indication information is further used to indicate that configuration information of a second MTCH in a current cell is modified in the next MP.

* * * * *